(12) United States Patent
Whited

(10) Patent No.: US 11,839,988 B2
(45) Date of Patent: Dec. 12, 2023

(54) POWER OPERATED ROTARY KNIFE

(71) Applicant: Bettcher Industries, Inc., Birmingham, OH (US)

(72) Inventor: Jeffrey A. Whited, Richfield, OH (US)

(73) Assignee: Bettcher Industries, Inc., Birmingham, OH (US)

( * ) Notice: Subject to any disclaimer, the term of this patent is extended or adjusted under 35 U.S.C. 154(b) by 0 days.

(21) Appl. No.: 18/117,154

(22) Filed: Mar. 3, 2023

(65) Prior Publication Data

US 2023/0202066 A1    Jun. 29, 2023

Related U.S. Application Data

(63) Continuation of application No. 17/210,024, filed on Mar. 23, 2021, now Pat. No. 11,597,113, which is a
(Continued)

(51) Int. Cl.
*B26B 25/00* (2006.01)
*A22B 5/16* (2006.01)
(Continued)

(52) U.S. Cl.
CPC .......... *B26B 25/002* (2013.01); *A22B 5/0047* (2013.01); *A22B 5/165* (2013.01);
(Continued)

(58) Field of Classification Search
CPC ... B26B 25/002; A22C 17/12; A22C 17/0033; A22B 5/0047; A22B 5/165
See application file for complete search history.

(56) References Cited

U.S. PATENT DOCUMENTS 1,220,345 A    3/1917    Koster
1,374,988 A    4/1921    Cooper
(Continued)

FOREIGN PATENT DOCUMENTS

CA    2796222    10/2011
CA    2883924    3/2014
(Continued)

OTHER PUBLICATIONS

Oct. 3, 2011 Decision and Opinion of the United States Court of Appeals for the Federal Circuit (Appeal No. 2011-1038, -1046) regarding the case styled *Bettcher Industries, Inc. v. Bunzl USA, Inc. and Bunzl Processor Distribution, LLC*, Case No. 3:08 CV 2423, U.S. District Court for the Northern District of Ohio, Judge Zouhary. The Decision and Opinion relates to U.S. Pat. No. 7,00,325, owned by the assignee of the present application. (47 pages).
(Continued)

*Primary Examiner* — Sean M Michalski

(57) ABSTRACT

A power operated rotary knife including an annular rotary knife blade supported for rotation in a blade housing. The rotary knife blade including a body and a blade section extending from the body. The body includes an outer wall including an arcuate surface having an upper region extending from a first upper end portion to a second intermediate portion and a lower region extending from the second intermediate portion to a third lower end portion. A plurality of gear teeth extend downwardly from the upper end of the body, each of the plurality of gear teeth including an outer peripheral face forming a portion of the upper region of the arcuate surface of the outer wall. The body outer wall includes a bearing surface having a lower bearing face in the lower region of the arcuate surface and an upper bearing face in the upper region of the arcuate surface.

23 Claims, 35 Drawing Sheets

Related U.S. Application Data continuation of application No. 16/736,439, filed on Jan. 7, 2020, now Pat. No. 10,960,564, which is a continuation of application No. 16/050,931, filed on Jul. 31, 2018, now Pat. No. 10,532,478, which is a continuation of application No. 15/374,207, filed on Dec. 9, 2016, now Pat. No. 10,040,211.

(51) Int. Cl.
*F16C 17/10* (2006.01)
*A22B 5/00* (2006.01)
*A22C 17/00* (2006.01)
*A22C 17/12* (2006.01)

(52) U.S. Cl.
CPC .......... *A22C 17/0033* (2013.01); *A22C 17/12* (2013.01); *F16C 17/10* (2013.01)

(56) References Cited

U.S. PATENT DOCUMENTS

| | | |
|---|---|---|
| 1,476,345 A | 12/1923 | McGee |
| 1,966,266 A | 7/1934 | Skelly |
| 2,266,888 A | 12/1941 | McCurdy et al. |
| 2,656,012 A | 10/1953 | Thorpe |
| 2,827,657 A | 3/1958 | Bettcher |
| 3,024,532 A | 3/1962 | Bettcher |
| 3,150,409 A | 9/1964 | Wilcox |
| RE25,947 E | 12/1965 | Bettcher |
| 3,269,010 A | 8/1966 | Bettcher |
| 3,349,485 A | 10/1967 | Bettcher |
| 3,461,557 A | 8/1969 | Behring |
| 3,512,519 A | 5/1970 | Hall |
| 3,592,519 A | 7/1971 | Martin |
| 3,688,403 A | 9/1972 | Bettcher |
| 3,816,875 A | 6/1974 | Duncan et al. |
| 3,852,882 A | 12/1974 | Bettcher |
| 4,082,232 A | 4/1978 | Brewer |
| 4,170,063 A | 10/1979 | Bettcher |
| 4,178,683 A | 12/1979 | Bettcher |
| 4,198,750 A | 4/1980 | Bettcher |
| 4,236,531 A | 12/1980 | McCullough |
| 4,267,759 A | 5/1981 | Sullivan et al. |
| 4,326,361 A | 4/1982 | McGill |
| 4,336,651 A | 6/1982 | Caro |
| 4,363,170 A | 12/1982 | McCullough |
| 4,418,591 A | 12/1983 | Astle |
| 4,439,924 A | 4/1984 | Bettcher |
| 4,492,027 A | 1/1985 | Bettcher |
| 4,494,311 A | 1/1985 | McCullough |
| 4,509,261 A | 4/1985 | Bettcher |
| 4,516,323 A | 5/1985 | Bettcher |
| 4,575,937 A | 3/1986 | McCullough |
| 4,575,938 A | 3/1986 | McCullough |
| 4,590,576 A | 5/1986 | Elpiner |
| 4,590,676 A | 5/1986 | Bettcher |
| 4,609,227 A | 9/1986 | Wild et al. |
| 4,637,140 A | 1/1987 | Bettcher |
| 4,829,860 A | 5/1989 | VanderPol |
| 4,854,046 A | 8/1989 | Decker et al. |
| 4,858,321 A | 8/1989 | McCullough |
| 4,865,473 A | 9/1989 | De Vito |
| 4,909,640 A | 3/1990 | Nakanishi |
| 4,942,665 A | 7/1990 | McCullough |
| 5,031,323 A | 7/1991 | Honsa et al. |
| 5,033,876 A | 7/1991 | Kraus |
| 5,071,264 A | 12/1991 | Franke et al. |
| 5,099,721 A | 3/1992 | Decker et al. |
| 5,230,154 A | 7/1993 | Decker et al. |
| 5,331,877 A | 7/1994 | Ishii |
| 5,419,619 A | 5/1995 | Lew |
| 5,484,331 A | 1/1996 | Buhlke |
| 5,499,492 A | 3/1996 | Jameson |
| 5,522,142 A | 6/1996 | Whited |
| 5,529,532 A | 6/1996 | Desrosiers |
| 5,582,041 A | 12/1996 | Spiess |
| 5,664,332 A | 9/1997 | Whited |
| 5,692,307 A | 12/1997 | Whited |
| 5,743,659 A | 4/1998 | Stewart |
| 5,749,661 A | 5/1998 | Moller |
| 5,761,817 A | 6/1998 | Whited et al. |
| 5,836,701 A | 11/1998 | Vranish |
| 5,940,972 A | 8/1999 | Baris et al. |
| 5,971,413 A | 10/1999 | El-Kassouf |
| 6,247,847 B1 | 6/2001 | Lob |
| 6,364,086 B1 | 4/2002 | Blaurock et al. |
| 6,604,288 B2 | 8/2003 | Whited et al. |
| 6,615,494 B2 | 9/2003 | Long et al. |
| 6,634,257 B2 | 10/2003 | Long et al. |
| 6,655,033 B2 | 12/2003 | Hermann et al. |
| 6,662,452 B2 | 12/2003 | Whited |
| 6,665,940 B2 | 12/2003 | Sanders et al. |
| 6,694,649 B2 | 2/2004 | Whited et al. |
| 6,751,872 B1 | 6/2004 | Whited et al. |
| 6,769,184 B1 | 8/2004 | Whited |
| 6,857,191 B2 | 2/2005 | Whited |
| 6,938,348 B2 | 9/2005 | Roncaglia |
| 6,978,548 B2 | 12/2005 | Whited et al. |
| 7,000,325 B2 | 2/2006 | Whited |
| 7,107,887 B2 | 9/2006 | Whited |
| 7,207,114 B2 | 4/2007 | Rosu et al. |
| 7,340,840 B2 | 3/2008 | Whited |
| 7,670,212 B1 | 3/2010 | Thompson et al. |
| 8,074,363 B2 | 12/2011 | Whited |
| 8,303,191 B2 | 11/2012 | Albrecht et al. |
| 8,448,340 B2 | 5/2013 | Whited |
| 8,505,207 B2 | 8/2013 | Thien |
| 8,661,692 B2 | 3/2014 | Whited et al. |
| 8,671,580 B2 | 3/2014 | Whited |
| 8,695,222 B2 | 4/2014 | Whited et al. |
| 8,726,524 B2 | 5/2014 | Whited et al. |
| 8,739,416 B2 | 6/2014 | Mascari et al. |
| 8,745,881 B2 | 6/2014 | Thompson et al. |
| 8,806,761 B2 | 8/2014 | Whited et al. |
| 8,950,076 B2 | 2/2015 | Whited et al. |
| 8,968,107 B2 | 3/2015 | Rapp et al. |
| 9,089,980 B2 | 7/2015 | Whited et al. |
| 9,121,438 B2 | 9/2015 | Mascari |
| 9,186,171 B2 | 11/2015 | Esarey et al. |
| 9,211,650 B2 | 12/2015 | Mascari et al. |
| 9,221,183 B2 | 12/2015 | Whited et al. |
| 9,227,332 B2 | 1/2016 | Thompson et al. |
| 9,265,263 B2 | 2/2016 | Whited et al. |
| 9,364,962 B2 | 6/2016 | Whited |
| 9,452,541 B2 | 9/2016 | Mascari et al. |
| 9,475,203 B2 | 10/2016 | Whited et al. |
| 9,522,473 B2 | 12/2016 | Mascari et al. |
| 9,573,283 B2 | 2/2017 | Thompson et al. |
| 9,579,810 B2 | 2/2017 | Mascari |
| 9,592,076 B2 | 3/2017 | Esarey et al. |
| 9,623,577 B2 | 4/2017 | Whited et al. |
| 9,833,919 B2 | 12/2017 | Mascari et al. |
| 10,040,211 B2 | 8/2018 | Whited |
| 10,532,477 B2 | 1/2020 | Mascari et al. |
| 2003/0070301 A1 | 4/2003 | Herrmann et al. |
| 2003/0084576 A1 | 5/2003 | Whited et al. |
| 2003/0131482 A1 | 7/2003 | Long et al. |
| 2003/0196333 A1 | 10/2003 | Whited |
| 2004/0134326 A1 | 7/2004 | Long et al. |
| 2005/0126015 A1 | 6/2005 | Whited |
| 2005/0217119 A1 | 10/2005 | Rapp |
| 2006/0037200 A1 | 2/2006 | Rosu et al. |
| 2006/0137193 A1 | 6/2006 | Whited |
| 2006/0211966 A1 | 9/2006 | Hatton et al. |
| 2007/0283573 A1 | 12/2007 | Levsen |
| 2007/0283574 A1 | 12/2007 | Levsen |
| 2008/0022537 A1 | 1/2008 | Clarke et al. |
| 2008/0078158 A1 | 4/2008 | Reist |
| 2008/0098605 A1 | 5/2008 | Whited et al. |
| 2009/0227192 A1 | 9/2009 | Luthi et al. |
| 2010/0101097 A1 | 4/2010 | Thien |
| 2010/0111460 A1 | 5/2010 | Albrecht et al. |
| 2010/0170097 A1 | 7/2010 | Levsen |
| 2011/0185580 A1 | 8/2011 | Whited |

(56) References Cited

U.S. PATENT DOCUMENTS

| | | |
|---|---|---|
| 2011/0247220 A1 | 10/2011 | Whited et al. |
| 2012/0011980 A1 | 1/2012 | Kroger |
| 2012/0030952 A1 | 2/2012 | Levsen |
| 2013/0025134 A1 | 1/2013 | Mascari et al. |
| 2013/0025136 A1 | 1/2013 | Whited et al. |
| 2013/0025137 A1 | 1/2013 | Whited et al. |
| 2013/0025138 A1 | 1/2013 | Whited et al. |
| 2013/0025139 A1 | 1/2013 | Whited et al. |
| 2013/0104404 A1 | 5/2013 | Levsen |
| 2013/0185944 A1 | 7/2013 | Thompson et al. |
| 2013/0243358 A1 | 9/2013 | Stork et al. |
| 2013/0266250 A1 | 10/2013 | Brown |
| 2013/0326886 A1 | 12/2013 | Levsen |
| 2014/0074118 A1 | 3/2014 | Esarey et al. |
| 2014/0074120 A1 | 3/2014 | Esarey et al. |
| 2015/0377289 A1 | 12/2015 | Scheidel et al. |
| 2016/0082612 A1 | 3/2016 | Mascari et al. |
| 2016/0279818 A1 | 9/2016 | Whited |
| 2016/0345996 A1 | 12/2016 | Esarey et al. |
| 2017/0021514 A1 | 1/2017 | Hall et al. |
| 2018/0162001 A1 | 6/2018 | Whited |
| 2018/0162002 A1 | 6/2018 | Whited et al. |
| 2018/0345514 A1 | 12/2018 | Whited et al. |

FOREIGN PATENT DOCUMENTS

| | | |
|---|---|---|
| DE | 19958802 | 7/2001 |
| EP | 0689905 | 1/1996 |
| EP | 0816026 | 1/1998 |
| EP | 1226907 | 7/2002 |
| EP | 1356902 | 10/2003 |
| EP | 1403012 | 3/2004 |
| EP | 1527853 | 5/2005 |
| EP | 1527854 | 5/2005 |
| EP | 1916075 | 4/2008 |
| EP | 2353805 | 8/2011 |
| EP | 2497366 | 9/2012 |
| EP | 2557935 | 6/2016 |
| EP | 2736684 | 1/2017 |
| FR | 1216947 | 4/1960 |
| JP | 2000052293 | 2/2000 |
| WO | WO 2001/024977 | 4/2001 |
| WO | WO 2001/041980 | 6/2001 |
| WO | WO 2008/107490 | 9/2008 |
| WO | WO 2011/030057 | 10/2011 |
| WO | WO 2013/016019 | 1/2013 |
| WO | WO 2013/016021 | 1/2013 |
| WO | WO 2013/016022 | 1/2013 |
| WO | WO 2013/016024 | 1/2013 |
| WO | WO 2013/016344 | 1/2013 |
| WO | WO 2014/016020 | 1/2013 |
| WO | WO 2014/039601 | 3/2014 |
| WO | WO 2014/039609 | 3/2014 |
| WO | WO 2014/159349 | 10/2014 |
| WO | WO 2014/160043 | 10/2014 |

OTHER PUBLICATIONS

International Search Report and Written Opinion of the International Searching Authority dated Feb. 14, 2018 for PCT International Application No. PCT/US2017/064500, filed Dec. 4, 2017. PCT International Application No. PCT/US2017/064500 corresponds to and claims priority from U.S. Appl. No. 15/374,207, filed Dec. 9, 2016, issued as U.S. Pat. No. 10,040,211, on Aug. 7, 2018. The present application claims priority from U.S. Appl. No. 15/374,207. (13 pages).

Extended European Search Report dated Jun. 24, 2020 for European Application No. 17878589.6, filed Jul. 9, 2019. European Application No. 17878589.5 is a regional phase application of PCT International Application No. PCT/US2017/064500, filed Dec. 4, 2017. PCT International Application No. PCT/US2017/064500 claims priority from U.S. Appl. No. 15/374,207, filed Dec. 9, 2016, issued as U.S. Pat. No. 10,040,211, on Aug. 7, 2018. The present application claims priority from U.S. Appl. No. 15/374,207. (7 pages).

Chinese Search Report dated Sep. 20, 2020 and First Chinese Office Action dated Sep. 27, 2020, and English translations of the aforesaid documents, for Chinese Application No. 201780086186.9, filed Aug. 19, 2019. Chinese Application No. 201780086186.9 is a national phase application of PCT International Application No. PCT/US2017/064500, filed Dec. 4, 2017. PCT International Application No. PCT/US2017/064500 claims priority from U.S. Appl. No. 15/374,207, filed Dec. 9, 2016, issued as U.S. Pat. No. 10,040,211, on Aug. 7, 2018. The present application claims priority from U.S. Appl. No. 15/374,207. (13 pages).

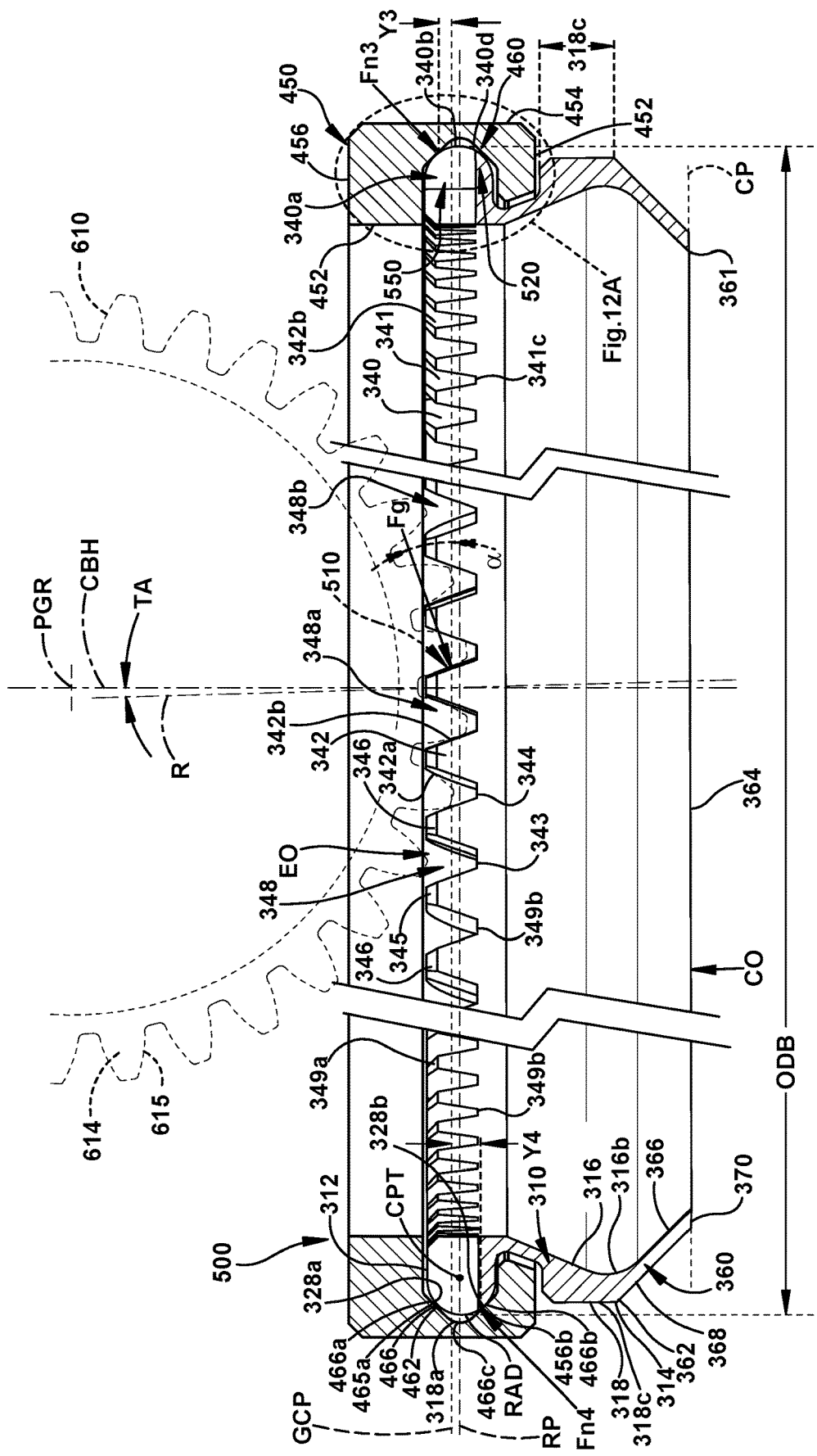

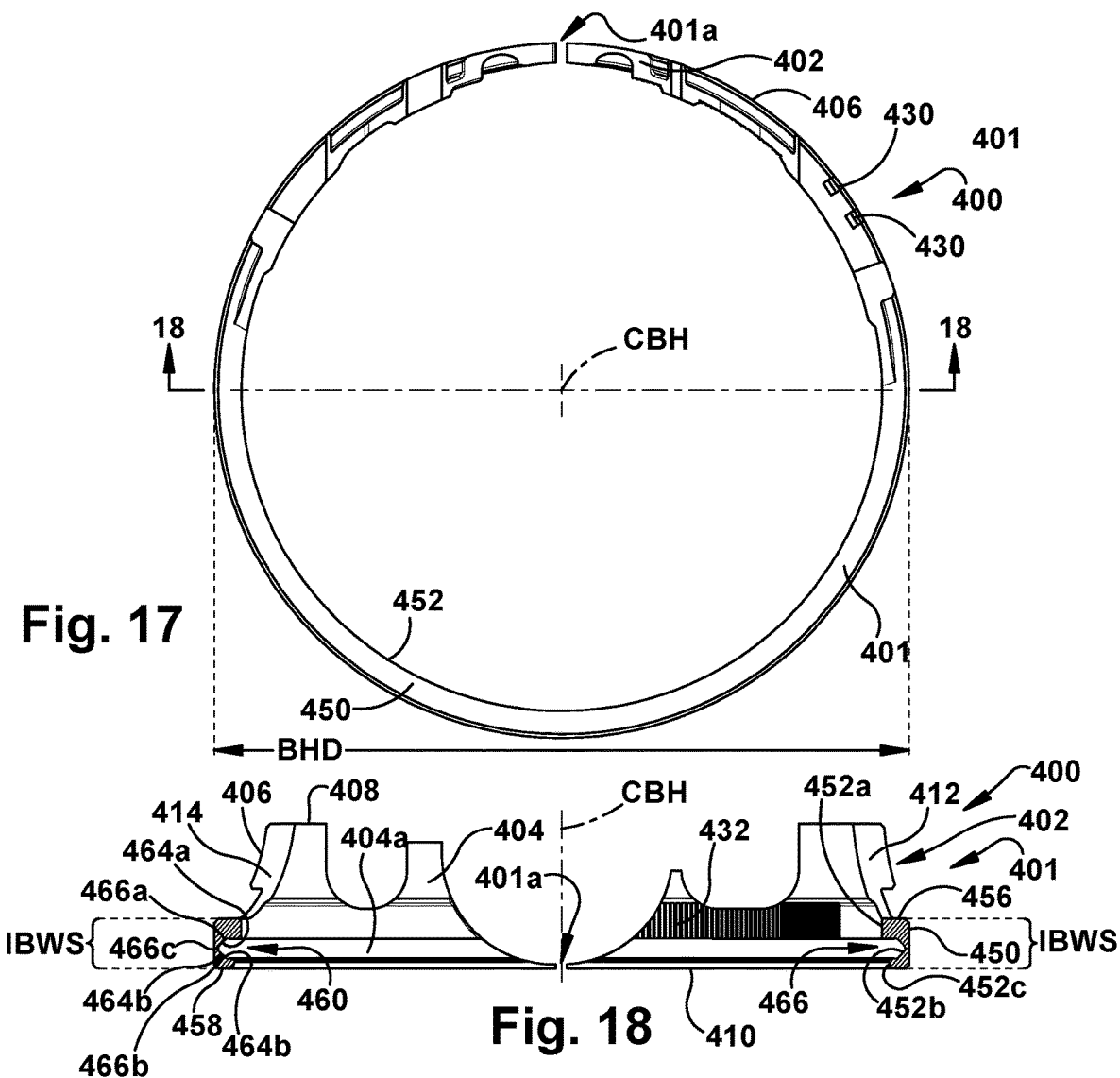
Fig. 17
Fig. 18
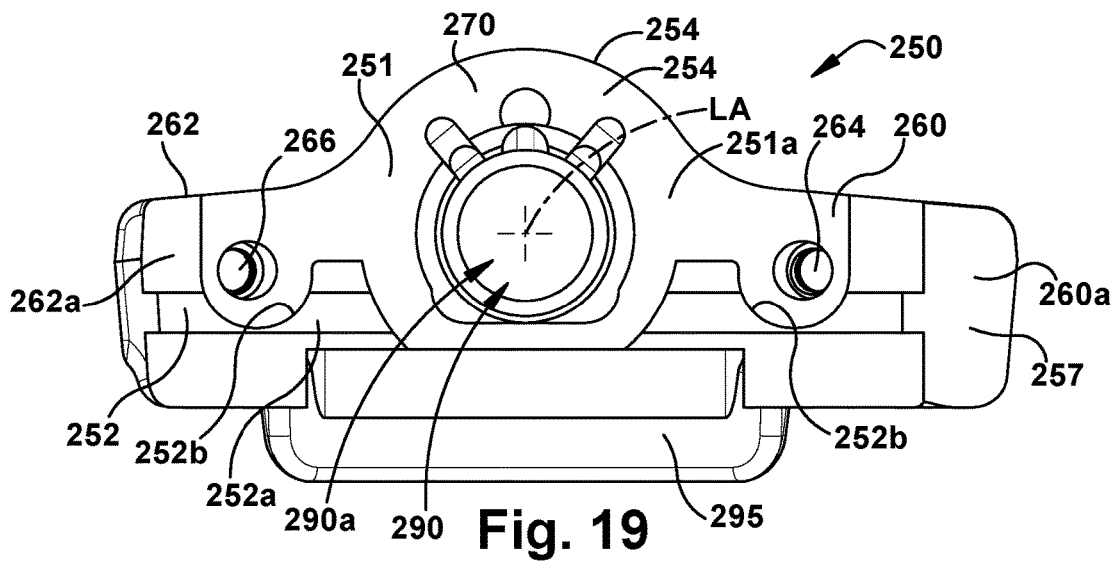
Fig. 19

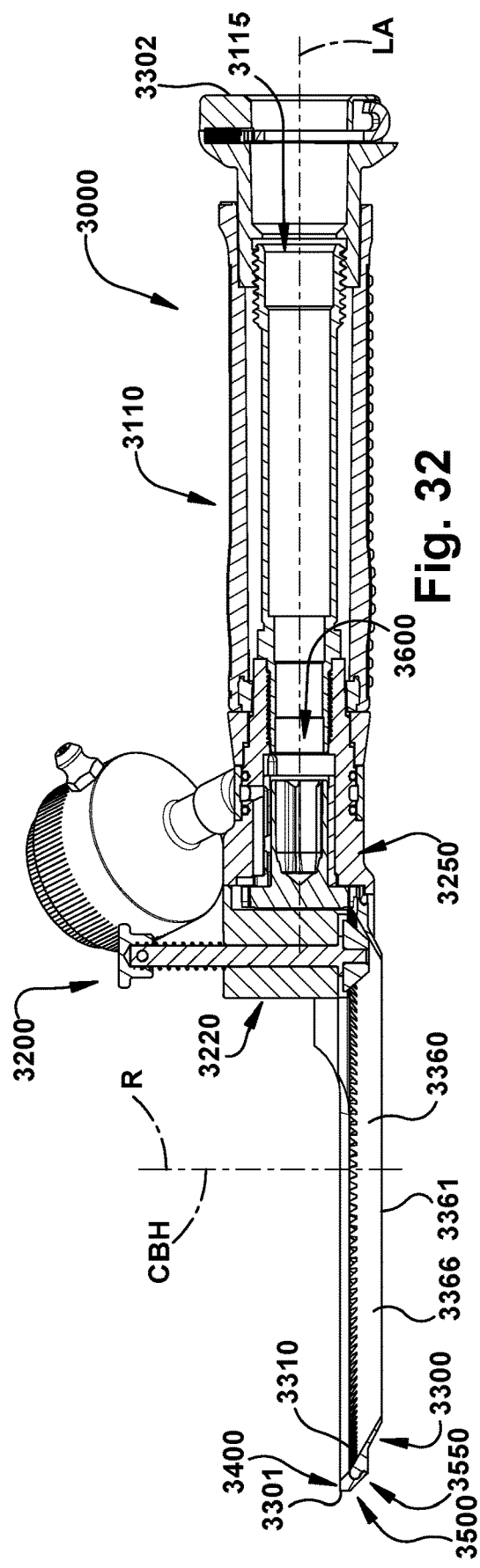
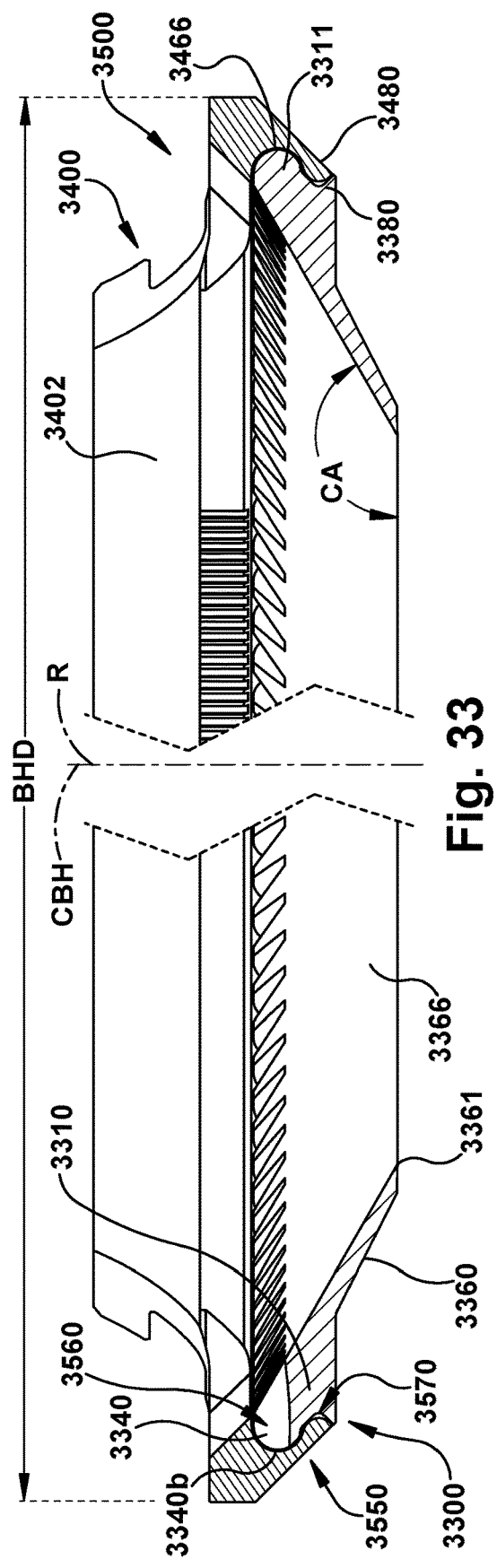
Fig. 32
Fig. 33

POWER OPERATED ROTARY KNIFE

CROSS-REFERENCE TO RELATED APPLICATIONS

This application claims priority under 35 USC 120 as a continuation application of co-pending U.S. application Ser. No. 17/210,024, filed Mar. 23, 2021, published as U.S. Pub. No. US 2021/0206011 A1 on Jul. 8, 2021, to be issued as U.S. Pat. No. 11,597,113 on Mar. 7, 2023, which is a continuation application of U.S. application Ser. No. 16/736,439, filed Jan. 7, 2020, published as U.S. Pub. No. US 2020/0147817 A1 on May 14, 2020, issued as U.S. Pat. No. 10,960,564 on Mar. 30, 2021, which is a continuation application of U.S. application Ser. No. 16/050,931, filed Jul. 31, 2018, published as U.S. Pub. No. US 2018/0333880 A1 on Nov. 22, 2018, issued as U.S. Pat. No. 10,532,478 on Jan. 14, 2020, which is a continuation application of U.S. application Ser. No. 15/374,207, filed Dec. 9, 2016, published as U.S. Pub. No. US 2018/0162001 A1 on Jun. 14, 2018, issued as U.S. Pat. No. 10,040,211 on Aug. 7, 2018. The respective entire contents of the above-identified U.S. application Ser. Nos. 17/210,024, 16/736,439, 16/050,931 and 15/374,207, U.S. Publication Nos. US 2021/0206011 A1, US 2020/0147817 A1, US 2018/0333880 A1 and US 2018/0162001 A1, and U.S. Pat. Nos. 11,597,113, 10,960,564, 10,532,478 and 10,040,211, are incorporated by reference herein in their respective entireties for any and all purposes.

TECHNICAL FIELD

The present disclosure relates to a hand held, power operated rotary knife.

BACKGROUND

Hand held, power operated rotary knives are widely used in meat processing facilities for meat cutting and trimming operations. Power operated rotary knives also have application in a variety of other industries where cutting and/or trimming operations need to be performed quickly and with less effort than would be the case if traditional manual cutting or trimming tools were used, e.g., long knives, scissors, nippers, etc. By way of example, power operated rotary knives may be effectively utilized for such diverse tasks as tissue harvesting or recovery, debriding/removal of skin tissue, bone tissue, tendon/ligament harvesting from human or animal tissue donors for medical purposes. Power operated rotary knives may also be used for taxidermy and for cutting and trimming of elastomeric or urethane foam for a variety of applications including vehicle seats.

Power operated rotary knives typically include a handle assembly and a head assembly attachable to the handle assembly. The head assembly includes an annular blade housing and an annular rotary knife blade supported for rotation by the blade housing. The annular rotary blade of conventional power operated rotary knives is typically rotated by a drive assembly which include a flexible shaft drive assembly extending through an opening in the handle assembly. The shaft drive assembly engages and rotates a pinion gear supported by the head assembly. The flexible shaft drive assembly includes a stationary outer sheath and a rotatable interior drive shaft which is driven by a pneumatic or electric motor. Gear teeth of the pinion gear engage mating gear teeth formed on an upper surface of the rotary knife blade.

Upon rotation of the pinion gear by the drive shaft of the flexible shaft drive assembly, the annular rotary blade rotates within the blade housing at a high RPM, on the order of 900-1900 RPM, depending on the structure and characteristics of the drive assembly including the motor, the shaft drive assembly, and a diameter and the number of gear teeth formed on the rotary knife blade. Power operated rotary knives are disclosed in U.S. Pat. No. 6,354,949 to Baris et al., U.S. Pat. No. 6,751,872 to Whited et al., U.S. Pat. No. 6,769,184 to Whited, U.S. Pat. No. 6,978,548 to Whited et al., U.S. Pat. No. 8,448,340 to Whited, and U.S. Pat. No. 8,726,524 to Whited et al., all of which are assigned to the assignee of the present invention and all of which are incorporated herein in their respective entireties by reference.

SUMMARY

In one aspect, the present disclosure relates an annular rotary knife blade for rotation about a central axis of rotation in a power operated rotary knife, the annular rotary knife blade comprising: a body and a blade section extending from the body, the body and the blade section being radially centered about the central axis of rotation; the body including a first end and a second end spaced axially below the first end and an inner wall and an outer wall spaced radially apart, the outer wall of the body including an arcuate surface extending from an upper end portion through an intermediate portion to a lower end portion, the upper end portion of the arcuate surface being axially closer to the first end of the body than the intermediate portion and the lower end portion and the lower end portion of the arcuate surface being axially closer to the second end of the body than the intermediate portion and the upper end portion, the arcuate surface being convex radially outward with respect to the central axis of rotation, the arcuate surface including an upper region extending between the upper end portion and the intermediate portion and a lower region extending between the intermediate portion to the lower end portion; the body further including a driven gear having an upper end and an axially spaced apart lower end and comprising a plurality of gear teeth, the plurality of gear teeth of the driven gear extending axially downwardly from the first end of the body and extending radially through the outer wall of the body, the plurality of gear teeth including outer surfaces comprising at least a part of the upper region of the arcuate surface; the outer wall of the body further including a bearing surface for rotatably supporting the annular rotary knife blade for rotation about the central axis of rotation, the bearing surface including an upper bearing face in the upper region of the arcuate surface and a lower bearing face in the lower region of the arcuate surface, the outer surfaces of the plurality of gear teeth comprising at least a part of the upper bearing face of the bearing surface; and the blade section extending from the second end of the body.

In another aspect, the present disclosure relates to an annular rotary knife blade for rotation about a central axis of rotation in a power operated rotary knife, the annular rotary knife blade comprising: a body and a blade section extending from the body, the body and the blade section being radially centered about the central axis of rotation; the body including a first end and a second end spaced axially below the first end and an inner wall and an outer wall spaced radially apart, the outer wall of the body including an arcuate surface extending from an upper end portion through an intermediate portion to a lower end portion, the upper end portion of the arcuate surface being axially closer to the first end of the body than the intermediate portion and the lower end portion and the lower end portion of the arcuate surface being axially closer to the second end of the body than the intermediate portion and first upper end portion, the arcuate surface being convex radially outward with respect to the central axis of rotation, the arcuate surface including an upper region extending between the upper end portion and the intermediate portion and a lower region extending between the intermediate portion and the lower end portion; the body further including a driven gear having an upper end and an axially spaced apart lower end and comprising a plurality of gear teeth, the plurality of gear teeth of the driven gear extending axially downwardly from the first end of the body and extending radially through the outer wall of the body, each of the plurality of gear teeth including an outer surface, the plurality of gear teeth including outer surfaces comprising at least a part of the upper region of the arcuate surface and at least a part of the lower region of the arcuate surface; the outer wall of the body further including a bearing surface for rotatably supporting the annular rotary knife blade for rotation about the central axis of rotation, the bearing surface including an upper bearing face in the upper region of the arcuate surface and a lower bearing face in the lower region of the arcuate surface, the outer surfaces of the plurality of gear teeth comprising at least a part of the upper bearing face of the bearing surface and at least a part of the lower bearing face of the bearing surface; and the blade section extending from the second end of the body.

In another aspect, the present invention relates to an annular rotary knife blade for rotation about a central axis of rotation in a power operated rotary knife, the annular rotary knife blade comprising: a body and a blade section extending from the body, the body and the blade section being radially centered about the central axis of rotation; the body including a first end and a second end spaced axially below the first end and an inner wall and an outer wall spaced radially apart, the outer wall of the body including a first arcuate surface convex radially outward with respect to the central axis of rotation and extending from an upper end portion through an intermediate portion defining a radially outermost extent of the body to a lower end portion, the upper end portion of the first arcuate surface being axially closer to the first end of the body than the intermediate portion and the lower end portion and the lower end portion of the first arcuate surface being axially closer to the second end of the body than the intermediate portion and the upper end portion, the first arcuate surface including an upper region extending between the upper end portion and the intermediate portion and a lower region extending between the intermediate portion and the lower end portion; the outer wall of the body further including a bearing race concave radially inward with respect to the central axis of rotation, the bearing race being closer to the second end of the body than the first arcuate surface and extending from an upper end portion through an intermediate portion to a lower end portion, the upper end portion of the bearing race being axially closer to the first end of the body than the intermediate portion and the lower end portion and the lower end portion of the bearing race being axially closer to the second end of the body than the intermediate portion and the upper end portion, an upper region of the bearing race extending between the upper end portion and the intermediate portion and a lower region of the bearing race extending between the intermediate portion and the lower end portion; the body further including a driven gear having an upper end and an axially spaced apart lower end and comprising a plurality of gear teeth, the plurality of gear teeth of the driven gear extending axially downwardly from the first end of the body and extending radially through the outer wall of the body, each of the plurality of gear teeth including an outer surface, the plurality of gear teeth including outer surfaces comprising at least a part of the upper region of the first arcuate surface; the outer wall of the body further including a first bearing surface and a second bearing surface for rotatably supporting the annular rotary knife blade for rotation about the central axis of rotation, the first bearing surface including an upper bearing face in the upper region of the first arcuate surface and a lower bearing face in the lower region of the first arcuate surface and the second bearing surface including an upper bearing face in the upper region of the bearing race and a lower bearing face in the lower region of the bearing race, the outer surfaces of the plurality of gear teeth comprising at least a part of the upper bearing face of the first bearing surface; and the blade section extending from the second end of the body.

BRIEF DESCRIPTION OF THE DRAWINGS

The foregoing and other features and advantages of the present disclosure will become apparent to one skilled in the art to which the present disclosure relates upon consideration of the following description of the disclosure with reference to the accompanying drawings, wherein like reference numerals, unless otherwise described refer to like parts throughout the drawings and in which:

FIG. 12 is a schematic vertical section view of the assembled combination of the annular rotary knife blade and the annular blade housing of the head assembly of the power operated rotary knife of FIG. 1, as seen from a plane indicate by the line 12-12 in FIG. 4, with a mounting section of the annular split ring blade housing removed for clarity and wherein a gear force Fg has been applied to a driven gear of the annular rotary knife blade by a pinion gear of a gear train of the head assembly of the power operated rotary knife;

FIG. 17 is a schematic top plan view of the annular split ring blade housing of the head assembly of the power operated rotary knife of FIG. 1;

FIG. 18 is a schematic section view of the annular split ring blade housing of FIG. 17, as seen from a plane indicated by the line 18-18 in FIG. 17;

FIG. 19 is a schematic front elevation view of a frame body of the head assembly of the power operated rotary knife of FIG. 1;

FIG. 32 is a schematic vertical section view taken along the longitudinal axis of the handle assembly of the power operated rotary knife of FIG. 31;

FIG. 33 is a schematic vertical section view of the assembled combination of the rotary knife blade and the annular split ring blade housing of the head assembly of the power operated rotary knife of FIG. 31;

DETAILED DESCRIPTION

First Embodiment—Power Operated Rotary Knife 100

Overview

Figure 1:
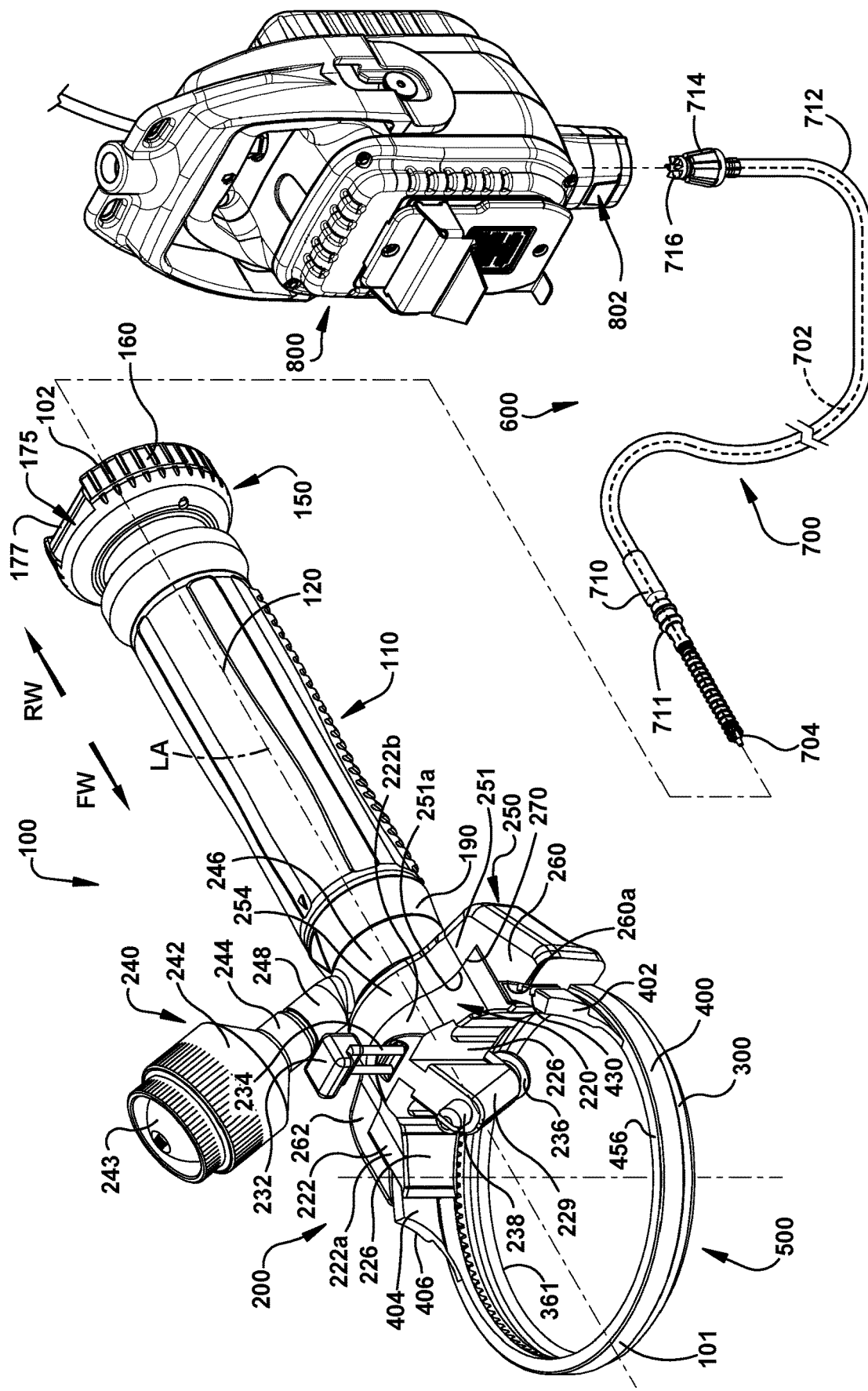
FIG. 1 is a schematic front perspective view of a first exemplary embodiment of a hand held, power operated rotary knife of the present disclosure including a head assembly, a handle assembly and a drive mechanism, the head assembly including a frame body and an assembled combination of an annular rotary knife blade and an annular split ring blade housing.
Figure 2:
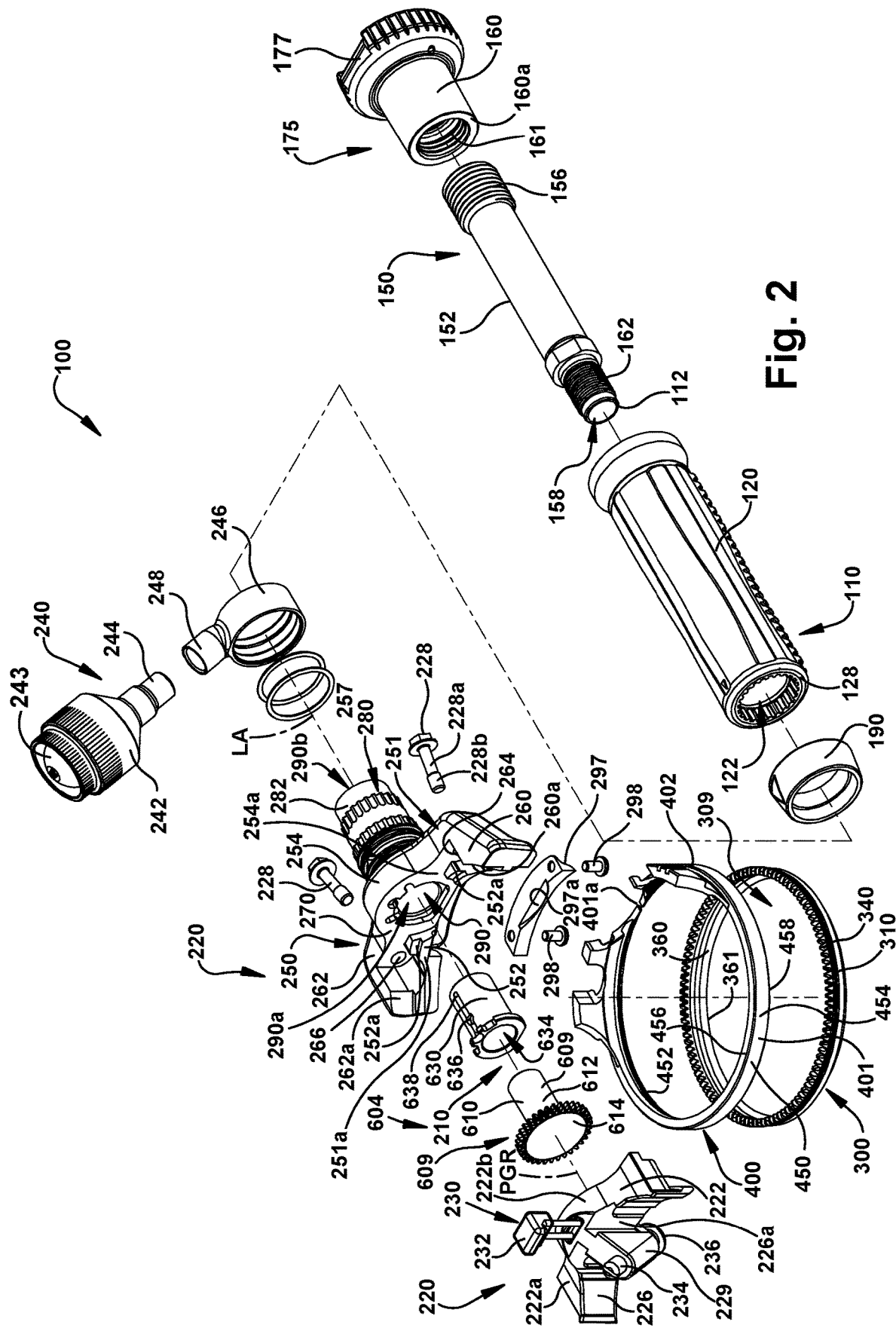
FIG. 2 is a schematic exploded front perspective view of the power operated rotary knife of FIG. 1.
Figure 3:
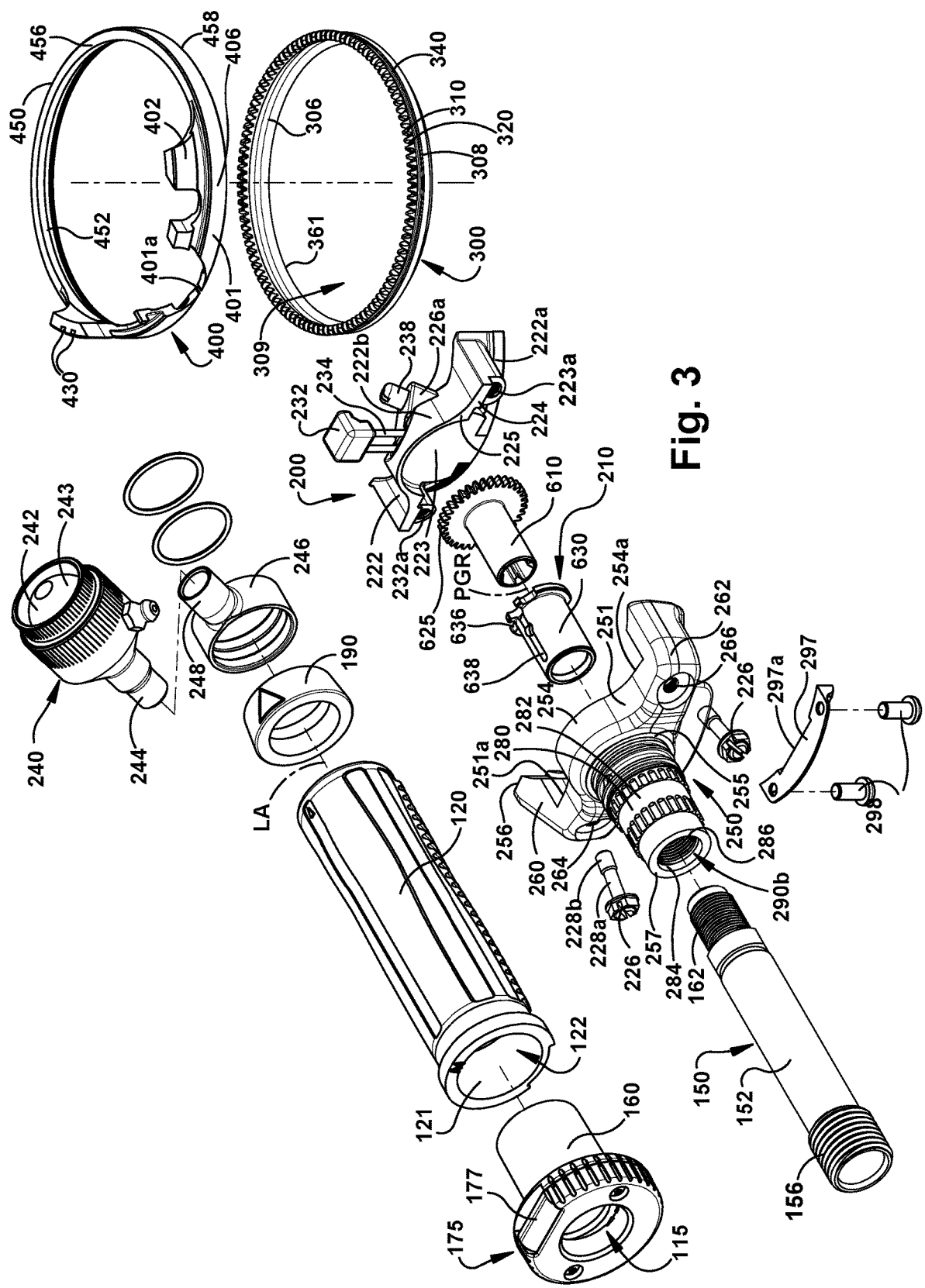
FIG. 3 is a schematic exploded rear perspective view of the power operated rotary knife of FIG. 1.

A hand held, power operated rotary knife of a first exemplary embodiment of the present disclosure is shown generally at 100 in FIGS. 1-10. The power operated rotary knife 100 comprises an elongated handle assembly 110 and a head assembly or head portion 200, removably coupled to a forward or distal end 112 of the handle assembly 110. As best seen in FIGS. 1-3, the handle assembly 110 includes a generally cylindrical hand piece 120 which is grasped and manipulated by an operator to position the head assembly 200 of the power operated rotary knife 100 with respect to a work product for engaging in cutting and trimming operations on the work product. The elongated handle assembly 110 extends along a longitudinal axis LA 110 and includes a longitudinally extending throughbore 115, the longitudinal axis LA extending through a center of the throughbore 115.

As best seen in FIGS. 1-3, the head assembly 200 of the power operated rotary knife 100 includes an annular rotary knife blade 300 (FIGS. 11-46) supported for rotation about the blade's central axis of rotation R by an annular split ring blade housing 400 (FIGS. 17-18). The rotary knife blade 300 includes a cutting edge 361 at a lower end 304 of the blade 300. The blade cutting edge 361. When brought into contact with a workpiece (a product to be cut or trimmed), cuts into the workpiece or product, as the operator manipulates the hand piece 120 to move the power operated rotary knife 100 with respect to the product to perform a cutting or trimming operation. The longitudinal axis LA of the handle assembly 110 is orthogonal to and intersects the central axis of rotation R of the rotary knife blade 300. Motive power to drive the rotary knife blade 300 about the central axis of rotation R is provided by a drive mechanism 600 of the power operated rotary knife 100. The annular blade housing 400 includes a mounting section 402 and a blade support section 450 for rotatably supporting the rotary knife blade 300. The annular blade housing 400 comprises a split ring 401 defining an axially extending central axis or center line CBH of the blade housing 400. The blade housing center line CBH is substantially coincident with the central axis of rotation R of the rotary knife blade 300. That is, both the rotary knife blade 300 and the annular blade housing 400 are centered about the blade central axis of rotation R. The blade housing 400 includes a peripheral split 401a to allow for expansion of a blade housing diameter for insertion and removal of the annular rotary knife blade 300. The mounting section 402 of the blade housing 400 is releasably secured to a frame body 250 of the head assembly 200 by a clamping assembly 220 to support an assembled combination 500 of the blade housing 400 and the rotary knife blade 300. Specifically, the mounting section 402 is sandwiched or affixed between a rearward facing or proximal clamping surface 224 of a rear wall 223 of a clamp body 222 of the clamping assembly 220 and a blade housing seating region 252a defined by an arcuate mounting pedestal 252 of a forward or distal portion 251 of the frame body 250. While the annular rotary knife blade 300 and the blade support section 450 of the annular blade housing 400 extend circumferentially substantially 360° centered about the central axis of rotation R and the blade housing center line CBH, a circumferential cutting region CR (shown schematically in FIG. 4) of the power operated rotary knife 100 is less than 360°. The cutting region CR represents a circumferential extent of assembled combination 500 wherein cutting or trimming contact between the blade cutting edge 361 and a product or workpiece would properly occur such that a cut or trimmed portion of the product moves smoothly along an inner wall 306 of the notary knife blade 300 through an interior region 309 of the blade 300 from a cutting opening CO defined by the blade cutting edge 361 to an exit opening EO at an upper end 302 of the blade 300. The circumferential extent of the cutting region CR depends among other things on a circumferential extent of the clamp body 222 and the configuration of the blade housing mounting section 402. In the assembled combination 500, the circumferential extent of the cutting region CR is somewhat greater than 180° of the total 360° circumference.

The frame body 250 (FIGS. 19-20) extends between a distal end 256, defined by a forward wall 251a of the forward portion 251, and a proximal end 257, defined by a rearward portion 280 of the frame body 250. The forward portion 251 of the frame body 250 includes a central cylindrical region 254 and a pair of arcuate arms 260, 262 extending laterally from opposite sides of the central cylindrical region 254. The frame body 250 also includes the rearward portion 280 extending in a rearward direction RW from a proximal end 255 of the central cylindrical region 254. The rearward portion 280 of the frame body 250 comprises an annular boss 282 which provides a coupling structure for coupling the frame body 250 and, therefore, the head assembly 200, to the handle assembly 110 and additionally provides a support structure for a lubrication assembly 240 of the head assembly 200 which provides a source of lubrication that is routed to the driven gear interface region 510 and the blade-blade housing bearing interface region 520.

As best seen in FIGS. 11-16, the annular rotary knife blade 300 includes a body 310 and a blade section 360 extending from a lower end or second end 314 of the body 310. The body 310 of the rotary knife blade 300 includes a driven gear 340 comprising a plurality of gear teeth or a set of gear teeth 341 that extend radially between and through an inner wall 316 and an outer wall 318 of the body 310 adjacent an upper or first end 312 of the body 310. The driven gear 340 defines a driven gear region 340a of the body 310 of the rotary knife blade 300. In one exemplary embodiment, the driven gear 340 is a ring gear and specifically a face gear. An axial extent of the driven gear 340 along the outer wall 318 of the body 310 comprises an outer surface 340b of the driven gear 340 and the driven gear region 340a. The driven gear 340 of the rotary knife blade 300 is engaged by a gear train 604 of the drive mechanism 600 of the power operated rotary knife 100 to rotate the rotary knife blade 300 about its central axis of rotation R. In one exemplary embodiment, the driven gear 340, that is, a ring gear, is rotatably driven by a mating pinion gear 610 of the gear train 604 of the drive mechanism to form a face gear drive configuration.

Figure 15:
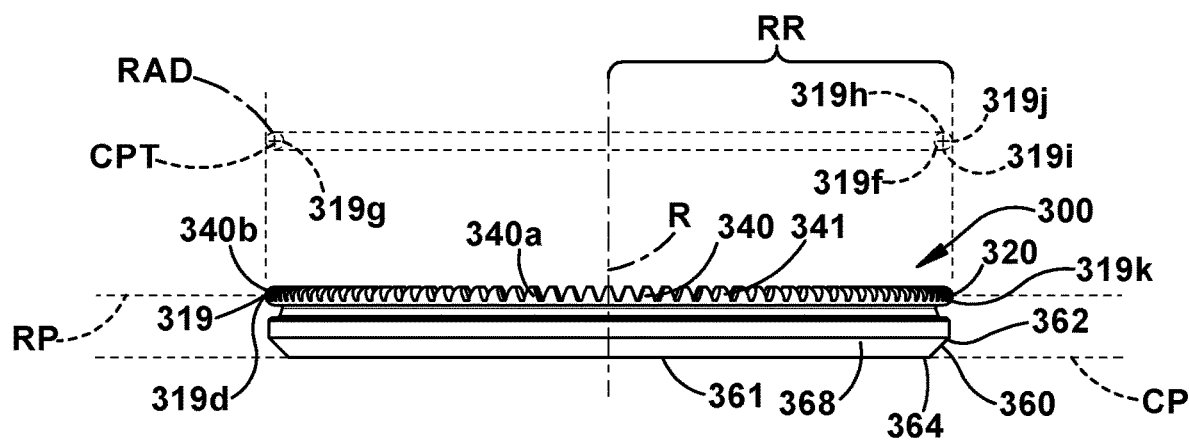
FIG. 15 is a schematic front plan view of the annular rotary knife blade of FIG. 13.
Figure 16:
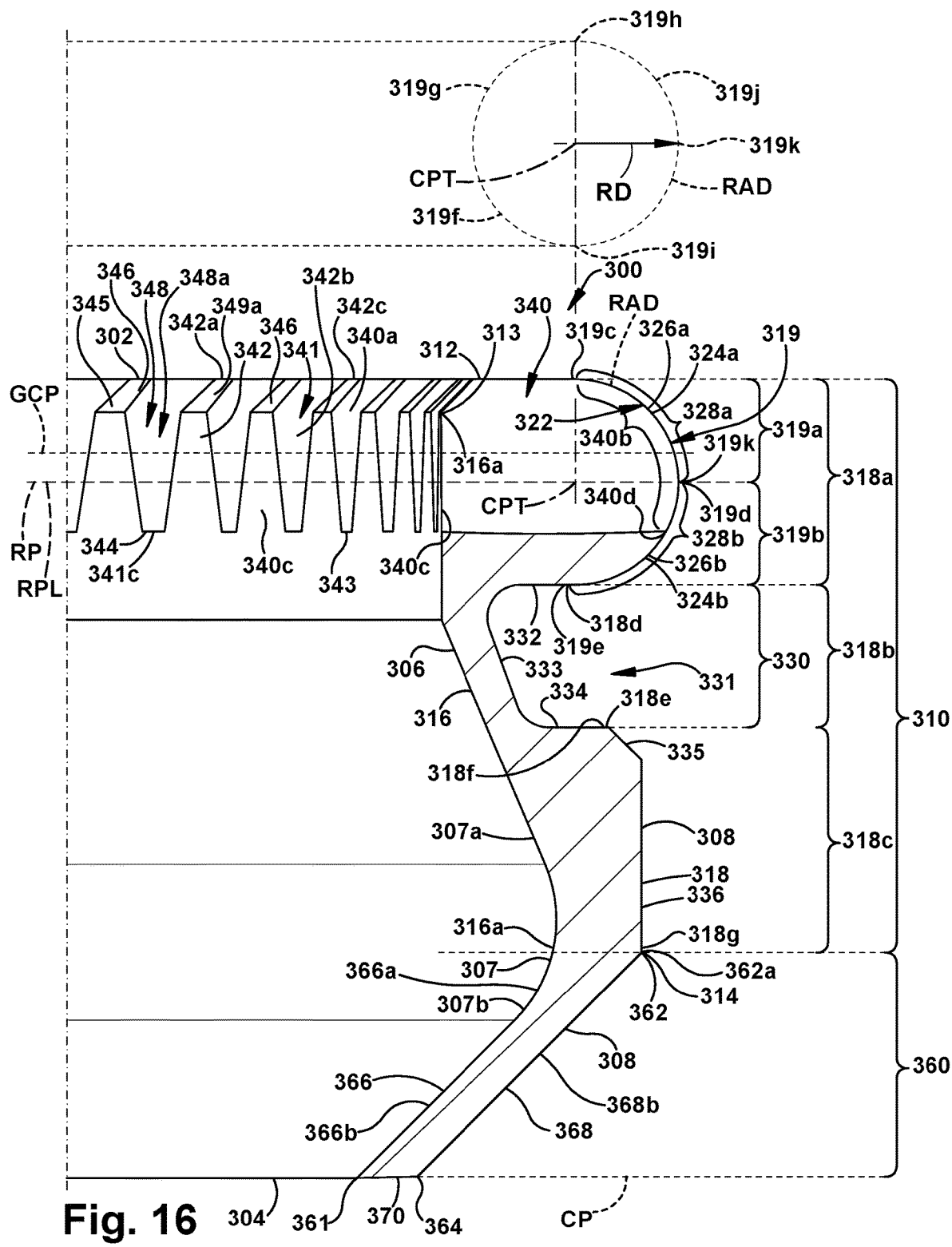
FIG. 16 is a schematic enlarged section view of a portion of the annular rotary knife blade of FIG. 13, as seen from a plane indicated by the line 16-16 in FIG. 14.
Figure 20:
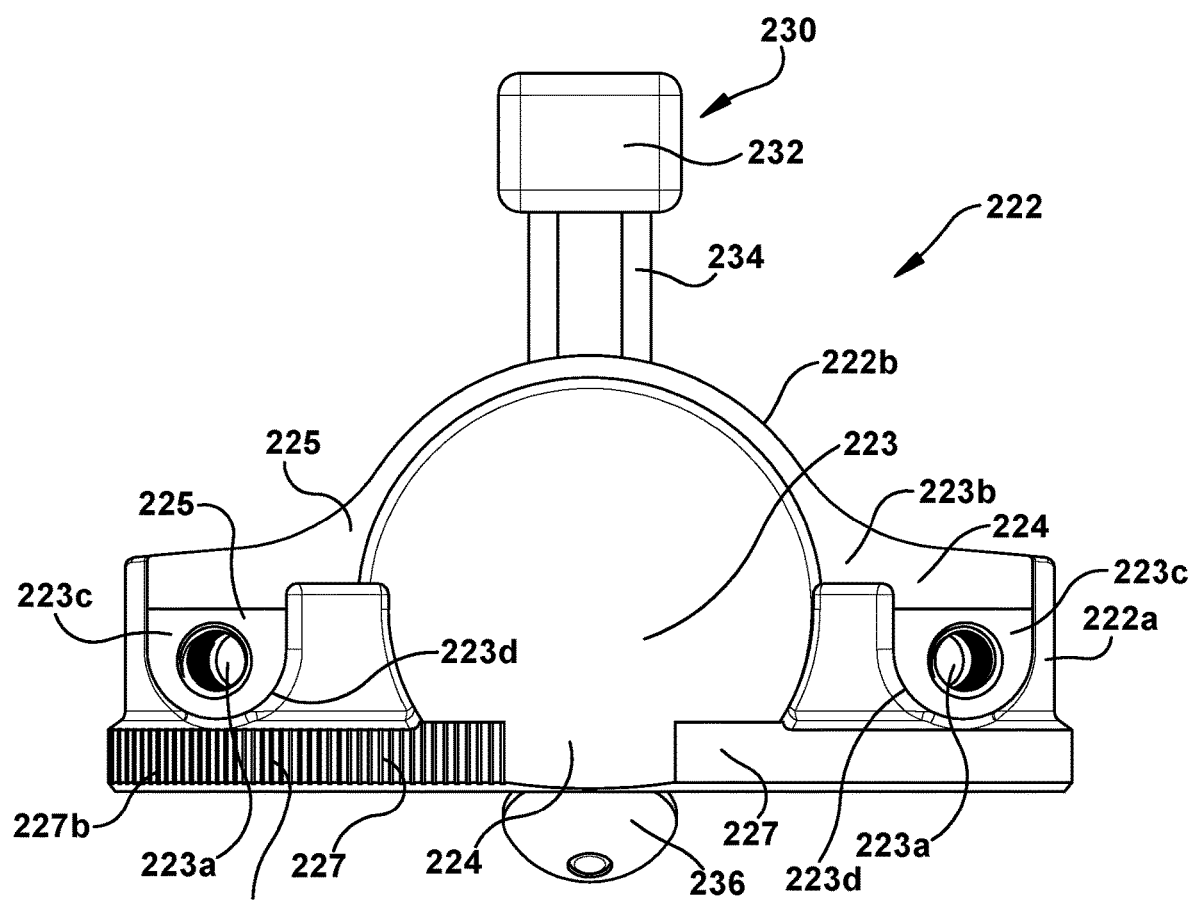
FIG. 20 is a schematic rear elevation view of a clamp member of the head assembly of the power operated rotary knife of FIG. 1.
Figure 21:
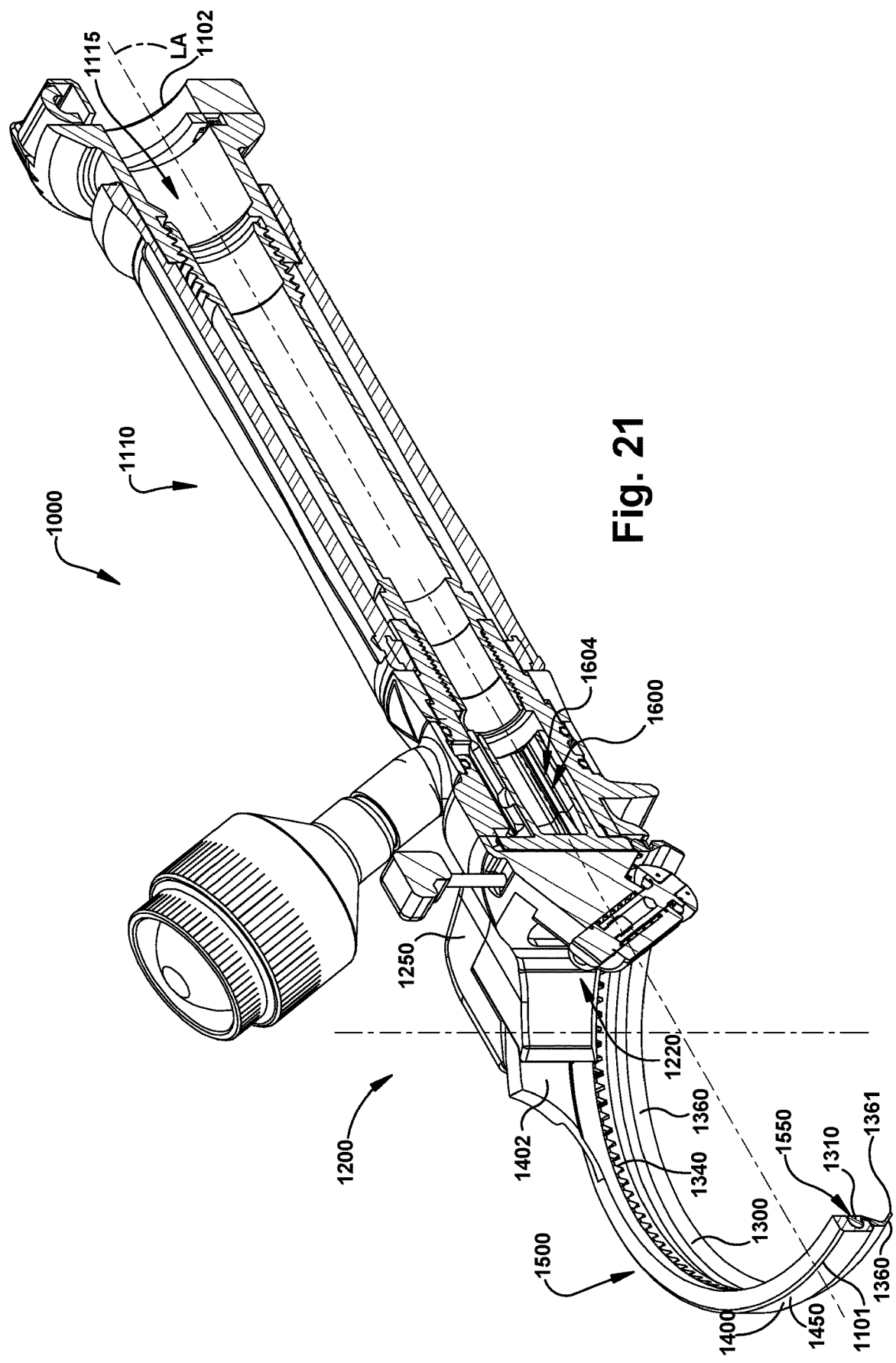
FIG. 21 is a schematic front perspective section view of a second exemplary embodiment of a power operated rotary knife of the present disclosure, including a head assembly, a handle assembly and a drive mechanism, the head assembly including a frame body and an assembled combination of an annular rotary knife blade and an annular split ring blade housing, the section view taken along a longitudinal axis of a handle assembly.
Figure 22:
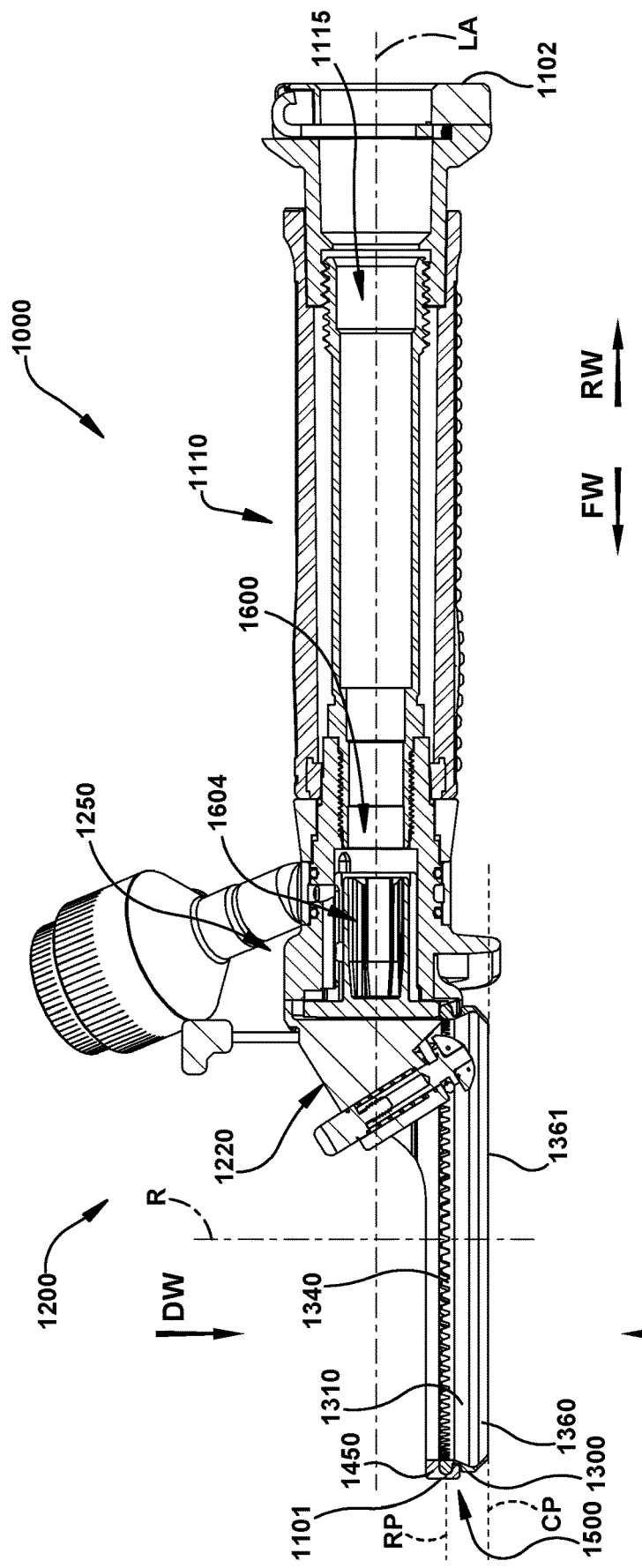
FIG. 22 is a schematic vertical section view taken along the longitudinal axis of the handle assembly of the power operated rotary knife of FIG. 21.
Figure 23:
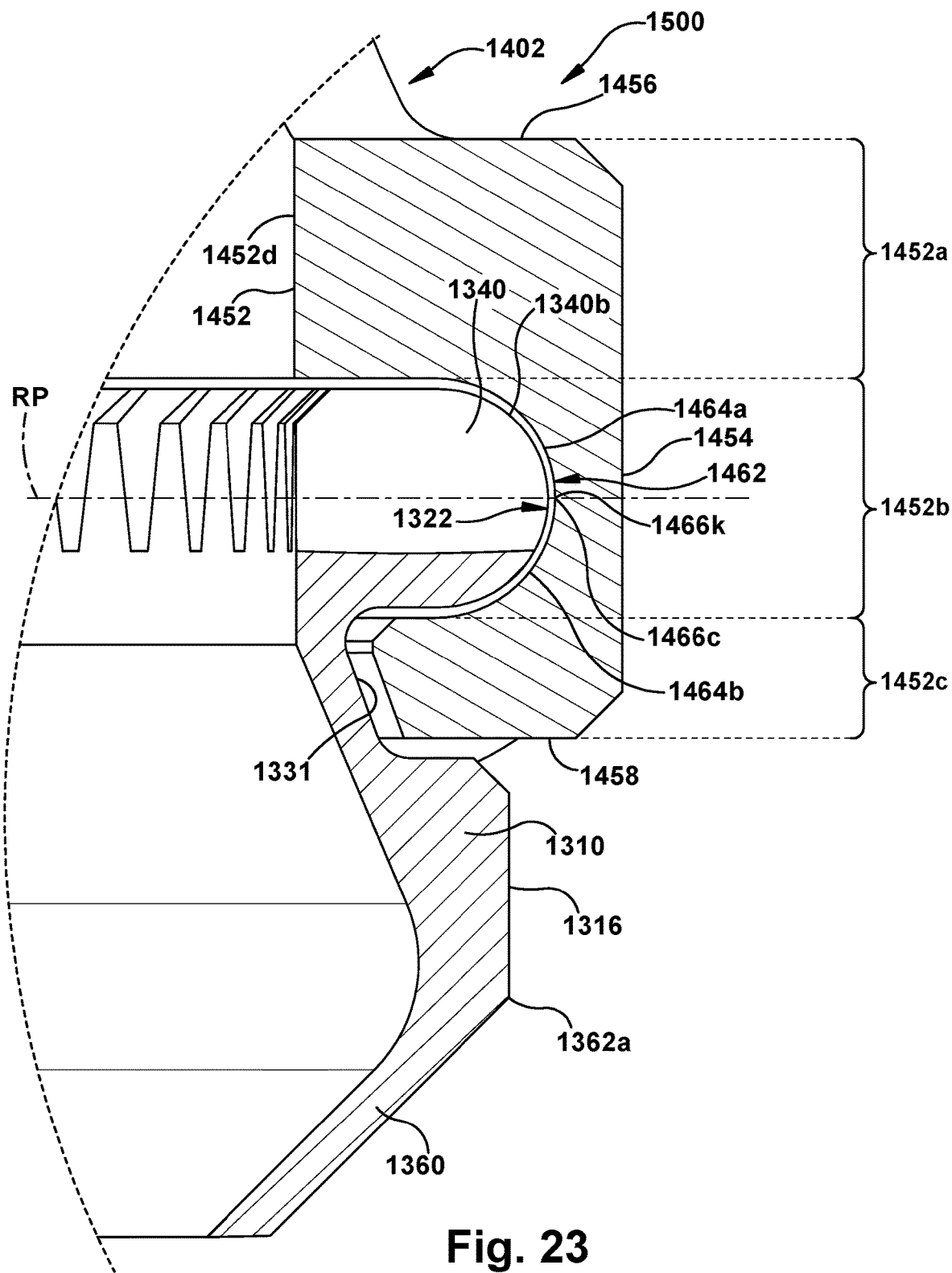
FIG. 23 is a schematic enlarged vertical section view of a portion of the assembled combination of the rotary knife blade and the annular blade housing of the head assembly of the power operated rotary knife of FIG. 21.

The outer wall 318 of the body 310 of the rotary knife blade 300 includes an arcuate surface 319 that extends from the upper or first end 312 of the body and is convex, with respect to the blade central axis of rotation R. By convex, it is meant that the convex arcuate surface 319 bows radially outwardly with respect to the blade central axis of rotation R and bows outwardly from an extent of, for example, the middle and lower portions 318b, 318c of the outer wall 318 of the body 310. The arcuate surface 319, when viewed in two dimensions, is characterized by a constant radius of curvature RAD. That is, as is depicted schematically in FIG. 12A, the arcuate surface 319, when viewed in two dimensions, is characterized by a radius line RD extending from a center of curvature or center point CPT to the arcuate surface 319, which defines the constant radius of curvature RAD of the arcuate surface 319. When the arcuate surface 319 is viewed in three dimensions, as schematically depicted in FIGS. 15 and 16, the arcuate surface 319 of the outer wall 318 of the body 310 may be considered as forming a portion of an outer surface of an imaginary ring 319f. Specifically, the imaginary ring 319f is annular and, when viewed in radial section, includes a circular cross section 319g (i.e., the annular ring 319*f* has the configuration of a bull's nose ring). As can be seen in FIG. 15, the ring 319*f* has a maximum radius RR (maximum ring radius) defined by a radial distance from the blade central axis of rotation R to a radial outermost location or vertex or midpoint location 319*k* of a second intermediate portion 319*d* of the arcuate surface 319. The midpoint location 319*k* defines a radially outermost extent of the arcuate surface 319 and, in one exemplary embodiment of the rotary knife blade 300, a radially outermost extent of the outer wall 318 of the rotary knife blade body 310.

Figure 11:
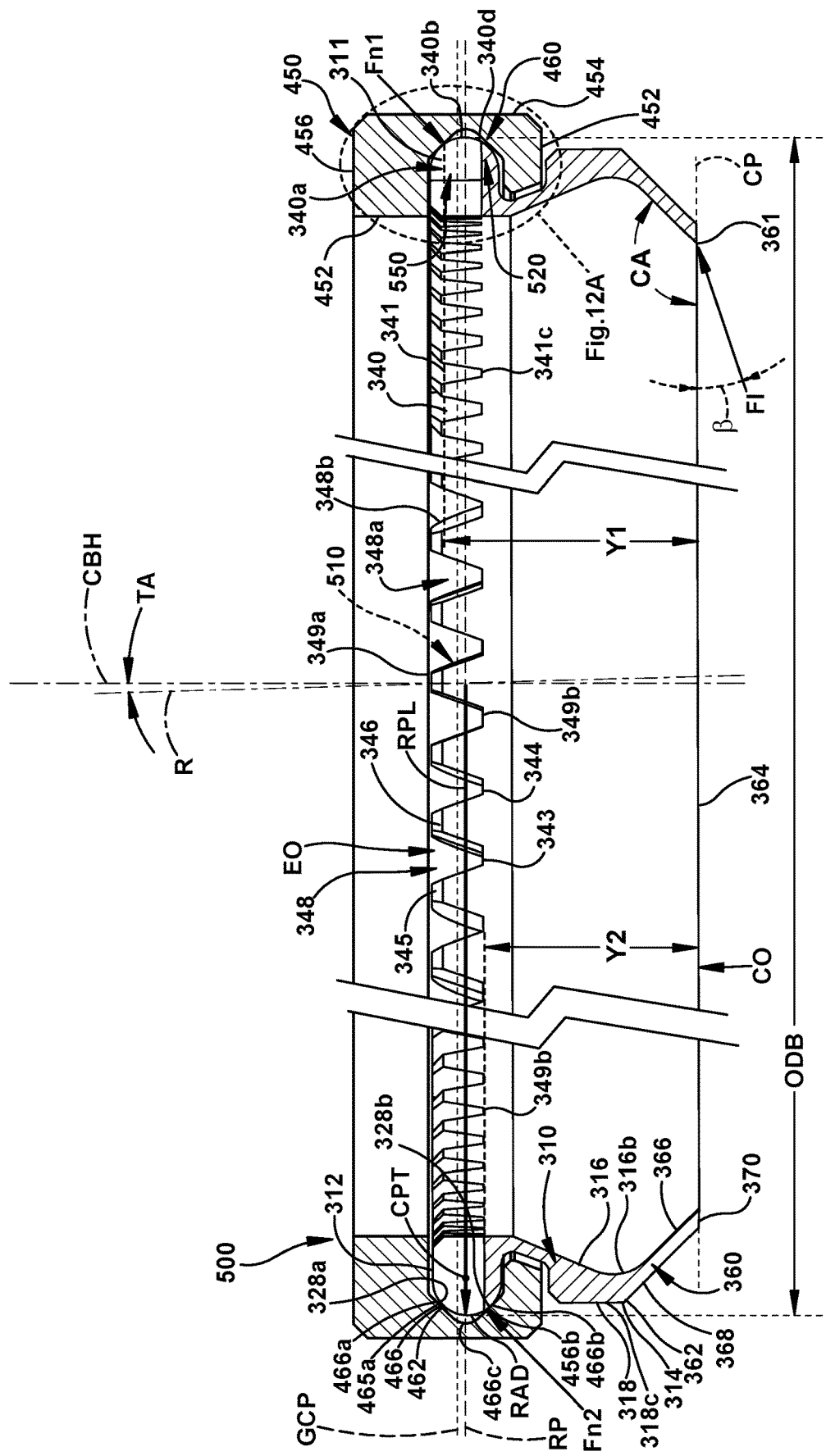
FIG. 11 a schematic vertical section view of the assembled combination of the annular rotary knife blade and the annular split ring blade housing of the head assembly of the power operated rotary knife of FIG. 1, wherein a load force Fl has been applied to a cutting edge of the annular rotary blade.
Figure 12A:
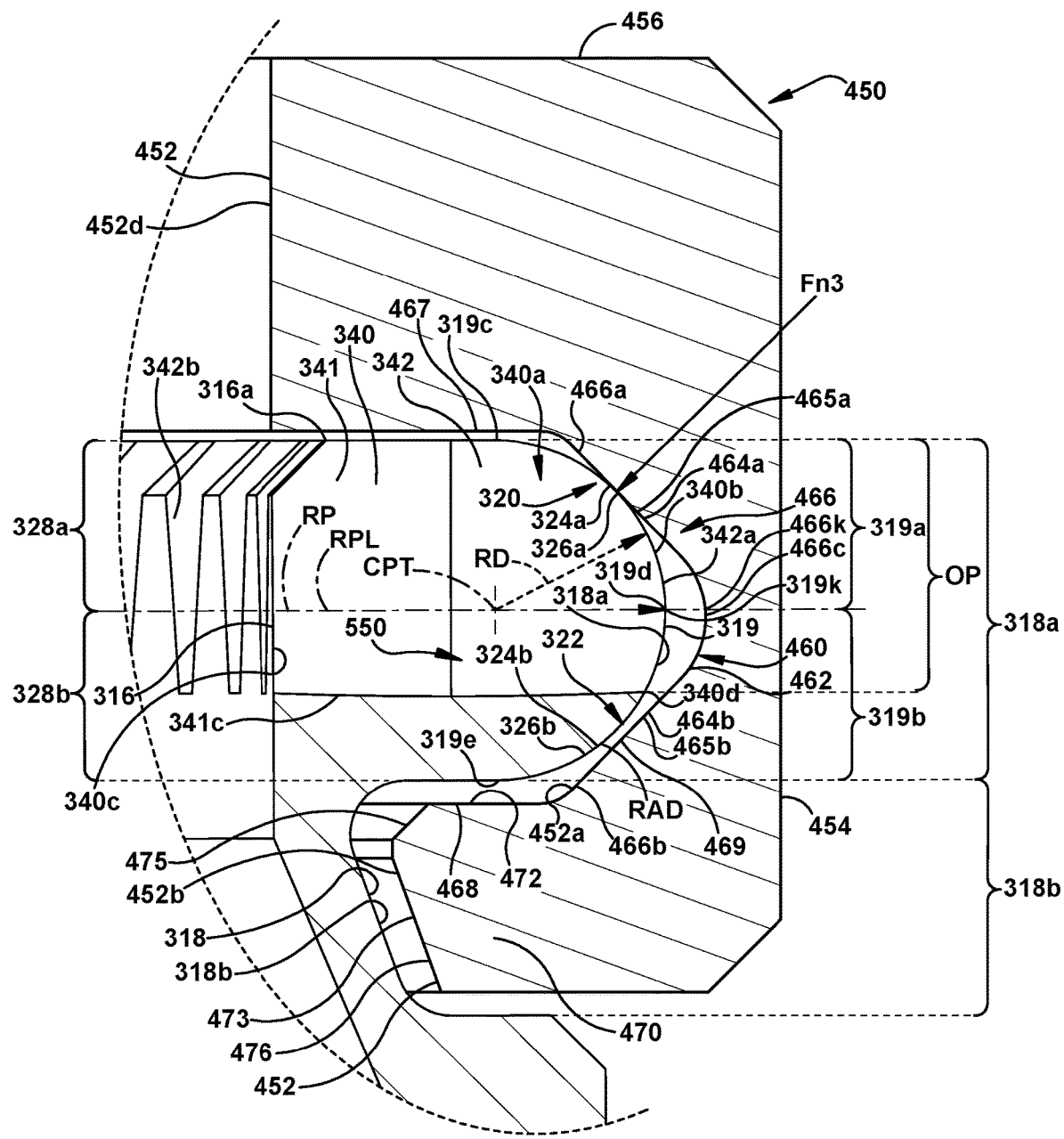
FIG. 12A is a schematic enlarged vertical section view of a portion of the assembled combination of the rotary knife blade and the annular blade housing of the head assembly of the power operated rotary knife of FIG. 1 within a dashed region labeled FIG. 12A in FIG. 12.
Figure 13:
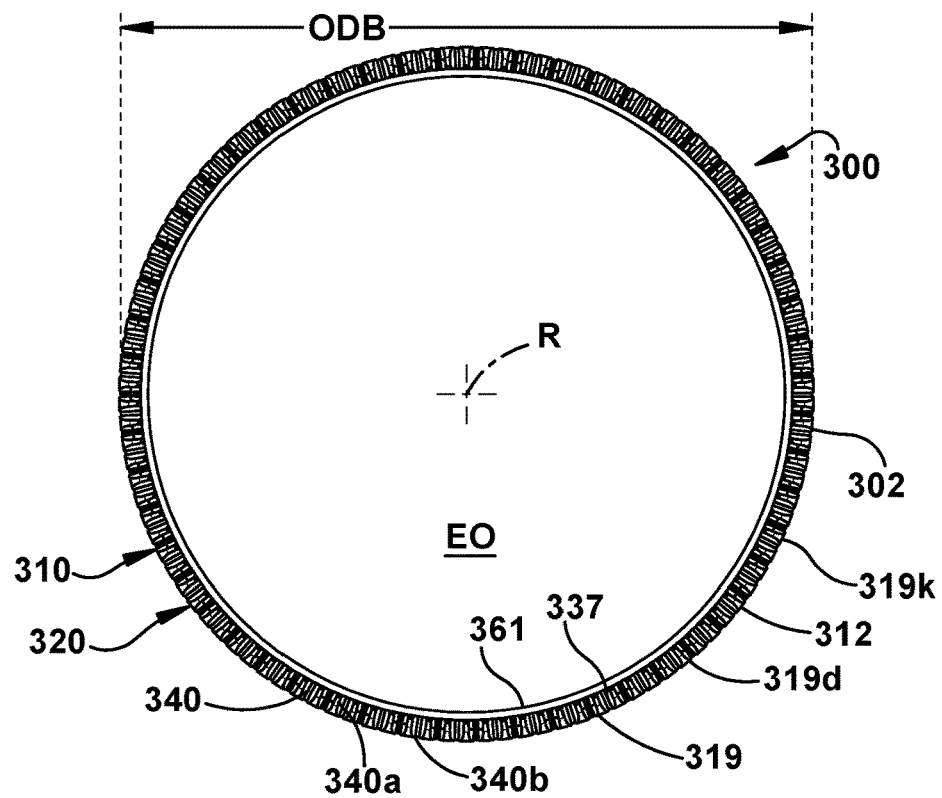
FIG. 13 is a schematic top plan view of the annular rotary knife blade of the head assembly of the power operated rotary knife of FIG. 1.
Figure 14:
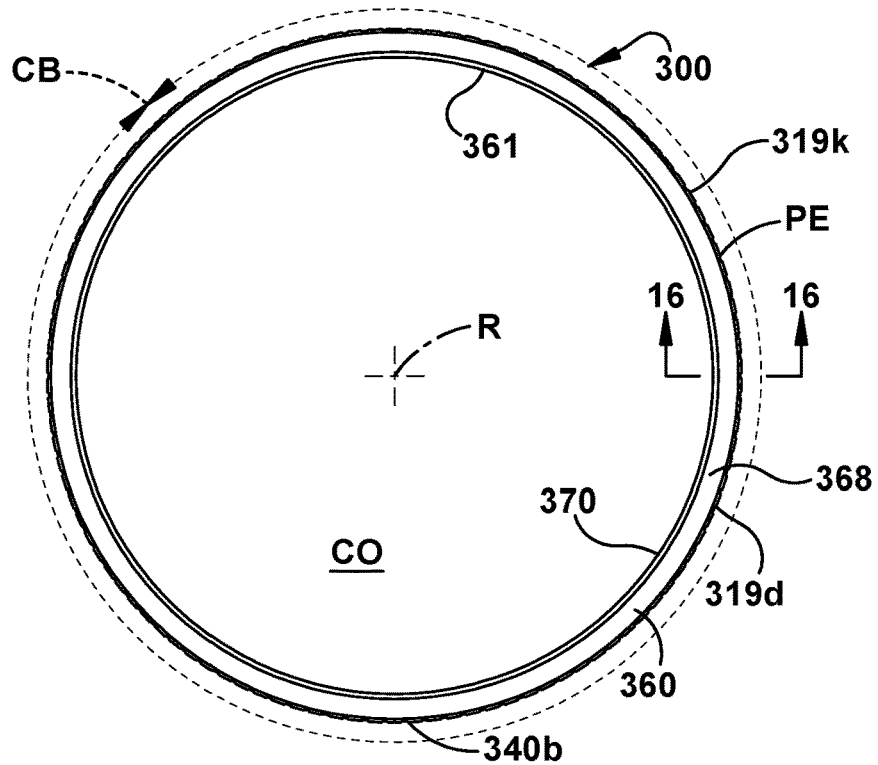
FIG. 14 is schematic bottom plan view of the annular rotary knife blade of FIG. 13.

With respect to the circular cross section 319*g* of the ring 319*f*, the circular cross section 319*g* is characterized by the radius RD (FIGS. 12A and 16). Which is equal to a distance between the center of curvature or center point CPT of the arcuate surface 319 and the second intermediate location or midpoint 319*k* of the arcuate surface 319. With respect to the circular cross section 319*g* of the imaginary ring 319*f*, the center point is CPT and the radius of curvature is RAD, since the circular cross section 319*g* of the ring 319*f* conforms and is coincident with the arcuate surface 319. Additionally, the rotational plane RP, when viewed in two dimensions, may be viewed as a horizontally extending radius line or straight line RPL (FIGS. 11 and 12A) that extends orthogonally from the blade central axis of rotation R and passes through the center point CPT of the arcuate surface 319 and also passes through midpoint location 319*k* of the intermediate portion 319*d* of the arcuate portion 319. In one exemplary embodiment, the arcuate surface 319 defines substantially a 180° extent of the circular cross section 319*g* extending from an upper end 319*h* of the circular cross section 319*g* to a lower end 319*i* of the circular cross section 319*g*. Advantageously, the arcuate surface 319 of the body outer wall 318 includes an entirety of the outer surface 340*b* of the driven gear 340 and also defines an entirety of an annular bearing surface 322 of the rotary knife blade 300. That is, the outer surface 340*b* of the driven gear 340 and the annular bearing surface 322 define overlapping portions of the arcuate surface 319 of the outer wall 318 of the body 310 of the rotary knife blade 300. Viewed another way, the arcuate surface 319, when viewed in three dimensions, may be viewed as a protruding bearing bead 311, defining a radially outwardly protruding portion of the outer wall 318 of the blade body 310. The bearing bead 311 comprises or includes both the outer surface 340*b* of the driven gear 340 and the annular, arcuate bearing surface 322 of the rotary knife blade 300. The bearing surface 322 of the bearing bead 311 is arcuate when viewed in vertical section (e.g., FIGS. 11, 12, 12A and 16) in two dimensions and, when viewed in three dimensions, extends around the entirety of the 360° of the circumference CB of the rotary knife blade 300 and therefore is annular. Hence the bearing surface 322 is both annular and arcuate. The 360° circumference CB of the annular blade 300 is best seen in FIGS. 13 and 14 and is schematically depicted as the dashed line labeled CB in FIG. 14 shown as encompassing the entirety of the 360° of the blade circumference CB, even though the dashed line CB is depicted as being radially spaced outwardly from the peripheral edge PE of the blade 360 for clarity purposes.

The body 310 of the rotary knife blade 300 also includes an annular hearing region 320 of the rotary knife blade 300 which engages a corresponding annular bearing region 460 of a blade support section 450 of the blade housing 400. The rotary knife blade 300 is held in position with respect to the blade housing 400 and is supported for rotation with respect to the blade housing 400 by a blade-blade housing bearing structure 550 (FIGS. 12 and 12A). The blade-blade housing bearing structure 550 includes the rotary knife blade annular bearing region 320, comprising a rotary knife blade bearing surface 322, which is part of the outer wall 318 of the body 310 and extends radially outwardly with respect to the blade central axis of rotation R, and the mating annular radially inwardly extending bearing region 460 of the blade housing 400, comprising a blade housing bearing surface 482, which constitutes and is part of an inner wall 452 of the blade support section 450 of the blade housing 400.

The annular bearing region 320 of the rotary knife blade 300 comprises the annular bearing surface 322, which extends along a portion of the outer wall 318 of the blade body 310. When viewed in axial section, the bearing surface 322 is arcuate. The outer wall 318 of the body 310 of the rotary knife blade 300 includes an arcuate surface 319 which is convex with respect to the blade central axis of rotation R and defines the radius of curvature RAD and the center of curvature or center point CPT. The arcuate surface 319 of the outer wall 318 includes a first upper region 319*a* and a second lower region 319*b*. The first upper region 319*a* of the arcuate surface 319 of the outer wall 318 of the blade body 310 extends from a first upper end portion 319*c*, through the second intermediate portion 319*d* and terminates at a third lower end portion 319*c*. The second intermediate portion 319*d* includes a radial outermost location or midpoint location 319*k* of the arcuate surface 319 which corresponds to a radially outermost extent of the rotary knife blade body 310 and a radially outermost extent of the arcuate portion 319. The arcuate bearing surface 322 of the rotary knife blade 300 includes an upper arcuate bearing surface or face 324*a* in the upper region 319*a* of the arcuate surface 319 and a lower arcuate bearing surface or face 324*b* in the lower region 319*b* of the arcuate surface 319. The upper arcuate bearing face 324*a* is curved, converging in a direction proceeding toward the upper end 302 of the rotary knife blade, while the lower arcuate bearing face 324*b* is also curved, converging in a direction proceeding toward the lower end 304 of the rotary knife blade 300. That is, the upper and lower curved surfaces defined by the upper and lower arcuate bearing faces 324*a*, 324*b* have arcuate or curved, as opposed to linear, side walls or surfaces. The upper arcuate hearing face 324*a* can be viewed as being within an upper zone 328*a* (FIG. 12A), that is, the zone 328*a* corresponding to a portion of the outer surface 319*j* of the annular ring 319*f* axially above the radial outermost location or midpoint location of arcuate portion 319*k* of the second intermediate portion 318*d*, while the lower arcuate bearing face 324*b* can be viewed as being within a lower zone 328*b*, that is, the zone 328*a* corresponding to a portion of the outer surface 319*j* of the annular ring 319*f* axially below the radial outermost location or midpoint location of arcuate portion 319*k* of the second intermediate portion 318*d*. When viewed in two dimensions, as seen in FIG. 16, the upper and lower arcuate bearing faces 324*a*, 324*b* define upper and lower arcuate bearing lines 326*a*, 326*b* that have a shared or common radius of curvature RAD and which would intersect at the radial outermost location or vertex location or midpoint location 319*k* of the second intermediate portion 318*d* of the arcuate portion 319*a*.

Advantageously, the arcuate surface 319 of the outer wall 318 of the body 310 comprises or defines both: a) the rotary knife blade bearing region 320, that is, the annular, arcuate rotary knife blade bearing surface 322; and b) an outer surface 340*b* of the driven gear 340. That is, the arcuate surface 319 of the outer wall 318 of the rotary knife blade body 310 comprises both the blade bearing region 320 or and in overlapping axial extent also comprises the outer surface 340b of the driven gear 340 of the annular body 310. Stated another way, the outer surface 340b of the driven gear 340 comprises at least a part of the rotary knife blade bearing surface 322 and, with respect to the upper arcuate bearing surface or upper bearing face 324a of the rotary knife blade bearing surface 322, the outer surface 340b of the driven gear 340 comprises an entirety of the upper arcuate bearing face 324a.

The blade support section 450 of the annular blade housing 400 extends substantially 360° around an entirety of a circumference of the blade housing 400. The blade support section 450 is discontinuous in a region of the split 401a. A central axis CA of the blade support section 450 of the blade housing 400 is coincident or congruent with the axis of rotation R of the rotary knife blade 300. The blade support section 450 includes the annular bearing region 460 including the annular bearing surface 462. In one exemplary embodiment of the blade housing 400, the bearing region 460 comprises a bearing race 466 that extends radially into and forms a portion of an inner wall 452 of the blade support section 450. A back surface or back wall 469 of the bearing race 466 is generally V-shaped and includes a pair of converging axially spaced apart upper and lower wall portions or surfaces 466a, 466b that intersect at an intermediate portion 466c of the bearing race 466. The intermediate portion 466c includes a vertex location or midpoint location 466k of the bearing race 466. The midpoint location 466k, as can best be seen in FIG. 12A, represents a location of the bearing race 466 which is radially furthest from the center line CBH of the blade housing 400. The converging upper and lower surfaces 466a, 466b define the annular bearing surface 462. Specifically, the annular bearing surface 462 comprises a pair of axially spaced apart, angled or frustoconical bearing faces, namely, an upper angled or frustoconical bearing face 464a and a lower angled or frustoconical bearing face 464b. The upper wall portion or surface 466a of the bearing race 466 comprises the upper frustoconical bearing face 464a, while the lower wall portion or surface 466b of the bearing race 466 comprises the lower frustoconical bearing face 464b. The upper and lower frustoconical bearing faces 464a, 464b comprise frustums of respective right angled cones, the upper frustoconical bearing face 464a converging in a direction proceeding toward the upper end of the first upper end 456 of the blade housing blade support section 450, that is, in the upward direction UP, while the lower frustoconical bearing face 464c converging in a direction proceeding toward the lower end 458 of the blade housing blade support section 460, that is, in the downward direction DW.

As part of the blade-blade housing bearing structure 550, the upper arcuate bearing face 324a of the bearing surface 322 of the rotary knife blade 300 slidingly engages and bears against the upper angled or frustoconical bearing face 464a of the blade housing bearing surface 462, while the lower arcuate bearing face 324b of the rotary knife blade bearing surface 322 slidingly engages and bears against the lower angled or frustoconical bearing face 464b of the blade housing bearing surface 462, to rotatably support and position the rotary knife blade 300 with respect to the annular blade housing 400 and define a rotational plane RP of the blade 300. When viewed in two dimensions, the upper and lower frustoconical bearing faces 464a, 464b define substantially flat or linear, angled, converging axially spaced apart pairs of bearing lines 465a, 465b. That is, the upper frustoconical bearing face 464a can be viewed in two dimensions as comprising a pair of angled bearing lines 465a, disposed at opposite radial sides of the rotary knife blade 300, as best seen in FIGS. 11, 12 and 12A, converging the upward direction UP. Similarly, the lower frustoconical bearing face 464b can be viewed in two dimensions as comprising a pair of angled bearing lines 465b at opposite radial sides of the rotary knife blade 300, converging in the downward direction DW. The rotational plane RP of the rotary knife blade 300, which is defined by the blade-blade housing bearing structure 550, is substantially orthogonal with respect to the central axis of rotation R of the blade 300. Stated another way, the rotary knife blade 300 is supported for rotation by the annular blade housing 400 by a sliding or journal bearing interface or bearing structure 550 between respective bearing surfaces 322, 462 of the rotary knife blade 300 and the blade support section 450 of the blade housing 400 and, more specifically, between the respective upper and lower bearing faces 324a, 324b of the rotary knife blade 300 and the upper and lower bearing faces 464a, 464b of the blade support section 450 of the blade housing 400.

As best seen in FIGS. 1-3, the drive mechanism 600 of the power operated rotary knife 100 rotatably drives the rotary knife blade 300 at a high angular speed or RPMs, a typical range of RPMs of a rotary knife blade in the power operated rotary knife 100 may be on the order of 900-1,900 RPM. The head assembly 200 extends from the distal end 112 of the longitudinally extending handle assembly 110 which includes the hand piece 120. As mentioned previously, the hand piece 120 is manipulated by an operator of the power operated rotary knife 100 to position the rotary knife blade 300 and, specifically, a cutting edge 361 of the blade section 360 within the cutting region CR for cutting or trimming a work product, such as a trimming a layer of fat from an animal carcass. A drive gear 609, specifically, in the present exemplary embodiment, the pinion gear 610, of the gear train 604 meshes with the driven gear 340 of the rotary knife blade 300 to rotate the rotary knife blade 300. The driven gear 340 of the body 310 of the rotary knife blade 300 includes the plurality of gear teeth 341 formed on and axially extending into the upper or first end 312 of the body 310. The drive gear 609, that is, the pinion gear 610 of the gear train 604 includes a gear head 614 with a plurality of gear teeth 615 which engage, mesh with and drive the plurality of gear teeth 341 of the driven gear 340 of the rotary knife blade 300 to rotate the rotary knife blade 300 about the rotary knife blade central axis of rotation R. The region of the rotary knife blade 300 where the driven gear 340 of the rotary knife blade 300 engages and meshes with the drive gear 609 of the gear train 604 is referred to as the driven gear interface region 510.

Regions wherein the bearing race 464 of the blade housing 400 engages bearing surface 322 of the rotary knife blade 300 to support the rotary knife blade 300 for rotation about the central axis of rotation R are referred to as the blade-blade housing bearing interface region 520 and the mating structures of the rotary knife blade 300 and blade housing 400 that provide for support the rotary knife blade 300 for rotation about the central axis of rotation R are referred to as the blade-blade housing bearing structure or blade-blade housing bearing interface 550. The blade-blade housing bearing structure 550 includes coacting bearing surfaces 322, 462 of the body 310 of the rotary knife blade 300 and the blade support section 450 of the blade housing 400. Because the rotary knife blade 300 and the blade support section 450 of the blade housing 400 are both annular, the bearing surface 322 of the body 310 of the rotary knife blade 300 is annular or circumferential, comprising a portion of an outer wall 318 of the body 310 and, similarly, a portion of an outer wall 308 of the rotary knife blade 300. In the same way, the bearing surface 462 or bearing race 464 of the blade support section 450 of the blade housing 400 is annular or circumferential, comprising a portion of an inner wall 452 of the blade support section 450 and, similarly, a portion of an inner wall 400a of the blade housing 400, the inner wall 452 of the blade support section 450 being a part of and in overlapping relationship with the inner wall 400a of the blade housing 400. As used herein, the terms inner and outer wall are understood to be taken as measured radially with respect the central axis of rotation R of the rotary knife blade 300.

Designers of power operated rotary knives are constantly challenged to improve the design of such power operated rotary knives with respect to multiple, sometimes conflicting, objectives. For example, there is a desire for increasing the rotational speed of the rotary knife blade of a power operated rotary knife. Generally, increasing blade rotational speed reduces operator effort required for cutting and trimming operations and operators may work longer between sharpenings of the rotary knife blade.

There is a desire to reduce heat generated by the power operated rotary knife during cutting and trimming operations. One source of generated heat is the blade-blade housing bearing interface region, that is, heat generated by the blade-blade housing bearing structure at the bearing interface between the rotating knife blade and the stationary blade housing. Reducing generated heat during knife operation will tend to reduce undesirable "cooking" of the product being cut or trimmed. If sufficient heat is generated in the bearing region of the rotary knife blade and blade housing, dislodged pieces or fragments of a product being cut or trimmed (e.g., small pieces or fragments of fat, gristle or meat dislodged during a trimming or cutting operations, such dislodged pieces or fragments generally referred to as "debris") in a region of the blade-blade housing bearing interface may become so hot that the debris "cook". The cooked materials tend to gum up the blade-blade housing bearing structure and the blade-blade housing bearing interface region resulting in even more undesirable heating. Additionally, reducing generated heat during power operated rotary knife operation will tend to increase the useful life of various components of a power operated rotary knife.

There is also a desire to reduce vibration resulting from the rotation of the rotary knife blade in the blade housing. Rotation of the rotary knife blade at such high angular speeds may generate excessive, undesirable vibration of the power operated rotary knife if the rotation of the rotary knife blade in the blade housing is not properly balanced and true or if appropriate running or operating clearance between the blade and the blade housing is not provided. If there is vibration of the rotary knife blade as it rotates within the blade housing, typically, as rotational speed of the rotary knife blade would be increase, the vibration of the blade would also increase. Thus, excessive vibration of the rotating rotary knife blade can effectively limit the rotational speed of the blade. That is, even if a drive mechanism of a power operated rotary knife could be designed to rotate at a desired fast rotational speed, excessive blade vibration of the rotary knife blade within the blade housing, may force the designer to modify the drive mechanism to limit the rotational speed of blade to mitigate the level of blade vibration.

There is additionally a desire to minimize a cross sectional thickness of a combination of the blade and blade housing of a power operated rotary knife to minimize a frictional resistance or "drag" that an operator will feel during a cutting or trimming operation. The greater the "drag" the more effort required on the part of the operator to complete the necessary cutting and trimming operations on a work product, leading to operator fatigue. Depending on the specific cutting or trimming application, the size and shape of the rotary knife blade may change e.g., hook style blade vs. straight blade vs. flat blade. Different styles and sizes of rotary knife blades are discussed, for example, in U.S. Pat. No. 8,726,524 to Whited et al., as previously mentioned and incorporated by reference herein. Additionally, the configuration of the annular blade housing will also change to accommodate the selected rotary knife blade. However, in all cases, minimizing the cross section of the blade-blade housing combination is an important design objective.

There is also a desire to improve or extend the operational life of components of the power operated rotary knife including the rotary knife blade, the blade housing and components of the drive mechanism, including the pinion gear. However, increased blade rotational speed not only increases heat generated at the blade-blade housing bearing interface region but also increases a wear rate of the blade-blade housing bearing structure. The wear rate is a function of blade rotational speed, cutting forces applied to a blade section of the rotary knife blade during cutting and trimming operations, and the forces generated by the drive gear (the pinion gear) of the drive mechanism acting on the driven gear (plurality of gear teeth) of the rotary knife blade. Increasing the wear rate of the blade-blade housing bearing structure not only reduces the operational life of the respective rotary knife blade and blade housing but also results in a separation of the respective gear teeth of the drive gear (pinion gear) and the driven gear of the rotary knife blade in the driven gear interface region leading to undesirable wear of the pinion gear. To an extent, wear at the blade-blade housing bearing interface region results from loading applied to the blade-blade housing bearing structure by different forces applied to the rotary knife blade including: a) cutting or load forces, that is, forces applied to the cutting edge 361 of the blade section 360 of the rotary knife blade 300 within the cutting region CR as a result of cutting and trimming operations; and b) drive gear forces, that is, forces applied to the driven gear 340 of the rotary knife blade body 310 by the meshing of plurality of gear teeth 615 of the pinion gear 610 of the drive mechanism with the plurality of gear teeth 341 of the driven gear 640 of the rotary knife blade 300 to rotate the blade 300 about its axis of rotation R.

For simplicity, the load forces are schematically represented by a single force arrow or vector labeled as Fl in FIG. 11 and will hereafter be referred to as load force Fl, although it is recognized that, in actual operation, the load forces may be applied to various circumferential locations of the blade cutting edge 361 and at differing magnitudes depending on the particular product being cut, an approach angle of the cut or trim (angle between cutting edge of blade and the layer of product being trimmed resulting from manipulation of the knife 100 by the operator), the width of the layer being cut, the depth of cut, etc. Similarly, for simplicity, the drive gear forces are schematically represented by a single force arrow or vector as Fg in FIG. 12 and will hereafter be referred to as gear force Fg, although it is recognized that the drive gear forces applied to the driven gear 340 are more complex than a single force vector. It should also be understood, of course, that depending on the particular cutting trimming applications of the power operated rotary knife 100, the size and configuration of the rotary knife blade 300 and the assembled blade-blade housing combination 500, the specific configurations of the various components of the drive mechanism 600, the forces applied to the rotary knife blade 300 and/or the reaction forces experienced by the rotary knife blade 100 are not limited to the load, gear and reaction forces described herein, but rather include a number of additional forces, e.g., frictional forces, that are applied to the blade. Further, as the texture and/or density of the product being cut or trimmed changes, the angle of approach and/or depth of cut changes, the sharpness of the rotary knife blade 300 changes during cutting and trimming operations, vibration of the blade 300 changes during use, the combination and magnitude of forces applied to the rotary knife blade also dynamically change during use of the power operated rotary knife 100 and the reaction forces experienced by the rotary knife blade 300 from the combination forces similarly change. One of skill in the art will recognize that the analysis set forth herein is a limited analysis of certain applied forces and reaction forces that impact the wear rate of certain portions of the rotary knife blade 300 and provides an explanation of certain advantages of the rotary knife blade 100 of the present disclosure with respect to those forces and wear rate.

The load force Fl is presumed to act on the cutting edge 361 of the rotary knife blade at an angle $\beta$ (FIG. 11), which is below horizontal or a cutting plane CP defined by the blade cutting edge 361. The exact value of the angle $\beta$ will depend on a number of factors including the approach angle between the power operated rotary knife 100 and a cutting surface of the work product to be cut or trimmed, for example, is the operator orienting the knife 100 so as to made a thin cut or trim of the work product while moving parallel to the surface of the work product (e.g., trimming a layer of fat from an upper surface of a carcass) or orienting the knife 100 to made a plunge cut deep into the work product to remove or sever a particular portion or part of the work product (e.g., severing a chicken wing from a chicken carcass). The gear force Fg is presumed to act on gear teeth of the rotary knife blade driven gear at an angle $\alpha$ that is determined by a pressure angle of the individual gear teeth 342 of the set of gear teeth 341 of the driven gear 340 and the angle $\alpha$ is typically 20° with respect to a horizontal center plane GCP (FIG. 12) through the set of gear teeth 341 comprising the driven gear 340.

Because of the sliding blade-blade housing bearing interface 550 between the rotary knife blade 300 and the blade housing 400 in the assembled combination 500 of the rotary knife blade 300 and the blade housing 400 in the power operated rotary knife 100, as would be recognized by one of skill in the art, running or operating clearance between the rotary knife blade 300 and the blade housing 400 must be provided to allow the rotary knife blade 300 to rotate relatively freely within the blade support section 450 of the annular blade housing 400. Actual running clearance will depend on a number of factors including the cutting or trimming application, the amount of time of use and the degree of wear of various components of the power operated rotary knife 100 include the rotary knife blade 300 and the blade housing 400, the extent and type of lubrication provided in the blade-blade housing bearing interface region 520. However, running clearance typically is on the order of a 0.005-0.010 in. radial clearance or gap between the rotary knife blade 300 and the blade housing 400. That is, if the bearing surface 322 of the rotary knife blade 300 is urged radially against the inner wall 452 of the bearing race 466 of the blade support section 450 of the blade housing 400 such that, in a particular circumferential region or location, the upper and lower bearing faces 324a, 324b of the bearing surface 322 of the rotary knife blade 300 are in bearing contact with the corresponding upper and lower bearing faces 464a, 464b of the bearing surface 462 of the blade support section 450 of the blade housing 400, when viewed at an opposite circumferential location or region spaced 180° from the bearing contact circumferential location, there would be a 0.005" to 0.010" radial gap between the bearing surface 322 of the rotary knife blade 300 and the bearing race 466 or bearing surface 462 of the blade housing 400.

The exact value of the running clearance will be determined by the operator of the power operated rotary knife 100, however, if the running clearance is too small, the rotary knife blade 300 will tend to bind during operation, thus, the operator will understand that the blade housing diameter will need to be adjusted to increase the diameter and thus allow the rotary knife blade 300 to run more smoothly in the blade housing 400. By the same token, if the running clearance is too large, the rotary knife blade 300 will then to wobble around and/or vibrate, thus, the operator will understand blade housing diameter will need to be adjusted to decrease the diameter and thus allow the rotary knife blade 300 to run with less vibration/wobble in the blade housing 400.

As one of skill in the art would appreciate, such running or operating clearance between the rotary knife blade 300 and the blade housing 400 allows the rotary knife blade 300 to move slightly within the bearing race 466 of the blade housing 400. For example, as one circumferential region or location of the bearing surface 322 of the rotary knife blade 300 is pivoted or moved axially upwardly within the blade housing bearing race 464 during a cutting or trimming operation, the diametrically opposite portion (180° away from the circumferential location or region) of the bearing surface 322 of the rotary knife blade 300 (180° away) is generally pivoted or moved axially downwardly within the blade housing bearing race 466. In some sense that can be thought of as the rotary knife blade 300 acting somewhat akin to a teeter-totter within the bearing race 466 of the blade housing 400. The pivoting may be due to load forces Fl applied to the cutting edge 361 of the rotary knife blade 300 which causes the rotary knife blade 300 to tilt or angle with respect to the blade housing 400. This is depicted schematically in FIG. 11, wherein the load force Fl is applied to the cutting edge 361 of the rotary knife blade 300 at one region of the blade 300 resulting in a tilting or teetering of the rotary knife blade 300 with respect to the blade housing 400. This results in a small tilt angle TA between the central axis of rotation R of the rotary knife blade 300 and an axially extending central axis or center line CBH of the blade housing 400. Obviously, as the load force Fl applied to the cutting edge 361 changes magnitude and circumferential position, the tilt angle TA will change circumferential orientation and direction and will vary from a zero value (perfect alignment or coincidence between the knife blade axis of rotation R and the blade housing central axis CBH) to some maximum tilt angle value. Because the clearance between the rotary knife blade 300 and the blade housing 400 is on the order of 0.005-0.010 in., it should be understood that the tilt angle TA is very small and the depiction of FIG. 11 is only a schematic representation of the tilt angle TA.

Accordingly, the specific portions of the mating bearing surfaces 324a, 324b, 464a, 464b of the blade-blade housing bearing structure 550 in contact at an specific location of the rotary knife blade bearing surface 322 or at any specific location of the coacting blade housing bearing surface 462 will change and, at any given time, will be determined, at least in part, by the forces applied to the rotary knife blade 300 during use of the power operated rotary knife 100. Thus, for any specific portion or region of the respective bearing surfaces of the blade-blade housing bearing structure 550, there may be periods of non-contact or intermittent contact with a mating bearing surface or bearing face depending on the loading forces applied to the rotary knife blade 300 during cutting and trimming operations. The respective bearing faces 324a, 324b, 464a, 464b of the rotary knife blade bearing surface 322 and blade housing bearing surface 462 include surfaces or regions where bearing contact or bearing engagement between the rotary knife blade 300 and the blade housing 400 can occur during normal operation of the power operated rotary knife 100, even though it is recognized that, at any particular point in time during use or operation of the power operated rotary knife 100, because of the operating clearance between the rotary knife blade 300 and the blade housing 400 and the teeter-totter effect, specific portions of the bearing faces 324a, 324b of the rotary knife blade 300 and specific portions of the bearing faces 464a, 464b of the blade housing 400 may not be in bearing engagement or bearing contact or may be in intermittent contact with mating bearing surfaces. That is, the upper and lower bearing faces 324a, 324b of the rotary knife blade 300 and the upper and lower bearing faces 464a, 464b of the blade support section 450 of the blade housing 400 can be viewed as establishing an extent of the bearing contact between the rotary knife blade 300 and the blade housing 400 even though, at a particular time during operation of the power operated rotary knife 100, specific portions of one or more of the bearing faces 324a, 324b, 464a, 464b may not be in bearing contact or engagement or may be in intermittent contact with mating bearing surfaces. Movement of the rotary knife blade 300 with respect to the blade housing 400 is limited in the axial and radial directions by bearing engagement of the upper and lower bearing faces 324a, 324b with the coacting upper and lower bearing faces 464a, 464b of the blade housing bearing surface 462 of the blade housing 400, the specific geometry of the respective hearing faces 324a, 324b, 464a, 464b, and the radial operating clearance between the rotary knife blade 300 and the blade housing 400. As one of skill in the art would recognize, the need for operating or running clearance and the resulting teeter-totter effect, as described above, are applicable to all rotary knife blade-blade housing combinations/embodiments disclosed herein.

As a result of the load three F1 applied to the blade section 360 of the rotary knife blade 300 by virtue of the rotary knife blade 300 cutting through a work product (e.g., an animal carcass being cut or trimmed) during cutting and trimming operations with the power operated rotary knife 100 together with the running or operating clearance between the rotary knife blade 300 and the blade housing 400 results in relative movement of the rotary knife blade 300 within the blade housing 400, as described above. Additionally, as the rotary knife blade 300 tilts within the bearing race 466 of the blade housing 400, as schematically depicted in FIG. 11, the bearing surface 322 of the rotary knife blade 300 is urged against the bearing surface 462 of the blade housing blade support section 450. Specifically, the upper bearing face 324a of the blade bearing surface 322 bears against the upper bearing face 464a of the blade housing bearing surface 462 and the lower bearing face 324b of the blade bearing surface 322 bears against the lower bearing face 464 of the blade housing hearing surface 462. The bearing contact of the corresponding bearing surfaces 322, 462 due to the load force F1 results in load reaction forces Fn1, Fn2 (FIG. 11) being applied to the blade bearing surface 322 by the corresponding blade housing bearing surface 462. The direction of the load reaction forces Fn1, Fn2 applied to the upper and lower bearing surfaces 324a, 324b of the knife blade 300 are normal or orthogonal to the specific regions of contact between the upper and lower bearing surfaces 324a, 324b of the knife blade 300 and the respective upper and lower bearing faces 464a, 464b of the blade housing 400.

Also as previously discussed, the plurality of gear teeth 625 of the gear head 614 of the pinion gear 610 engage and rotatably drive the mating plurality of gear teeth 341 of the driven gear 340 of the rotary knife blade 300 to rotate the blade 300 about its axis of rotation R. This engagement and meshing of the pinion gear 610 with the blade driven gear 340 necessarily results in the gear force Fg being applied at the acute angle $\alpha$ with respect to the horizontal gear central plane GCP to a drive or meshing surface 342b of the individual gear teeth 342 of the set of gear teeth 341 of the driven gear 340, as schematically depicted in FIGS. 12 and 12A. The gear force Fg and the movement of the rotary knife blade 300 within the blade housing bearing race 466 results in gear reaction forces Fn3, Fn4 being applied to the blade bearing surface 322 by the corresponding blade housing bearing surface 462. Specifically, the upper and lower bearing surfaces 324a, 324b of the knife blade 300 are subject to gear reaction forces Fn3, Fn4 applied to the bearing faces 324a, 324b by the coasting respective upper and lower bearing faces 464a, 464b of the bearing surface 462 of the blade support section 450 of the blade housing 400. The gear force Fg urges the blade bearing surface 322 of the rotary knife blade 300 against the bearing race 466 of the blade housing, resulting bearing contact between the blade bearing surface 322 and the blade housing bearing surface 462 at specific locations of the rotary knife blade 300 and the blade housing 400, as schematic depicted in FIG. 12. The direction of the gear reaction forces Fn3, Fn4 applied to the upper and lower bearing surfaces 324a, 324b of the knife blade 300 are normal or orthogonal to the specific regions of contact between the upper and lower bearing surfaces 324a, 324b of the knife blade 300 and the respective upper and lower bearing faces 464a, 464b of the blade housing 400.

In prior power operated rotary knives, such as, for example, the power operated knives disclosed in U.S. Pat. No. 6,769,184 to Whited, the driven gear of the rotary knife blade was axially spaced from a hearing region of the rotary knife blade wherein the bearing surface included axially spaced apart hearing surfaces or bearing faces. While the bearing structures of the rotary knife blades and corresponding blade housings disclosed in the power operated rotary knives of the '184 patent advantageously limited movement of the rotary knife blade in both the axial and radial directions and provided a relatively small areas of contact between the mating bearing surfaces of the rotary knife blade and the blade housing to reduce blade heating in the blade-blade housing bearing interface region. However, due to designers of power operated rotary knifes continuing desire to increase the rotational speed of the rotary knife blade, wear rates of the rotary knife blade, the blade housing and the drive gear (e.g., pinion gear) of the drive train, among other components, remains a continuing challenge. As noted above, increasing the rotational speed of a rotary knife blade in a power operated rotary knife generally has the undesirable result of increasing the rate at wear and, therefore, reducing the operational or expected life of various components such as the rotary knife blade, blade housing and drive gear, among others, as the wear rates of these components are related. For example, a high wear rate of the rotary knife blade in the driven gear region may cause an undesirable separation between the meshing gear teeth of the drive gear (e.g., the pinion gear) of the gear train and the gear teeth of the driven gear of the rotary knife blade. This separation of gear teeth in the driven gear interface region may lead to premature wear or a high rate of wear of the gear teeth of the drive gear (pinion gear) of the gear train and the gear teeth of the driven gear of the rotary knife blade with a result of reduced operational life of the driven gear and a reduced operational life of the rotary knife blade due to driven gear wear. Similarly, a high wear rate of the rotary knife blade in the blade hearing region, i.e., the region of the rotary knife blade corresponding to the blade-blade housing bearing interface region, may not only cause a high wear rate and a reduced operational life of the rotary knife blade because of premature wear of the rotary knife blade in the rotary knife blade bearing region but may correspondingly cause a higher wear rate in the blade housing bearing region and a resulting reduced operational life of the blade housing.

Wear rates of a rotary knife blade of a power operated rotary knife may be analyzed, at least in part, by examining the reaction forces that the bearing region of a rotary knife blade is subject to during operation of the power operated rotary knife. All other things being similar, a reduction in the reaction forces applied to the bearing region of a rotary knife blade, the lower the wear rate experienced by the rotary knife blade, both in the rotary knife bearing region and in the rotary knife driven gear region. Thus, a rotary knife blade design that, under certain operating conditions, including blade and gear loading parameters, of the power operated rotary knife 100 (e.g., blade rotational speed, specific blade and blade housing configurations, drive mechanism utilized, characteristics of product being cut, angle of approach, depth of cut, etc.), a reduction in reaction forces applied to the blade bearing region will advantageously result in a reduction in a wean rate of the blade bearing region and, potentially, a wear rate in the blade driven gear region. Such a reduction in wear rate of the bearing region of the rotary knife blade advantageously tends to provide a longer operational life for the rotary knife blade, as well longer working intervals between operator adjustments to the blade housing diameter to account for wear of the blade bearing region. Equally advantageously, if the wear rate for the rotary knife blade is below a desired or target wear rate, blade rotational speed may be increased by the designer until the wear rate approaches the target wear rate. This increase in blade rotational speed provides for the advantages of reduced operator effort for cutting and trimming operations and longer time between blade sharpenings, as discussed above.

Generally, as noted above, when a power operated rotary knife is in operation, the bearing region 320 of the rotary knife blade 300 is subject to gear reaction forces Fn3, Fn4 resulting from the gear force Fg applied by the rotating pinion gear 610 to the driven gear 340 of the rotary knife blade 300. In the rotary knife blade 300 of the present disclosure, as noted above, advantageously, the arcuate surface 319 of the outer wall 318 of the body 310 comprises or defines both: a) the rotary knife blade bearing region 320, that is, the annular, arcuate rotary knife blade bearing surface 322; and b) an outer surface 340b of the driven gear 340. That is, the arcuate surface 319 of the outer wall 318 of the rotary knife blade body 310 comprises both the blade bearing region 320 and in overlapping axial and radial extent also comprises the outer surface 340b of the driven gear 340 in the driven gear region 340a of the body 310. That is, over at least an overlap portion or region OP (FIG. 12A) of the arcuate surface 319, the outer surface 340b of the driven gear 340 and the bearing surface 322 are overlapping or coincident, that is, the outer surface 340b of the driven gear 340 and the bearing surface 322 share the same surface, namely, the arcuate surface 319 of the outer wall 318 of the blade body 310. Given an axial height or depth of the plurality of gear teeth 342 of the driven gear 340 extending downwardly from the upper end 312 of the blade body 310, in one exemplary embodiment, in the overlap region OP of the arcuate surface 319, the outer surface 340b of the driven gear 340 includes or is coincident with or overlaps an entirety of the upper bearing face 324a of the bearing surface 322, and a part or portion of the lower bearing face 324b of the bearing surface 322. It should be understood, of course that a axial height or depth of the plurality of gear teeth 342 may be more or less (deeper or shallower) than the axial height of the plurality of gear teeth 342 depicted schematically in FIG. 12A. An axial height of the plurality of gear teeth 342 may change depending on the specific configuration of the rotary knife blade 300, the gear train 604 of the drive mechanism 600 and/or the anticipated application of the power operated rotary knife 100. Thus, for example, if an axial height of the plurality of gear teeth 342 is shallower, being fully above the intermediate portion 319d of the arcuate surface 319, the overlap region OP of the arcuate surface 319 may include only a part of the upper bearing face 324a and may not even extend into any part of the lower bearing face 324b. Accordingly, the outer surface 340b of the driven gear 340 and the bearing surface 322 includes or is coincident with or overlaps only a part or portion of the upper bearing face 324a and none of the lower hearing face 324b. Further, the upper and lower bearing faces 324a, 324b of the bearing surface 322 are disposed on the arcuate surface 319 of the outer wall 318 of the blade body 310 and flank the radial outermost location or midpoint location 319k of the second intermediate portion 319d of the arcuate surface 319. Accordingly, the upper and lower bearing faces 324a, 324b are radially spaced from the blade central axis of rotation R at close to maximum radial distance of the outer wall 318 of the body 310 from the central axis R of the rotary knife blade 300.

Depending on the specific geometry, including distances (axial and radial) and angular directions, of the upper and lower bearing surfaces 464a, 464b of the blade support section 450 of the blade housing 400, the gear reaction forces Fn3, Fn4 experienced by the upper and lower bearing faces 324a, 324b of the bearing surface 322 of the rotary knife blade 300 will vary. However, when viewed axially with respect to or along the blade central axis of rotation R, it is clear that the axial distance between horizontal center plane GCP of the driven gear 340 (where the gear force Fg is applied to the driven gear 340) and the respective upper and lower bearing faces 324a, 324b of the bearing surface 322 and the driven gear 340 of the rotary knife blade body 310 are advantageously very small, resulting in a smaller torque or moment of force being experienced by the rotary knife blade 300 as a result of the gear force Fg. Indeed, the horizontal center plane GCP of the driven gear 340 passes radially through the upper bearing face 324a. Stated another way, as can be seen in FIG. 12, an axial distance Y3 between the location where the gear force (represented by gear force vector Fg) is applied to the driven gear 340 (that is, at a location along the horizontal center plane GCP of the driven gear 340) is very small with respect to a location of the reaction force vector Fn3 applied to the upper bearing face 324a. Similarly, an axial distance Y4 between the location where the gear force vector Fg is applied to the driven gear 340 is very small with respect to the location of the reaction force vector Fn4 applied to the lower bearing face 324b. These small axial distances Y3, Y4 advantageously result in lower reaction forces Fn3, Fn4, as compared to a situation where the distance between the horizontal center plane GCP of the driven gear 340 and the upper and lower bearing faces 324a, 324b was greater. This close axial proximity of the gear force Fg and the reaction forces Fn3, Fn4 advantageously results in a lower magnitude torque or moment of force being experienced by the rotary knife blade 300 and results in lower magnitudes for the reaction forces Fn3, Fn4. In the rotary knife blade 300 of the present disclosure, the axial distance between the rotary knife bearing region 320 and the driven gear 340 is minimized.

Analysis of the rotary knife blade bearing surface reaction forces indicates that reducing axial distances between the upper and lower bearing faces 324a, 324b and the horizontal center plane GCP of the driven gear 340 tends to reduce gear reaction forces Fn3, Fn4 experienced by the blade upper and lower bearing faces 324a, 324b resulting from pinion gear forces Fg. Accordingly, under certain operating conditions, including blade and gear loading parameters, the rotary knife blade 300 of the present disclosure advantageously tends to reduce reaction forces Fn3, Fn4 experienced by the blade upper and lower bearing faces 324a, 324b resulting from gear forces Fg thereby tending to reduce wear rate of the rotary knife blade 300, specifically, the wear rate of the bearing region 320, that is, the hearing surface 322 and the upper and lower bearing faces 324a, 324b, and, potentially, a wear rate in the blade driven gear region 340a of the rotary knife blade 300, specifically, the wear rate of the plurality of gear teeth 341. Also, potentially, the wear rate of the pinion gear 610 of the gear train 604 may be reduced. Such a reduction in wear rate of the bearing region 340 of the rotary knife blade 100 advantageously tends to provide a longer operational life for the rotary knife blade 100. Additionally, such a reduction in wear rate of the bearing region 320 of the rotary knife blade 300 advantageously tends to provide a longer working time intervals between operator adjustments to a diameter BHD of blade support section 450 of the blade housing 400 to account for wear of the blade bearing region 320. As the blade bearing region 320 wears, the blade 300 will become loose as it rotates within the blade support section 450 of the blade housing 400. If the blade 300 is too loose within the blade support section 450, the operator will experience an increase in the vibration of the knife power operated rotary knife 100 as the operator continues to use the knife 100 for cutting and trimming operations. Ultimately, this will require the operator to cease trimming and cutting operations to make an adjustment of a circumference of the blade housing 400 to reduce the blade housing diameter BHD, that is, to tighten the blade housing blade support section 450 about the rotary knife blade 300. By reducing the wear rate of the blade bearing region 320, the working time interval between operator blade housing diameter adjustments may advantageously be increased.

Equally advantageously, if the wear rate for the rotary knife blade 300, including the bearing region 320, is below a desired or target wear rate, assuming all other wear areas of the blade 300 are within acceptable wear rates, blade rotational speed may be increased by a designer until the blade wear rate approaches the target wear rate. Such an increase in blade rotational speed provides for advantages of reduced operator effort for cutting and trimming operations and longer time between blade sharpenings, as discussed above.

Power operated rotary knives are offered in various sizes, depending upon the application, characteristics including size and density of the product being trimmed or cut, etc. Size of a power operated rotary knife may be measured in terms of an outer diameter of the annular rotary blade. Typical annular rotary blade may vary in size from, for example, as 1.4 inches to over 7 inches. For a given annular blade rotational speed, e.g., 1,500 RPM, it is clear that the linear velocity of an outer wall of the blade increases with increasing blade diameter. Accordingly, power operated rotary knifes having large diameter blades are particularly prone to the problems discussed above as for a given blade rotational speed, the larger the diameter of a rotary knife blade, the greater the linear velocity of the blade as measured at the blade-blade housing bearing interface region 520. As such, problems of wear of the blade and blade housing bearing surfaces are accentuated in power operated rotary knives with large blade diameters. As used herein, rotary knife blades with outer diameters of approximately 5 inches or greater are considered large diameter blades.

The present disclosure relates to a power operated rotary knife that addresses certain problems associated with conventional power operated rotary knives and certain objectives of power operated rotary knife design, as set forth above. The power operated rotary knife 100 of the present disclosure is suited to be used in connection with both large diameter rotary knife blades and small diameter rotary knife blades. The power operated rotary knife 100 includes the head assembly 200, the handle assembly 110 and the drive mechanism 600. The head assembly 200 includes the frame body 250 and the assembled combination 500 of the annular rotary knife blade 300 supported for rotation about the central axis of rotation R by the annular blade housing 400.

Drive Mechanism 600

The drive mechanism 600 of the power operated rotary knife 100 provides motive power tor rotate the rotary knife blade 300 with respect to the blade housing 400 about the blade central axis of rotation R and may include some components which may be external to the handle and head assemblies 200, 110 of the power operated rotary knife 100. In one exemplary embodiment of the power operated rotary knife 100, the drive mechanism 600 includes a drive motor 800, which is external to the power operated rotary knife 100, and a flexible shaft drive assembly 700. The shaft drive assembly 700 includes a rotating drive shaft 702 disposed within a non-rotating flexible outer casing or outer sheath 712. Proximal portions of the shaft drive assembly 700 are external to the power operated rotary knife 100, while distal portions of the shaft drive assembly 700 are secured to and/or are disposed within the throughbore 115 of the handle assembly 110 of the power operated rotary knife 100. Specifically, a distal end of the outer sheath 712 of the shaft drive assembly 700 includes a first coupling 710 which extends into the handle assembly throughbore 115 and is releasably secured to the handle assembly 110 by a drive shaft latching assembly 175 of the handle assembly 110. When the shaft drive assembly 700 is secured to the handle assembly 110 by the drive shaft latching assembly 175, a drive fitting 704 at a distal end of drive shaft 702 operatively engages and rotates a drive gear 609 of the drive mechanism 600. The drive gear 609, in one exemplary embodiment, is a pinion gear 610 which is both part of the drive mechanism 600 and is also part of a gear train 604 of a drive gear assembly 210 of the head assembly 200 of the power operated rotary knife 100. The drive gear assembly 210 includes the pinion gear 610 and a sleeve bushing 630 which supports the pinion gear 610 for rotation about a pinion gear axis of rotation PGR. The drive gear assembly 210 also includes the driven gear 340 of the rotary knife blade 300. A gear head 614 formed at a distal end of the pinion gear 610 engages and meshes with the driven gear 340 of the rotary knife blade 300. The drive fitting 704 of the drive shaft 702 is coupled to and rotates with an output shaft of the drive motor 800. Rotation of the drive fitting 704, in turn, rotates the pinion gear 610 about a pinion gear axis of rotation PGR which, in turn, rotates the rotary knife blade 300 about its axis of rotation R.

In one exemplary embodiment, the flexible shaft drive assembly 700 includes the first coupling 710 which extends into and is releasably secured to the handle assembly 110 by the drive shaft latching assembly 175 of the handle assembly 110. The first coupling 710 is affixed to the sheath 712 of the shaft drive assembly 700. Rotating within the outer sheath 712 is a flexible drive shaft 702. The external drive motor 800 provides the motive power for rotating the knife blade 300 with respect the blade housing 400 about the axis of rotation R via the flexible shaft drive assembly 700 which comprises a drive transmission including the inner rotating drive shaft 702 rotating within the stationary, non-rotating outer sheath 712. The drive motor 800 includes a coupling 802 which releasably receives a mating motor drive coupling 714 affixed to a proximal end of the outer sheath 712 of the shaft drive assembly 700. A driven fitting 716 is affixed to a proximal end of the rotating drive shaft 702 and, when the motor drive coupling 714 is engaged with the coupling 802 of the drive motor 800, the driven fitting 716, and, thus, the rotating drive shaft 702 is rotated by a drive shaft of the drive motor 800. The external drive motor 800 may be an electric motor or a pneumatic motor.

Alternately, the shaft drive assembly 700 may be eliminated and the gear train 604 the power operated rotary knife 100 may be directly driven by an air/pneumatic motor or an electric motor disposed in a throughbore 158 of an elongated central core 152 of a hand piece retaining assembly 150 of the handle assembly 110 or in a throughbore 122 of the hand piece 120 of the handle assembly 110, if a different hand piece retaining structure is used. A suitable air/pneumatic motor sized to fit within a hand piece of a power operated rotary knife is disclosed in U.S. Pat. No. 8,756,819 to Whited, et al., issued Jun. 24, 2015. U.S. Pat. No. 8,756,819 is assigned to the assignee of the present invention and is incorporated herein it is entirety by reference.

The drive mechanism 600 further includes components which are part of the power operated rotary knife 100 including the gear train 604 and the driven gear 340 formed on the rotary knife blade 300. As can best be seen in FIG. 2, the gear train 604 is part of the drive gear assembly 210 of the head assembly 200 and includes the drive gear 609 and the driven gear 340 of the rotary knife blade 300. In one exemplary embodiment, the drive gear 609 comprises the pinion gear 610 and the sleeve bushing 630 supports an input shaft 612 of the pinion gear 610 for rotation of the pinion gear 610 about the pinion gear axis of rotation PGR. The pinion gear axis of rotation PGR is substantially coincident with the handle assembly longitudinal axis LA. The input shaft 612 of the pinion gear 610 is rotatably received in a central opening 634 of the sleeve hushing 630. The gear head 614 of the pinion gear 610 engages the driven gear 340 of the body 310 of the rotary knife blade 300 to rotate the blade 300 about its central axis of rotation R. The male drive fitting 704 at a distal end of the rotating drive shaft 702 of the flexible shaft drive assembly 700 rotates the pinion gear 610 of the gear train 604. The male drive fitting 704 and the distal end of the rotating drive shalt 702 are supported by the first coupling 710 of the shaft drive assembly 700. The male drive fitting 704 of the drive shaft engages a female socket or fitting 622 defined by an inner surface 620 of the input shaft 612 at a proximal end of the pinion gear 610. The gear train 604 of the drive mechanism 600 of the power operated rotary knife 100 transmits rotational power from the rotating drive shaft 702 of the flexible shaft drive assembly 700, through the gear train 604, including the pinion gear 610, to rotate the rotary knife blade 300 with respect to the blade housing 400. In one exemplary embodiment, the gear head 614 of the pinion gear 610 comprises a spur gear with 33 gear teeth, a 32 diametral pitch and a 20° pressure angle.

The pinion gear 610 and sleeve bushing 630 are supported within a forward cylindrical cavity 290a which is part of a throughbore 290 of the frame body 250. The throughbore 290 extends longitudinally through the frame body 250 from a forward wall 251a to a proximal end 257 of the frame body 250 and is in longitudinal alignment and in fluid communication with the throughbore 115 of the handle assembly 110. A central cylindrical region 254 of the forward portion 251 of the frame body 250 defines the forward cylindrical cavity 290a. When the flexible shaft drive assembly 700 is secured to the handle assembly 110 by the drive shaft latching assembly 175, the drive fitting 704 at the distal end of the rotating drive shaft 702 of the shaft drive assembly 700 engages and operatively rotates the pinion gear 610 of the gear train 604 of the drive gear assembly 210, which, in turn, rotatably drives the driven gear 340 of the rotary knife blade 300.

Handle Assembly 110

Figure 4:
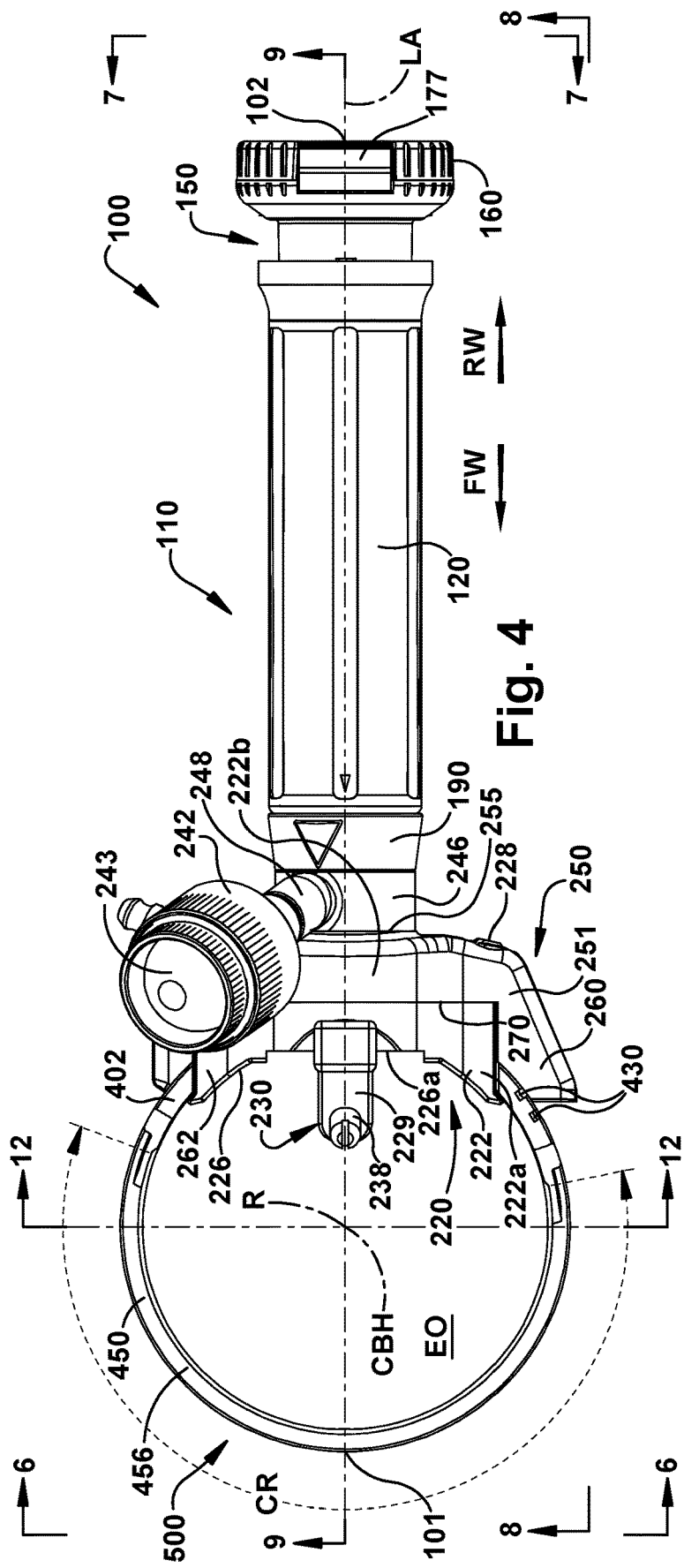
FIG. 4 schematic top plan view of the power operated rotary knife of FIG. 1.

As can best be seen in FIGS. 2-4, the handle assembly 110 includes the hand piece 120 that is secured to the head assembly 200 by the hand piece retaining assembly 150 of the handle assembly 110. The handle assembly 110 is elongated and extends along the longitudinal axis LA that is substantially orthogonal to and intersects the central axis of rotation R of the rotary knife blade 300. The handle assembly 110 includes the throughbore 115 which extends along the handle assembly longitudinal axis LA. The handle assembly throughbore 115 is longitudinally aligned with and in fluid communication with the throughbore 290 of the frame body 250. The hand piece 120 includes an inner surface 121 that defines the central throughbore 122, which extends along the handle assembly longitudinal axis LA. The hand piece 120 includes a contoured outer handle or outer gripping surface 124 that is grasped by an operator to appropriately manipulate the power operated rotary knife 100 for trimming and cutting operations.

Figure 8:
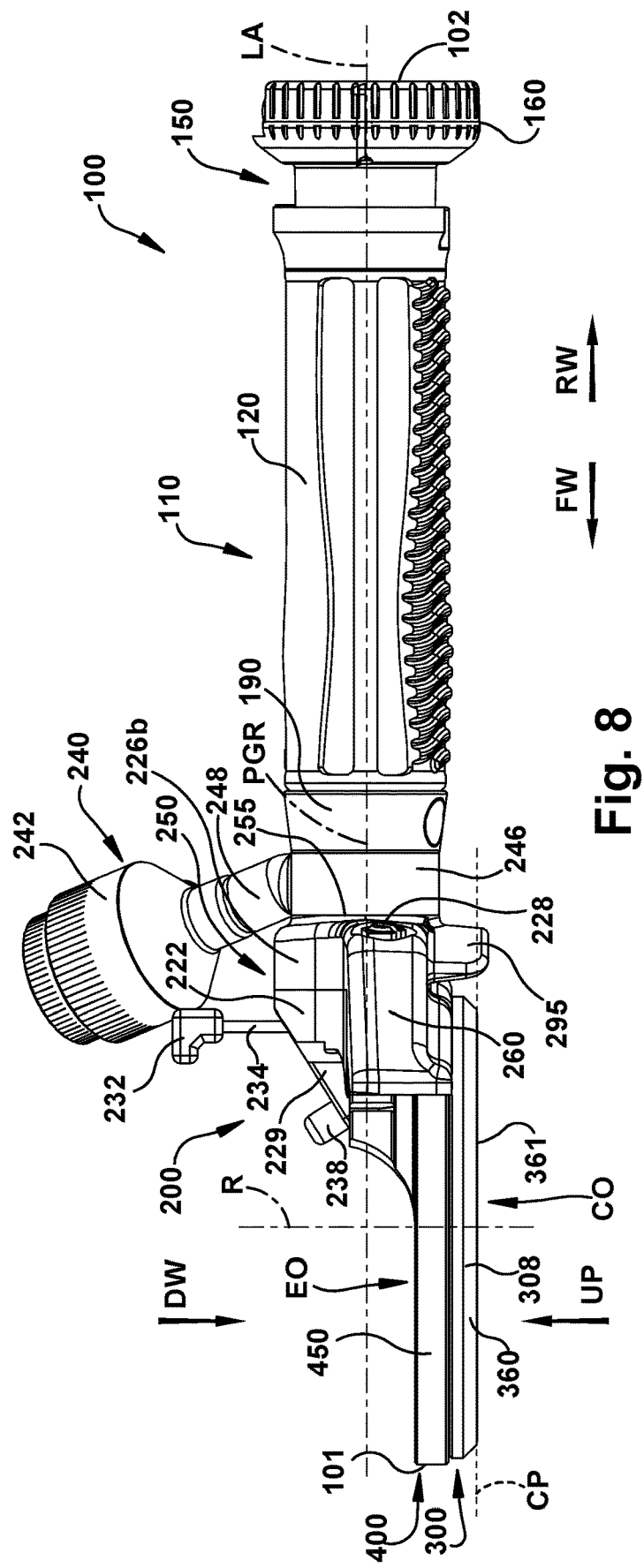
FIG. 8 is a schematic right side elevation view of the power operated rotary knife of FIG. 1, as viewed from a plane indicated by the line 8-8 in FIG. 4.
Figure 9:
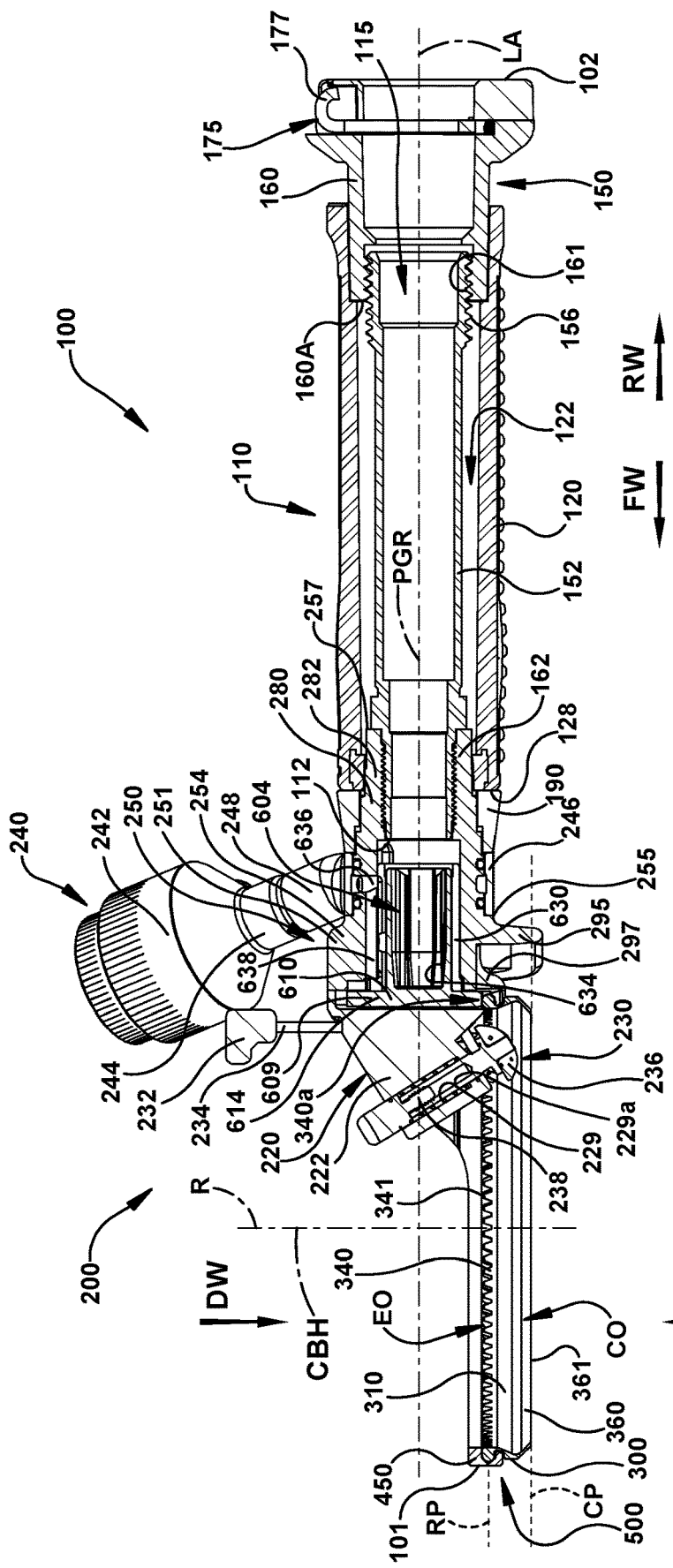
FIG. 9 is a schematic vertical section view taken along a longitudinal axis of the handle assembly of the power operated rotary knife of FIG. 1, as seen from a plane indicated by the line 9-9 in FIG. 4.
Figure 10:
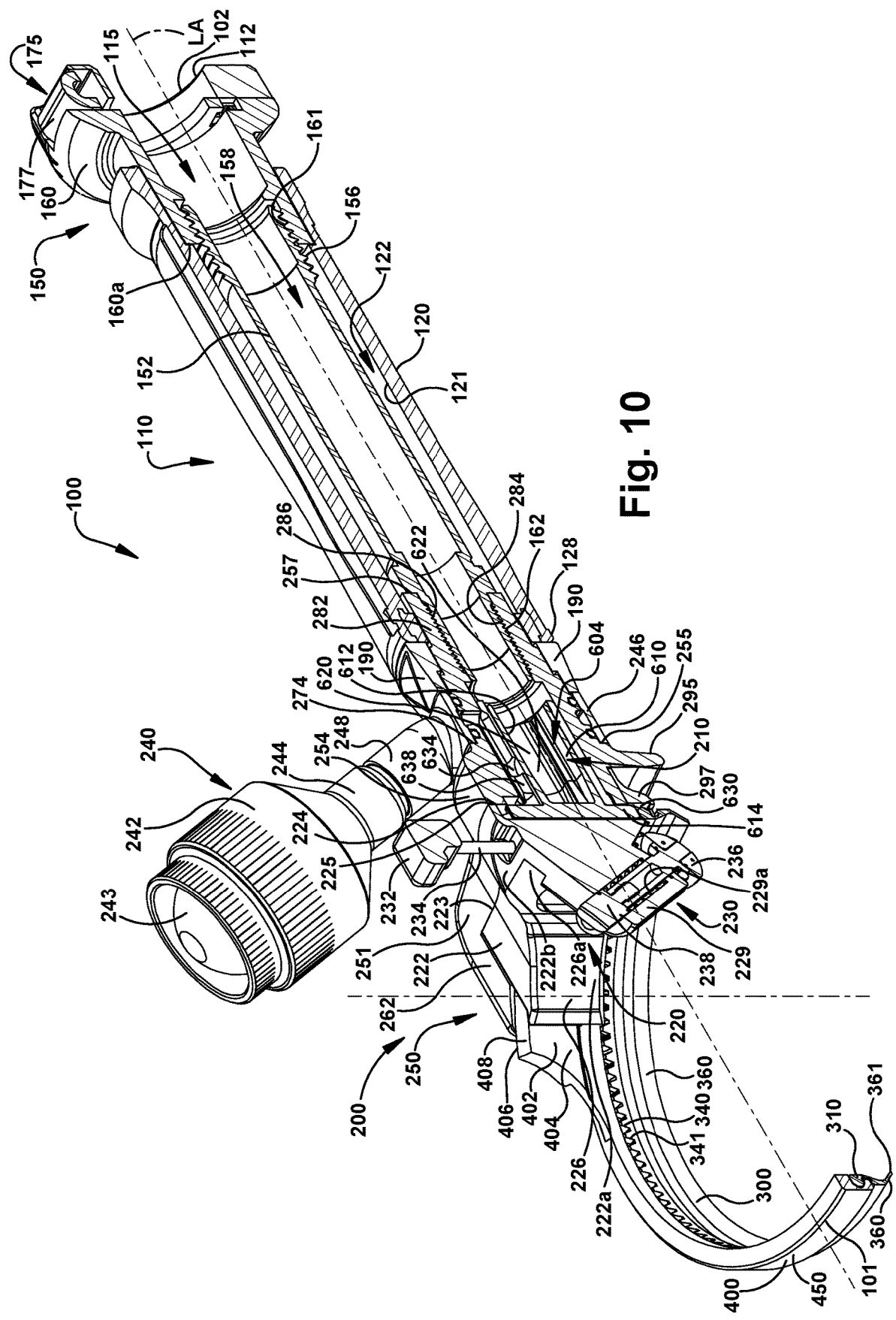
FIG. 10 is a schematic perspective section view along the longitudinal axis of the handle assembly of the power operated rotary knife of FIG. 1, as seen from a plane indicated by the line 9-9 in FIG. 4.

As best seen in FIG. 8, the hand piece retaining assembly 150 includes the elongated central core 152 which extends through the central opening 122 of the hand piece 120. A threaded forward outer surface 162 of the elongated core 152 threads into a threaded proximal portion 286 of an inner surface 284 of the annular boss 282 of the frame body 250 to secure the hand piece 120 to the frame body 250. The inner surface 284 of the annular boss 282 of the frame body 250 defines a rearward cylindrical, longitudinally extending opening 290b, which is part of the frame body throughbore 290. The hand piece retaining assembly 150 also includes the spacer ring 190. When the hand piece 200 is being secured to the frame body 250, the spacer ring 190 is positioned on the annular boss 282 of the frame body 250 intermediate a forward or distal end 128 of the hand piece 120 and an annular support 246 of the lubrication assembly 240. The hand piece 120 is secured in position by an enlarged proximal end piece 160. As can best be seen in FIG. 2, the end piece 160 includes an interior treaded distal portion 161 which threads onto a threaded exterior proximal portion 156 of the elongated central core 152 of the hand piece retaining assembly 150 thereby securing the hand piece and the spacer ring 190 between the lubrication assembly annular support 246 and a front wall 160a of the end piece 160. Optionally, if desired by the operator of the power operated rotary knife 100, the spacer ring 190 may be replaced by a thumb support ring (not shown) which provides a resting surface for the operator's thumb that is spaced radially outwardly from the hand piece 120.

As noted above, the handle assembly 110 also includes the shaft drive latching assembly 175 (best seen in FIG. 2) which releasably secures the shaft drive assembly 700 to the handle assembly 100. The shaft drive latching assembly 175 includes an actuator 177 slidingly supported in the enlarged end piece 160 of the handle assembly 110. The first coupling 710 of the shaft drive assembly is received in the throughbore 115 defined by the handle assembly 110 and secured in place by the actuator of the shaft drive latching assembly 175. The drive fitting 704 at the distal end of the rotating drive shaft 702 of the shaft drive assembly 700 extends into the aligned throughbore 290 of the frame body 250 to engage and rotate the pinion gear 610 of the gear train 604 of the drive gear assembly 210.

Frame Body 250

The frame body 250 receives and removably supports both the clamp body 222 of the clamping assembly 220 and the blade-blade housing combination 500. The clamp assembly 250 also helps locate the drive gear assembly 210 of the drive mechanism 600, including the pinion gear 610 and the sleeve bushing 630. In this way, the frame body 250 releasably and operatively couples the drive gear assembly 210 to the blade-blade housing combination 500 such that the pinion gear 610 of the gear train 604 of the drive gear assembly 210 operatively engages the driven gear 340 of the rotary knife blade 300 to rotate the knife blade 300 with respect to the blade housing 400 about the axis of rotation R.

The frame body 250 includes the forward or distal portion 251 and the generally cylindrical annular boss 280 generally aligned with the longitudinal axis LA and extending in a rearward direction RW toward the handle assembly 110. The forward portion 251 includes the central cylindrical region 254 and the pair of outwardly extending arcuate arms 260, 262. The forward wall 251a of the frame body 250 defines the arcuate mounting pedestal 252 that defines the seating region 252a that receives and supports the mounting section 402 of the blade housing 400. The frame body forward wall 251a comprises a forward wall portion 254a defined by the central cylindrical region 254 and respective forward wall portions 260a, 262a of the arcuate arms 260, 262. The forward wall 251a of the frame body 250 also includes a longitudinally recessed clamp receiving region 270 for receiving a frame contacting surface 225 of the rear wall 223 of the clamp body 222. The clamp receiving region 270 forms a portion of the forward wall 251a of the frame body 250 and is recessed in the rearward direction RW, as compared to the seating region 252a of the forward wall 251a. The clamp receiving region 270 is generally rectangular in overall shape. The clamp body 222 is secured to the frame body 250 by a pair of a threaded fasteners 228 of the clamping assembly 220 that extend through respective partially threaded openings 264, 266 in the arcuate arms 260, 262 of the frame body 250 and thread into a pair of threaded openings 223a in the rear wall 223 of the clamp body 222. Securing the clamp body 222 to the frame body 250 via the threaded fasteners 228 couples or sandwiches the assembled combination 500 of the blade housing 400 and the rotary knife blade 300 to the frame body 250 and properly positions the rotary knife blade 300 to be rotatably driven about the central axis of rotation R by a gear train 604 of a drive mechanism 600 of the power operated rotary knife 100.

The fasteners 228 include unthreaded shaft portions 228a and threaded end portions 228b. The threaded end portions 228b of the fasteners 228 are received in the threaded openings 223a of the clamp body rear wall 223 to secure the clamp body 222 to the frame body 250. When the fasteners 228 are loosened such that the clamp body 222 is released from the frame body 250 so that the assembled combination 500 of the blade housing 400 and the rotary knife blade 300 may be removed from the frame body 250, because the unthreaded shaft portions 228a are captured in the respective partially threaded openings 264, 266 of the arcuate arms 260, 262 the fasteners 228 will not fall out of the openings 264, 266. In order to change the rotary knife blade 300, because the annular blade housing 400 includes the split 401a, only one of the two fasteners 228 needs to be loosened, namely the fastener 228 extending through the opening 264 in the arcuate arm 260. When the fastener 228 through the arcuate arm 260 is sufficiently loosened, the blade housing diameter may be increased by prying against one of two circumferential slots 430 formed in an outer wall 406 of the mounting section 402. When the blade housing diameter is sufficiently increased, the rotary knife blade 300 may be removed from the blade housing 400 while the clamp body 222 remains affixed to the clamp receiving region 270 of the forward wall 251a of the frame body 250 due to the second of the two fasteners 270 remaining in a fastened condition.

The frame body throughbore 258 receives and supports the drive gear assembly 210 of the head assembly 200, which is part of the drive mechanism 600 of the power operated rotary knife 100. Specifically, the drive gear assembly 210 includes the sleeve bushing 630 which is received in the forward cylindrical cavity 290a of the central cylindrical region 254 of the forward portion 251 of the frame body 250. In turn, the pinion gear 610 of the drive gear assembly 210 is rotatably supported by the sleeve bushing 630 such that the pinion gear 610, when driven by the drive fitting 704 of the flexible shaft drive assembly 700 rotates about the pinion gear axis of rotation PGR. The gear head 614 of the pinion gear 610 is operatively connected to the rotary knife blade driven gear 340 such that the plurality of gear teeth 615 of the gear head 614 of the pinion gear 610 mesh with and rotationally drive the mating plurality of gear teeth 341 of the driven gear 340 of the rotary knife blade 300 to rotate the rotary knife blade 300 about its central axis of rotation R.

A lower surface the forward portion 251 of the clamp body 250 includes a downwardly projecting, arcuate guard 295 to provide additional protection to the operator's hand. Just forward of the arcuate guard 295 is a pinion gear cover 297 which is secured to the frame body via a pair of threaded fasteners 298 that pass through the pinion gear cover 297 and thread into respective threaded openings in the lower surface of the frame body 250. As can be seen in FIG. 2, the pinion gear cover 297, which is part of the head assembly 200, includes an arcuate recess 297a in a front wall of the pinion gear cover 297 to provide clearance for the gear head 614 of the pinion gear 610 when the pinion gear cover 297 is affixed to the frame body 250.

Lubrication Assembly 240

In addition to the frame body 250, the drive gear assembly 210 and the assembled combination 550 of the rotary knife blade 300 and the annular blade housing 400, in one exemplary embodiment, the head assembly 200 additionally includes a lubrication assembly 240. The lubrication assembly 240 includes the annular support 246 which supports a lubrication cup 242 and a lubrication cup 242. The annular support 246 is rotatably mounted on the annular boss 282 of the rearward portion 280 of the frame body 250 between the spacer ring 190 and a rear wall 255 of the forward portion 251 of the frame body 250. The annular boss 282 includes a receiving shaft 248. The lubrication cup 242 comprises a flexible bladder 243 filled with a food-safe lubricant and a spout shaft 244. The spout shaft 244 is received in the receiving shaft 248 of the annular boss 246. When the bladder 243 of the grease cup 297 is depressed by an operator of the power operated rotary knife, food-safe lubricant is routed from the bladder interior through the spout shaft 244 and the receiving shaft 248. The lubricant passes through an opening 288 in the annular boss 282 of the frame body 250 and is routed through a radial opening 636 and a longitudinally extending passageway 638 formed in the sleeve bushing 630 thereby providing lubrication to the gear train 604, including the driven gear interface region 510. A pair of o-rings provide a seal between an inner surface of the annular support and the annular boss 282 of the frame body 250 to confine the lubricant such that it flows through the opening 288 of the annular boss of the frame body 250.

Clamping Assembly 220 and Steeling Assembly 230

The clamping assembly 220 includes the clamp body 222 and the pair of fasteners 228 that secure the clamp body 222 to the forward wall 251a of the forward portion 251 of the frame housing 250 and thereby secure the assembled combination 500 of the rotary knife blade 300 and the blade housing 400 to the seating region 252a of the arcuate mounting pedestal 252 of the forward wall 251a of the forward portion 251 of the frame housing 250. In one exemplary embodiment, the clamp body 222 of the clamping assembly 220 also supports a steeling assembly 230, which provides for steeling or straightening the cutting edge 361 of the rotary knife blade 300.

The clamp body 222 includes a base 222a and an upper domed portion 222b. An arcuate rear wall 223 of the clamp body 222 includes the pair of threaded openings 223a which receive respective threaded ends 228b of the threaded fasteners 228. The pair of threaded openings 223a are defined in a pair of rearwardly extending bosses 223c that extend from the rear wall 223 of the clamp body 222. A central portion of the rear wall 223 circumferentially between the pair of bosses 423c includes a recessed generally circular region 223b that provides clearance for the gear head 614 of the pinion gear 610 of the gear train 604. Surrounding the recessed region 223b is a frame body clamping surface 224 which, when the threaded fasteners 228 are threaded into the openings 223a, bears against the clamp receiving region 270 of the forward wall 251a of the frame body 250. The frame body clamping surface 224 includes the arcuate outer surfaces 223d of the bosses 223c and a lower ledge 227 formed in the rear wall 223. In addition to the frame body clamping surface 224, the rear wall 223 also includes a blade housing clamping surface 227 which bears against an inner wall 404 of the mounting section 402 of the blade housing 400. When the clamp body 222 is secured to the frame body 250 the blade housing clamping surface 227 bears against the inner wall 404 of the blade housing mounting section 402 to secure the mounting section 402 of the blade housing 400 to the frame body 250 and thereby secure the blade-blade housing combination 500 to the frame body 250 and the head assembly 200. The blade housing clamping surface 227 includes a lower ledge 227a that extends along and protrudes from a lower end of the base 222a of the clamp body 222. As can best be seen in FIG. 20, a left side of the lower ledge 227 includes a scoring area 227a. The clamp body lines of scoring 227a bears against a similar scoring area 432 of an inner wall 404 of the blade housing mounting section 402 (FIG. 18) to inhibit circumferential movement or sliding between the blade housing mounting section 402 on the left side of the blade housing split 401a and the rear wall 223 of the clamp body 222 until and unless the left fastener of the pair of fasteners 228 is loosened by the operator of the power operated rotary knife 100 for purpose of changing the rotary knife blade 300 or providing increased operating clearance between the blade-blade housing combination 500. The general curvature or arcuate shape of the rear wall 223 matches the general curvature of the blade housing mounting section 402 and the general curvature of the forward wall 321a of the forward portion 251 of the frame body 250. The clamp body 222 also includes a generally arcuate forward wall 226 that faces generally toward the distal end 101 of the power operated rotary knife 100 and the rotary knife blade axis of rotation R. A central portion of the arcuate forward wall 226 of the clamp body 222 includes a steeling projection 229 that supports the steeling assembly 230. The steeling projection 229 of the clamp body 222 includes an angled throughbore 229a (FIG. 8) through the projection 229 that supports a steeling member shaft 228 that extends through the projection throughbore 229a. Disposed at a lower end of the steeling member shaft 228 is a generally dome-shaped steeling member 226. The steeling assembly 230 further includes an actuator 232 and a push rod 234 extending from the actuator 232 which engages the steeling member 226. The push rod 234 is slidably supported by the clamp body 222 such that it moves generally parallel to the central axis of rotation R of the rotary knife blade 300. When the actuator 232 is depressed by an operator of the power operated rotary knife 100 in the downward direction DW, the attached push rod 234 urges the steeling member 226 into contact with the cutting edge 361 of the rotary knife blade 300 to steel or straighten the cutting edge 361. A spring disposed in the projection throughbore 229a biases the steeling member 226 away from contact with the blade cutting edge 361.

The rotational speed of a specific rotary knife blade 300 mounted in the power operated rotary knife 100 will depend upon the specific characteristics of a drive mechanism 600 of the power operated rotary knife 100, including the external drive motor 800, the flexible shaft drive assembly 700, the gear train 604 of the drive gear assembly 210, and a diameter and gearing of the rotary knife blade 300. Further, depending on the cutting or trimming task to be performed, different sizes and styles of rotary knife blades may be utilized in the power operated rotary knife 100 of the present disclosure. For example, rotary knife blades in various diameters are typically offered ranging in size from around 1.4 inches in diameter to over 7 inches in diameter. Selection of a blade diameter will depend on the task or tasks being performed. Large diameter rotary knife blades typically refer to rotary knife blades having an outer diameter of 5 inches or more, while small diameter rotary knife blades typically refer to rotary knife blades have an outer diameter of less than 5 inches. The power operated rotary knife 100 of the first exemplary embodiment is suitable and advantageously may be used in connection with both large and small diameter rotary knife blades. Additionally, various styles of rotary knife blades may also be utilized in the power operated rotary knife 100, including hook blade style rotary knife blades, like the rotary knife blade 300, flat blade style rotary knife blades, and straight blade style rotary knife blades, among others.

Specific structural and operational details of the head assembly 200 and the handle assembly 110 are disclosed in U.S. Pat. No. 8,726,524 to Whited et al., issued May 20, 2014. U.S. Pat. No. 8,726,524 to Whited et al, also discloses different styles of rotary knife blades including flat blade style, hook blade style and straight blade style blades, which may be utilized in the power operated rotary knife 100 of the present disclosure. U.S. Pat. No. 8,726,524 to Whited et al. is assigned to the assignee of the present invention and is incorporated herein in its entirety by reference. Specific details of the drive mechanism 600, including the external drive motor 900 and the flexible shaft drive transmission 700, are disclosed in U.S. Pat. No. 8,968,107 to Rapp et al., issued Mar. 3, 2015. U.S. Pat. No. 8,968,107 to Rapp et al. is assigned to the assignee of the present invention and is incorporated herein it is entirety by reference.

Figure 5:
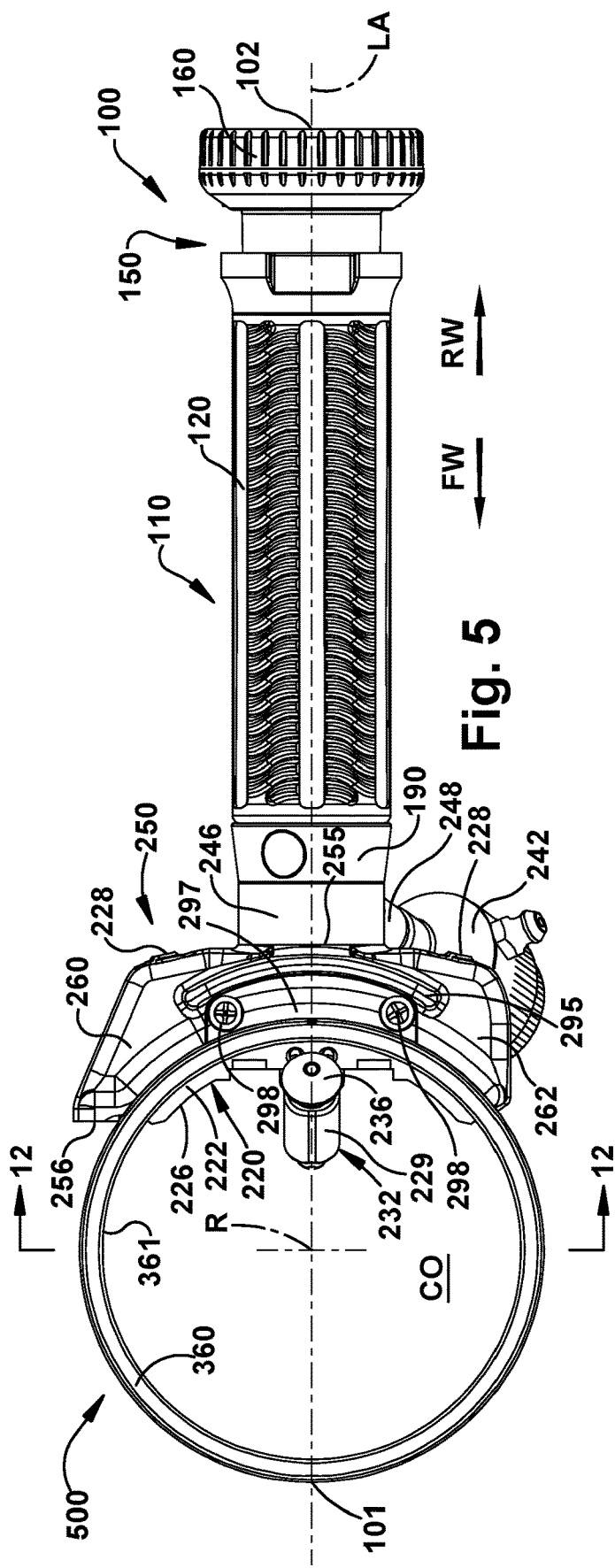
FIG. 5 is a schematic bottom plan view of the power operated rotary knife of FIG. 1.
Figure 6:
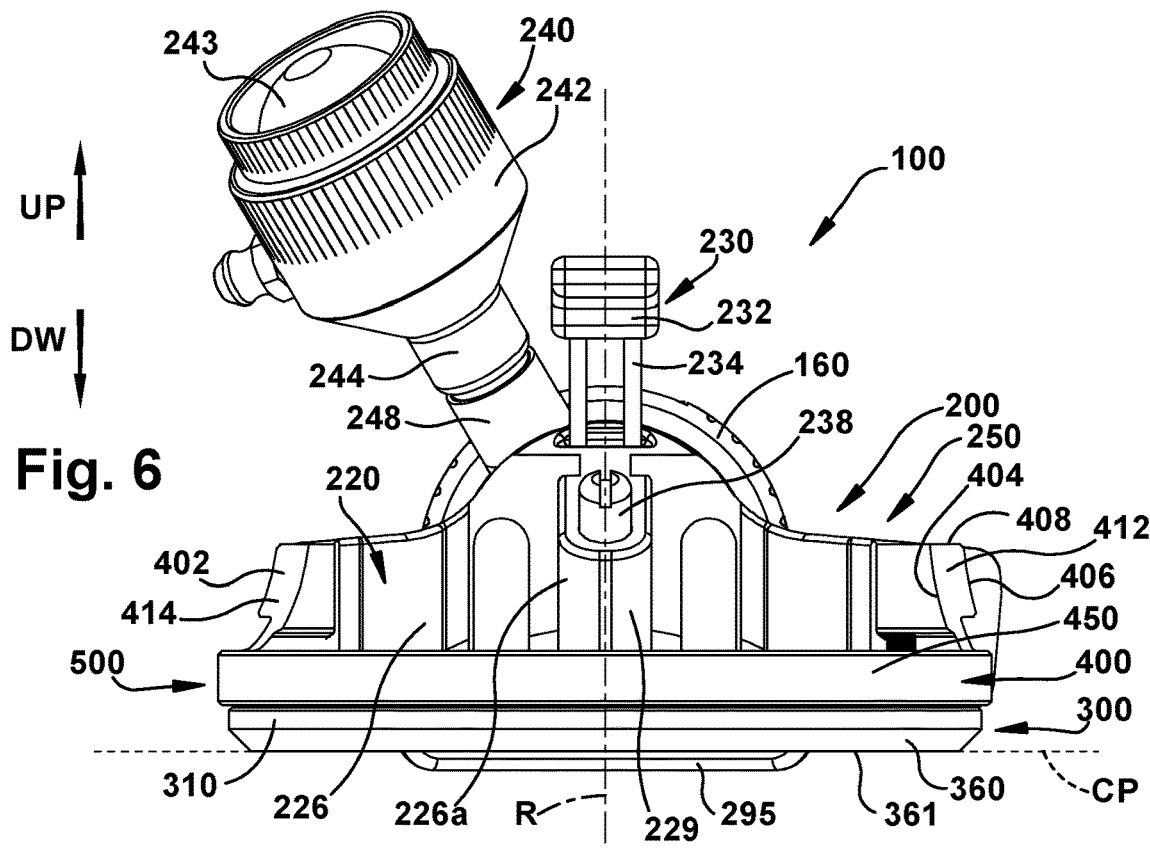
FIG. 6 is a schematic front elevation view of the power operated rotary knife of FIG. 1, as seen from a plane indicated by the line 6-6 in FIG. 4.
Figure 7:
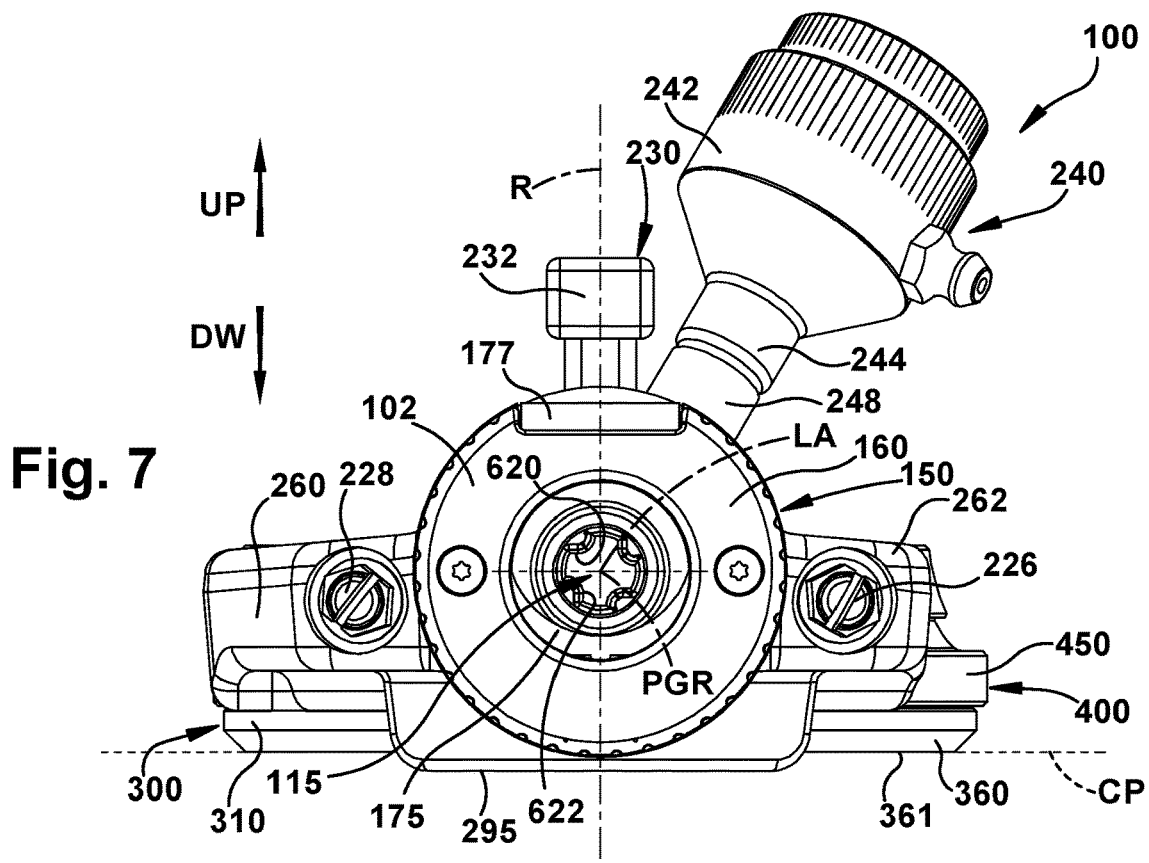
FIG. 7 is a schematic rear elevation view of the power operated rotary knife of FIG. 1, as seen from a plane indicated by the line 7-7 in FIG. 4.

As used herein, a front or distal end 101 of the power operated rotary knife 100 is an end of the knife 100 that includes the blade-blade housing combination 500, while a rear or proximal end 102 of the power operated rotary knife 100 is an end of the knife 100 that includes the handle assembly 110, and specifically, the enlarged end piece 160 threaded onto or attached to the elongated central core 152 of the hand piece retaining assembly 150. Upward or upward direction UP means in a direction generally parallel to the central axis of rotation R of the rotary knife blade 300 and, as shown in FIGS. 5 and 6, going in a direction from a first, upper end 456 of the blade support section 450 of the blade housing 400 to a second, lower end 458 of the blade support section 450. Downward or a downward direction DW means an axial direction generally parallel to the central axis of rotation R of the rotary knife blade 300 and the central axis CBH of the blade housing 400 and, as shown in FIGS. 6-8, going in a direction from the second, lower end 458 of the blade housing blade support section 450 to the first, upper end 456 of the blade support section 450. Annular, as used herein, means generally ring-like or generally ring-shaped in configuration and includes configuration wherein the ring include or does not include a split extending through a diameter of the ring or annulus. Axially above or axially spaced above, as used herein, means positioned above as viewed with respect to an axis, for example, the central axis of rotation R of the rotary knife blade 300, even if the two elements are not in axial alignment with respect to the axis. For example, the bearing race 322 of the rotary knife blade 300 is axially above or axially spaced above the cutting edge 361 of the rotary knife blade 300 with respect to the blade central axis of rotation R even though the blade bearing race 322 is spaced radially outwardly from the blade cutting edge 361 with respect to the blade central axis of rotation R. The terms axially below or axially spaced below, as used herein, means positioned below as viewed with respect to an axis, for example, the central axis of rotation R of the rotary knife blade 300, even if the two elements are not in axial alignment with respect to the axis. For example, the cutting edge 361 of the rotary knife blade 300 is axially below or axially spaced below the bearing race 322 of the rotary knife blade 300 with respect to the blade central axis of rotation R even though the blade cutting edge 361 is spaced radially inwardly from the blade bearing race 322 with respect to the central axis of rotation R. Similarly, axially extending, as used here, means one element extends from and is positioned above or below a second element with respect to an axis, even if the two elements are not in axial alignment with respect to the axis. For example, the blade section 360 extends axially from the body 310 with respect to the blade axis of rotation R even though portions of the blade section 360 are spaced radially inwardly from the body 310 with respect to the blade central axis of rotation R. Similarly, the terms radially offset from, radially outward of, radially inward of, as used herein, means one element is positioned offset from a second element, as viewed along a radius line extending radially from an axis, for example, the central axis of rotation R of the rotary knife blade 300, even if the two elements are not in radial alignment along the radius line because one element is axially above or axially below the other element.

Rotary Knife Blade 300

In one exemplary embodiment of the present disclosure, the rotary knife blade 300 of the power operated rotary knife 100 is a one-piece, continuous annular structure and rotates in the blade housing 400 about the central axis of rotation R. As can best be seen in FIGS. 11-16, the rotary knife blade 300 includes an upper end or a first end 302, and an axially spaced apart lower end or a second end 304, the lower or second end 304 includes the cutting edge 361 of the blade 300. The rotary knife blade 300 further includes an inner wall 306 and a radially spaced apart outer wall 308. The rotary knife blade 300 is comprised of the upper annular body 310 and an annular blade section 360 extending axially and radially inwardly from the body 310. As can be seen in FIGS. 11-15, the body 310 and the blade section 360 are both radially centered about the central axis of rotation R, that is, the body 310 and the blade section 360 are both concentric about the central axis of rotation R. In one exemplary embodiment, the rotary knife blade 300 is a so-called hook blade style rotary knife blade having the blade section 360 extending radially inwardly and axially downwardly with respect to the body 310 and defining an obtuse cutting angle CA (FIG. 11) and characterized by the blade section 360 having a generally frustoconical inner wall 366 that is suited for trimming or cutting relatively thin layers of material from an object to be trimmed (e.g., cutting or trimming a thin layer of fat or meat from an animal carcass). The generally planar inner wall 366 of the blade section 360 comprises a lower part of the inner wall 306 of the rotary knife blade 300. The inner wall 306 includes a generally curved path of travel for cut or trimmed material. The hook blade 300 is particularly useful for trimming relatively thin layers of material from a product, for example, trimming a thin layer of fat or meat tissue from a relatively planar, large piece of meat, as the power operated rotary knife 100 is moved over the product in a sweeping motion. For trimming thicker layers of material from a product, the hook blade 300 would not be as efficient because the curved path of travel of the cut or trimmed material layer would result in the power operated rotary knife 100 experiencing more drag and resistance during cutting or trimming. Thus, more effort would be required by the operator to move and manipulate the power operated rotary knife 100 to make the desired cuts or trims. Other rotary knife blade styles, such as flat blade and straight blade styles, are suitable for use with the power operated rotary knife 100 and the present disclosure contemplates differing styles and sizes of rotary knife blades and associated blade housing for rotational support of such differing blades. An explanation of differing rotary knife blade styles is found in the aforementioned U.S. Pat. No. 8,726,524 to Whited et al., which is assigned to the assignee of the present invention and is incorporated herein in its entirety by reference. In one exemplary embodiment, the rotary knife blade 300 has a maximum outer diameter ODB of 3.56 in.

The annular body 310 includes the upper or first end 312, which corresponds to the upper or first end 302 of the rotary knife blade 300, and an axially space apart lower or second end 314, which defines a boundary between the body 310 and the blade section 360. The upper annular body 310 further includes an inner wall 316, defining a portion of the blade inner wall 306, and, spaced radially outwardly (that is in a radial direction away from the blade axis of rotation R) from the inner wall 316 is the outer wall 318 of the body 310. The outer wall 318 of the body 310 defines a portion of the blade outer wall 308. In one exemplary embodiment, the outer wall 318 of the body 310 comprises three regions or portions, an upper portion 318a adjacent the upper or first end 312 of the body 310, a radially recessed middle portion 318b, and a lower portion 318c adjacent the lower or second end 314 of the body 310. The upper portion 318a of the outer wall 318 of the blade annular body 310 advantageously comprises an arcuate surface 319 that both includes the bearing surface 322 of the rotary knife blade 300 and includes an outer surface 340b of the driven gear 340. The arcuate surface 319 comprises an outer surface 342a of each of the individual teeth 342 of the plurality of teeth 341 of the driven gear 340 of the rotary knife blade. Stated another way, the arcuate surface 319, defines both the outer surface 340a of the driven gear 340 and defines the bearing region 320, that is, the bearing surface 322 of the rotary knife blade 300. The outer surface 340a of the driven gear 340 and the bearing surface 322 of the rotary knife blade 300 are coincident over at least an overlapping portion OP of the arcuate surface 319. In the overlapping portion OP of the arcuate surface 319, the outer surface 340a of the driven gear 340 and the bearing surface 322 are coincident, being in both overlapping axial alignment (i.e., as viewed with respect to the rotary knife blade axis of rotation R) and overlapping radial alignment (i.e., as viewed along a radius line extending orthogonally from the blade axis of rotation R). As discussed above with respect to wear rates, the overlapping radial and axial structure or configuration of the driven gear 340 and the bearing surface 322 of the rotary knife blade 300 of the present disclosure, under certain operating conditions and parameters, may advantageously reduce the gear reaction forces Fn3, Fn4 resulting from the gear force Fg and may advantageously provide for a reduced wear rate of the bearing region 320 of the rotary knife blade 300 and/or reduced wear rate of the driven gear 340 and/or reduced wear rate of the pinion gear 610. Alternatively, if predetermined wear rate or expected life requirements is imposed on a designer of a power operated rotary knife for the rotary knife and/or the pinion gear, the axially overlapping structure of the driven gear 340 and the bearing surface 322 of the rotary knife blade 300 may enable the designer to advantageously provide for increased rotational speed of the rotary knife blade, while still adhering to the predetermined wear rate or expected life requirements. Moreover, a reduction in wear rate of the bearing region 340 of the rotary knife blade 100 advantageously tends to additionally provide a longer working time intervals between operator adjustments to the blade housing diameter BHD of the blade support section 450 of the blade housing 400 to account for wear of the blade bearing region 320, as explained previously.

The arcuate surface 319 of the upper portion 318a of the outer wall 318 of the blade annular body 310 extends from a first upper end portion 319c through the second intermediate portion 319d and terminates at a third lower end portion 319e. The second intermediate portion 319d includes the midpoint location or radial outermost location 319k of the arcuate portion 319. The radial outermost location 319k defines the radially outermost extent of the arcuate surface 319 and the radially outermost extent of the rotary blade body 310. The first upper end portion 319c of the arcuate surface 319 is axially closer to the upper or first end 312 of the body 310 of the rotary knife blade 300 than the second intermediate portion 319d and the third lower end portion 319e of the arcuate surface 319 is axially closer to the lower or second end 314 of the body 310 of the rotary knife blade 300 than the second intermediate portion 319d. The second intermediate portion 319d includes the midpoint location or radial outermost location 319k which represents the furthest radial extent of the rotary knife blade 300 and thus defines the blade maximum outer diameter ODB and also defines the maximum radius RR of the annular ring 319f. The arcuate surface 319 is convex with respect to the blade central axis of rotation R and, when viewed in two dimensions in vertical or axial section, that is, when viewed in two dimensions with respect to or along a vertical or axial plane parallel to the blade central axis of rotation R, defines the radius of curvature RAD and the center of curvature or center point CPT of the arcuate surface 319. As noted previously, by convex, it is meant that the convex arcuate surface 319 bows outwardly with respect to an extent of, for example, the middle and lower portions 318b, 318c of the outer wall 318 of the body 310 and bows outwardly with respect to the blade central axis of rotation R. In one exemplary embodiment, the radius of curvature RAD of the convex arcuate surface 319 is 0.047 in, and, accordingly, the center of curvature or center point CPT is 0.047 in radially inward from the maximum outer diameter ODB, as defined by the second intermediate portion 319d and, more specifically, by the midpoint location 319k of the second intermediate portion 319d. The arcuate surface 319 includes the upper region 319a, which extends between the first upper end portion 319c and the second intermediate portion 319d, and the lower region 319b, which extends between the second intermediate portion 319d and the third lower end portion 319e. The arcuate surface 319 includes or defines the bearing region 320 of the rotary knife blade 300. That is the bearing region 320 comprises an arcuate bearing surface 322 which is encompassed within the arcuate surface 319 of the outer wall 318 of the blade body 310. Specifically, the arcuate bearing surface 322 of the rotary knife blade 300 includes the upper arcuate bearing surface or face 324a in the upper region 319a of the arcuate surface 319 and the lower arcuate bearing surface or face 324b in the lower region 319b of the arcuate surface 319. The upper arcuate bearing face 324a, when viewed in three dimensions, is a curved surface, converging in a direction proceeding toward the upper end 302 of the rotary knife blade, while the lower arcuate bearing face 324b is also a curved surface, converging in a direction proceeding toward the lower end 304 of the rotary knife blade 300. That is, as mentioned previously, it should be recognized that the upper and lower curved surfaces defined by the upper and lower arcuate bearing faces 324a, 324b have arcuate or curved, as opposed to linear, side walls. The center point CPT of the radius of curvature RAD of the arcuate surface 319 of the outer wall 318 of the blade body 310 is radially aligned along a radius line RD (FIG. 11) extending orthogonally from the rotary knife blade axis of rotation R to the midpoint location or radial outermost location 319k of the second intermediate portion 319d of the arcuate surface 319, that is, the radius line RD extending orthogonally from the central axis of rotation R to the radial outermost location 319k of the arcuate surface 319 extends through or passes through the center point or center of curvature CPT of the arcuate surface 319.

Extending axially in the downward direction DW from the upper or first end 312 of the body 310 is the driven gear 340. In one exemplary embodiment, an axial extent of each of the plurality of gear teeth 341 of the driven gear 340 extends axially below the midpoint location 319k of the second intermediate portion 319d. Specifically, a lower end 349b of the driven gear 340 (and, thus, a lower end 341c of each of the plurality of gear teeth 341), as viewed along the outer wall 318 of the body 310, extends to a position 318d that is between the second intermediate portion 319d and the third lower end portion 319e to a position 318d. Thus, advantageously, the outer surface 340b of the driven gear 340 defines: 1) an entirety of the upper arcuate bearing face 324a; and 2) at least a portion of the lower arcuate bearing face 324b. Such an overlapping axial configuration of the bearing surface 322 and the outer surface 340b of the driven gear 340 will advantageously tend to reduce the blade wear rate, as discussed previously.

The middle portion 318b of the outer wall 318 of the annular body 310 extends from an upper end 318d to a lower end 318e and defines a radially recessed region 330 of the outer wall 318. The radially recessed region 318 forms an annular channel 331. The annular channel 331 is generally rectangular when viewed in cross section (FIGS. 11 and 16) and is radially recessed with respect to the axis of rotation R as compared to a radial extent of the midpoint location or radial outermost location 319k of the second intermediate portion 319d of the arcuate surface 319 of the upper portion 318a of the outer wall 318 and a radial extent of an outer vertical surface 336 of the lower portion 318c of the outer wall 318. The annular channel 331 receives a mating radially projecting annular land 471 of the inner wall 452 of the blade support section 450 of the blade housing 400 to form a labyrinth seal that advantageously inhibits or mitigates the ingress of debris formed in the cutting/trimming process (small pieces of meat, fat, bones, gristle, connective tissue, etc) into the blade-blade housing bearing interface region 520. The annular channel 331 of the rotary knife blade body outer wall 318 and the mating annular land 471 of the blade housing blade section inner wall 452 are in close proximity but are not in bearing contact during normal operation of the power operated rotary knife 100.

The annular channel 331 includes a generally horizontal upper surface 332, an angled or frustoconical middle surface 333, and a generally horizontal lower surface 334, bridged by two short arcuate transition surfaces extending between the horizontal upper surface 332 and the frustoconical middle surface 333 and between the frustoconical middle surface 333 and the horizontal lower surface 334. The frustoconical middle surface 333 converges in a direction proceeding to the upper or first end 312 of the blade body 310 and because the middle surface 333 is angled, the effective distance that debris must travel from the lower end 458 of the blade support section 450 of the blade housing 400 to migrate into the blade-blade housing bearing interface region 520 is increased thereby increasing the effectiveness of the labyrinth seal formed by the mating configurations of the blade annular channel 331 and the blade housing annular land 471.

Additionally, the annular channel 331 of the rotary knife blade 300 advantageously serves to limit, by a hard stop, axial movement of the blade 300 within the blade housing 400. As noted above, the annular channel 322 receives the mating annular land 471 of the blade housing 400. The blade housing 400 is a split blade housing to allow for expansion of the blade housing for the purpose of changing rotary knife blades. As explained above, sufficient operating or running clearance is necessary so that rotary knife blade 400 rotates relatively freely within the blade housing 400 reducing friction and thereby reducing heat generated in the blade-blade housing bearing interface region 520. However, if too great of an operating or running clearance is provided, that is, the diameter of the blade housing 400 is too great, for example, because the operator did not adjust the blade housing diameter appropriately when changing rotary knife blades or for some reason during use of the power operated rotary knife 100, the blade housing diameter increased causing the blade 300 to be excessively loose within the blade housing 400, the interfitting of the annular channel 331 and the annular land 471 functions as a hard stop to prevent excessive axial movement of the blade 300 within the blade housing 400. That is, excessive movement of the blade 300 with respect to the blade housing 400 in an axial upward direction UP would be stopped by contact or a hard stop between the horizontal upper surface 332 of the annular channel 331 and a horizontal upper surface 472 of the annular land 471. Excessive movement of the blade 300 with respect to the blade housing 400 in an axial downward direction DW would be stopped by contact between the horizontal lower surface 334 of the annular channel 331 and a horizontal vertical surface 477 of the annular land 471.

The lower portion 318c of the outer wall 318 of the annular body 310 extends from an upper end 318f to a lower end 318g. The lower end 318g of the lower portion 318c is coincident with the lower or second end 314 of the annular body 310. The lower portion 318c includes an angled transition surface 335 which extends in a radially outwardly direction from the horizontal lower surface 334 to an outer vertical surface 336. In one exemplary embodiment, the radial extent of the outer vertical surface 336 is just less than the radial extent of the midpoint or radial outermost location 319k of the second intermediate portion 319d of the arcuate surface 319 of the upper portion 318a of the outer wall 318. Thus, the outer vertical surface 336 does not define the outer diameter ODB of the rotary knife blade 300.

The inner wall 316 of the annular body 310 extends from an upper end 316a to a lower end 316b and includes, at the upper end 316a, a generally vertical surface 337 that extends axially from the upper or first end 312 of the body 310 and defines an inner surface 340e of the driven gear 340. The inner wall 316 also includes an arcuate surface 338 that is part of a convex arcuate surface 307 of the inner wall 306 of the rotary knife blade 300. The convex arcuate surface 307 includes an upper curved portion 307a of the arcuate surface 307 that converges in the upward direction UP toward the upper end 302 of the rotary knife blade 300 and a lower curved portion 307b that converges in the downward direction DW toward the lower end 304 of the blade 300. The convex arcuate surface 307 is centered about the blade central axis of rotation R. Extending along most of the axial extent of the rotary knife blade 300, the convex arcuate surface 307 provides for smooth movement of cut or trimmed material in an upward direction UP from the cutting opening CO defined by the blade cutting edge 361 to the vertical surface 337 of the inner wall 316 of the body. The vertical surface 337 of the inner wall 316 of the body 310 continues the smooth movement of material from the convex arcuate surface 307 to the exit opening EO defined by the upper or first end 312 of the blade annular body 310.

In one exemplary embodiment, the blade section 360 of the rotary knife blade 300 includes an upper end 362, which defines the boundary between the body 310 and the blade section 360, and an axially spaced apart lower end 364. The upper end 362 of the blade section 360 terminates where the outer wall 368 has a "knee" or discontinuity point 362a. That is, the linear, angled outer wall 368 of the blade section 360 abruptly transitions at the "knee" or discontinuity point 362a to the vertically extending lower section 318c of the outer wall 318 of the blade body 310. Effective sharpening of the blade cutting edge 361 becomes more difficult above the "knee" point 362a due to the discontinuity of the blade outer wall 308 resulting from the "knee" or discontinuity point 362a. The lower end 364 of the blade section 360 includes the cutting edge 361 of the rotary knife blade 300. The knife blade section 360 includes an inner wall 366, defining a portion of the blade inner wall 306, and a radially spaced apart outer wall 368, defining a portion of the blade outer wall 308. The inner and outer walls 366, 368 are generally parallel. The inner wall 366 of the blade section 360 includes an upper arcuate or curved region 366a which is part of the convex arcuate surface 307 of the inner wall 306 of the rotary knife blade 300 and a lower angled or frustoconical region 366b adjacent the blade cutting edge 361. The lower frustoconical region 366b converges in a direction proceeding toward the lower end 304 of the blade 300. The outer wall 368 of the blade section 360 includes an angled or frustoconical region 368a, which like the lower angled or frustoconical region 366b converges in a direction proceeding toward the lower end 304 of the blade 300. The angled or frustoconical region 368a and the lower angled or frustoconical region 366b of the outer and inner walls 368, 366 are substantially parallel are both centered about the blade central axis of rotation R. The cutting edge 361 defines the circular or cutting opening CO of the rotary knife blade 300 through which trimmed or cut material passes. Additionally, the cutting edge 361 defines the cutting plane CP of the rotary knife blade 300. The blade cutting plane CP is substantially orthogonal to the blade central axis of rotation R. Cut or trimmed material flows or moves from the cutting edge 361 through the cutting opening CO, along the inner wall 306 of the rotary knife blade 300, that is, along the inner wall 366 of the blade section, then along the inner wall 316 of the annular body 310, in a generally upward direction UP from the cutting edge 361 to a circular exit opening EO defined by a vertex 313 between the inner wall 316 of the body 310 and the upper or first end 312 of the body 310. In one exemplary embodiment of the rotary knife blade 300, the cutting opening CO is approximately 3.27 in. The vertex 313 also defines the intersection between the inner wall 306 and the upper end 302 of the rotary knife blade 300. The cutting edge 361 is formed at the intersection of the inner wall 366 and a short horizontal region 370 bridging the inner and outer walls 366, 368 of the blade section 360. The short horizontal region 370 defines both the lower end 364 of the blade section and the lower end 304 of the rotary knife blade 300.

The driven gear 340 includes a plurality or set of circumferentially spaced apart gear teeth 341. The driven gear 340 and each of the gear teeth 342 of the plurality of gear teeth 331 extend radially between and extend through the inner and outer walls 316, 318 of the annular body 310. The driven gear 340 comprises the driven gear region 341a wherein the gear head 614 of the pinion gear 316 engages the gear teeth 341 of the driven gear 340 to rotate the rotary knife blade 300 about the central axis of rotation R. The driven gear 340 extends axially from an upper end 349a to the lower end 349b. As can best be seen in FIG. 16, the individual teeth 342 of set of gear teeth 341 of the driven gear 340 extend vertically upwardly as generally angled pie slice shaped or v-shaped teeth 342 from an annular base lower surface 343 defined by a bottom land 344 between adjacent gear teeth 342 to an annular top or upper surface 345 defined by the respective top lands 346 of the set of gear teeth 341. The upper surfaces 345 or top lands 346 of the set of gear teeth 341 define the upper end 349a of the driven gear 340, the upper end 302 of the rotary knife blade 300 and the upper or first end 312 of the annular body 310, while the lower surface 343 and bottom land 344 of the set of gear teeth 341 define the lower end 349b of the driven gear 340. Disposed between each pair of adjacent gear teeth 342 of the plurality of gear teeth 341 is a generally v-shaped or pie shaped opening or gap region 348. The v-shaped gap regions 348, taken together, form a set of v-shaped gaps 348a that extend circumferentially about the upper end 312 of the annular body 310 and within the driven gear region 340a, extending downwardly from the upper end 349a of the driven gear 340 to the lower end 349b of the driven gear 340 and extending radially between and through the inner and outer walls 316, 318 of the annular body 310. Because the set of v-shaped gaps 348a extend through the body outer wall 318, the arcuate surface 319 of the outer wall 318 is interrupted by peripheral or circumferential v-shaped openings 348b in the outer wall 318. Thus, in the overlap region OP, the bearing surface 322 is circumferentially interrupted by the set of v-shaped openings 348b in the outer wall 318 in the overlap region OP.

In one exemplary embodiment, given an axial height of the plurality of gear teeth 341 of the driven gear 340 extending downwardly from the upper end 312 of the blade body 310, an entirety of the upper bearing face 324a is circumferentially interrupted by the set of v-shaped openings 348b and a part or portion of the lower bearing face 324b is interrupted by the set of v-shaped openings 348b. However, it should be recognized that if an axial height of the plurality of gear teeth 342 is less or shallower, it may be the ease that only a part of the upper bearing face 324a is circumferentially interrupted by the set of v-shaped openings 348b and none of the lower bearing face 324b is interrupted by the set of v-shaped openings 348b. In one exemplary embodiment of the rotary knife blade 300, an axial or vertical distance between the upper and lower ends 349a, 349b of the driven gear 340, that is, a height of the driven gear 340 is approximately 0.074 in. As noted previously, the axial height of the driven gear 340 is dependent on a number of factors including the design and position of the gear train 604, the specific configuration of the rotary knife blade 300 and/or the cutting/trimming tasks the power operated rotary knife 100 is intended for.

Viewing the driven gear 341 in a radial direction, the driven gear extends from the vertically extending inner surface 340c to the arcuately extending outer surface 340b. A maximum outer diameter of the driven gear 340, as measured radially with respect to the blade central axis of rotation R, is coincident the maximum rotary knife blade outer diameter ODB. That is, the outer surface 340b of the driven gear 340 extends from the first upper end portion 319c of the arcuate surface 319, through the entirety of the upper region 319a, through the second intermediate portion 319d (including the midpoint location 319k of the second intermediate portion 319d which defines the blade outer diameter ODB) and into the lower region 319b. In one exemplary embodiment, a radial distance between the inner and outer surfaces 340c, 340b of the driven gear 340 is approximately 0.160 in. The outer surface 340b of the driven gear 340 is defined by a collective total of outer surfaces 342c of respective outer surfaces 342a of the individual gear teeth 342 of the set of gear teeth or plurality of gear teeth 341. Thus, the outer surface 340b driven gear 340 could equivalently be referred to as and is the same as the outer surfaces 342c of the plurality of gear teeth or the set of gear teeth 342. Advantageously, the outer surface 340b of the driven gear 340, that is, the outer surfaces 342c of the set or plurality of gear teeth 341, is arcuate, conforming to and forming a part of the arcuate surface 319 of the outer wall 318 of the body 310. Specifically, the outer surface 340b of the driven gear 340, that is, the outer surfaces 342c of the plurality of gear teeth 342, forms or defines all of the upper region 319a of the arcuate surface 319, forms or defines the second intermediate portion 319d (which includes the midpoint location 319k defining the blade outer diameter ODB) of the arcuate surface 319, and forms or defines a portion of the lower region 319b of the arcuate surface 319.

In one exemplary embodiment, an overall axial height of the rotary knife blade 300 is approximately 0.365 in. and the driven gear 340 comprises a spur gear with 110 gear teeth, a 32 diametral pitch and a 20° pressure angle. As discussed, other rotary knife blades styles, configurations, and sizes may be used with the power operated rotary knife 100 depending on the specific cutting/trimming application to be undertaken.

Blade Housing 400

As can best be seen in FIGS. 12, 12A, 17 and 18, in one exemplary embodiment of the present disclosure, the blade housing 400, that is, the annular split ring 401, includes the mounting section 402 and the blade support section 450. The blade support section 450 extends around the entire 360 degrees (360°) circumference of the blade housing 400, except for a circumferential discontinuity resulting from the blade housing split 401a. The blade support section 450, including radially spaced apart inner and outer walls 452, 454 of the blade support section 450, is centered about a central axis or center lane CBH (FIG. 17). In assembled condition of the rotary knife blade 300 and the blade housing 400, the blade housing center line CBH is substantially coincident with the rotary knife blade central axis of rotation R. As explained previously, due to the operating clearance between the rotary knife blade 300 and the blade housing 400 and the due to load forces Fl applied to the rotary knife blade 300, the blade axis of rotation R may be slightly angled or tilted with respect the blade central axis CBH. However, under non-loaded conditions, in assembled combination 500, the rotary knife blade 300 and the blade support section 450 of the blade housing 400 are substantially concentric with the rotary knife blade central axis of rotation R.

The inner wall 452 of the blade support section 450 includes an upper portion 452a, adjacent an upper end 456 of the blade support section 450, a middle portion 452b, which includes the blade housing bearing region 460, and a lower portion 452c, adjacent a lower end 458 of the blade support section 450. The outer wall 454 of the blade support section 450 is substantially vertical, parallel with the blade housing center line CBH, with angled transition portions or chamfers adjacent the upper and lower ends 456, 458 of the blade housing section 450. The upper portion 452a of the inner wall 452 is substantially vertical and parallel to the outer wall 454. The middle portion 452b of the inner wall 452 includes the bearing race 466, defining the bearing region 460 of the blade housing 400. The bearing race 466 extends radially into the inner wall 452. That is, the bearing race 466 forms a part of the inner wall 452 but extends radially inwardly with respect to a vertical wall portion or vertical extent 452d of the inner wall 452 defined by the upper portion 452a of the inner wall 452. The bearing race 466 extends into the inner wall 452 in a direction that is radially outwardly or radially away from the blade housing center line CBH. For example, the back wall portion 469 of the bearing race 466 is radially more distant from the blade housing center line CBH (and the blade axis of rotation R) than the vertical wall portion 452d of the upper portion 452a of the inner wall 452, while the vertical wall portion 452d is a radially innermost portion of the blade housing blade support section 450 and the blade housing 400, as measured with respect to the blade housing center line CBH.

As can best be seen in FIG. 12A, the bearing race 466 of the blade housing blade support section 450 includes a generally horizontally extending upper surface 467 and an axially spaced apart generally horizontally extending lower surface 468. Bridging the upper and lower surfaces 467, 468 of the bearing race 466 is the back wall portion or surface 469, which defines the blade housing bearing surface 462. In one exemplary embodiment, the back surface 469 of the bearing race 466 is generally v-shaped and includes the axially spaced apart upper and lower angled wall portions or surfaces 466a, 466b connected by the vertex 466c of the bearing race 466. The upper angled surface 466a, when viewed in three dimensions is frustoconical, converging in a direction proceeding toward the upper end 456 of the blade housing blade support section 450, while the lower angled surface 466b, when viewed in three dimensions is frustoconical, converging in a direction proceeding toward the lower end 458 of the blade housing blade support section 450. The upper angled surface 466a comprises the frustoconical or angled upper bearing face 464a of the bearing surface 462 and the lower angled surface 466b comprises the frustoconical or angled lower bearing face 464a of the bearing surface 462. In the present exemplary embodiment, given the arcuate shape of the blade bearing surface 322 and given the generally v-shape of the blade housing bearing surface 462, the upper and lower bearing faces 464a, 464b of the blade housing 400 are axially separated by an axial gap corresponding to a region of the vertex 466c of the bearing race 466. However, as would be recognized by one of skill in the art, depending on the configuration of the blade housing bearing surface 462, e.g., an arcuate blade housing bearing surface, there may not be an axial gap between the upper and lower bearing faces and, indeed, the upper and lower bearing faces may extent to the vertex of the hearing race.

The lower portion 452c of the inner wall 452 of the blade housing blade support section 450 includes the radially inwardly extending projection 470 which forms a labyrinth seal with the annular channel 331 of the outer wall 318 of the body 310 of the rotary knife blade 300, as explained previously. The projection 470, in one exemplary embodiment, defines a generally rectangular annular land 470. The land 470 includes an upper generally horizontal surface 472, which corresponds to the lower horizontal surface 468 of the bearing race 466, a radially inwardly extending V-shaped generally vertical surface 473, comprising a short angled upper surface portion 475 and a longer angled lower surface portion 476, and a horizontal lower surface 477 that defines the lower end 458 of the blade support section 450 of the blade housing 400.

The mounting section 402 of the blade housing 400 includes an inner wall 404 and the radially spaced apart outer wall 406 and a first upper end 408 and an axially spaced apart second lower end 410. The mounting section 402 circumferentially overlaps and defines a portion of the annular blade support section 450, subtending an angle of approximately 170°. Stated another way, the blade housing mounting section 402 extends approximately ½ of the way around the circumference of the blade housing 400. In the region of the mounting section 402, the mounting section 402 and the blade support section 450 overlap. Portions of upper end 408 of the mounting section 402 extend axially above the upper end 456 of the blade support section 450. Circumferentially, the mounting section 402 extends between axially tapered right and left ends 412, 414 of the mounting section 402. The tapered ends 412, 414 taper axially between the higher upper end 408 of the mounting section 402 and the lower upper end 456 of the blade support section 450.

As can best be seen in FIG. 18, the split 401a of the blade housing 400 is in a central region 411 of the mounting section 402 extends from the inner wall 404 through the outer wall 406 of the mounting section 402 to allow for expansion or contraction of the blade housing circumference for purposes of increasing or decreasing the blade housing diameter BHD. In the region of the split 401a, the upper end 408 of the mounting section 402 includes an arcuate recesses region 408a, which is centered about the split 401a, to allow for clearance of the gear head 614 of the pinion gear 610. The upper end 408 of the mounting section 402 includes two additional arcuate recessed regions 408b, 408c which permit clearance of respective ones of the pair of bosses 223c extending from the back wall 223 of the clamp body 222 of the clamping assembly 220. The recessed region 408b is circumferentially wider than the recessed region 408c to allow for expansion of the blade housing diameter while still providing clearance of the boss 223e. As noted previously, the blade housing 400 includes the pair of circumferential pry slots 430 formed in the outer wall 406 of the mounting section 402 which facilitate allowing an operator of the power operated rotary knife 100 to easily expand the diameter of the blade housing 400 for either changing the operating/running clearance of the rotary knife blade 300 within the blade housing 400 or for the purpose of changing the rotary knife blade 300, as previously explained, while still keeping the blade-blade housing combination 500 secured to the frame body arcuate mounting pedestal 252.

When the blade housing mounting section 402 is seated in the seating region 252a of the frame body 250, the rearward clamping surface 224 of the clamp body 222 seats against the frame mounting pedestal 252. Specifically, the arcuate outer surfaces 223d of the pair of bosses 223c of the rear wall 223 of the clamp body 222 seat and bear against corresponding arcuate recesses 252b of the forward wall 251 of the frame body 250. The mounting section 402 is thereby trapped between the rearward wall 223 of the clamp body 222 and the seating region 252a of the arcuate mounting pedestal 252 of the forward wall 251a of the frame body 250 and the blade-blade housing combination 500 is secured to the frame body 250.

As can best be seen in FIGS. 11, 12, 12A and 17-18, the blade support section 450 includes the annular inner wall 452 and the radially spaced apart annular outer wall 454. The blade support section 450 further includes a generally planar first upper end 456 and an axially spaced generally planar second lower end 458. The blade support section 450 extends about the entire 360° circumference of the blade housing 400, except for the circumferential discontinuity resulting from the blade housing split 401a. The blade support section 450 in a region of the mounting section 402 is continuous with and the blade support section inner wall 452 forms a portion of the inner wall 404 of the mounting section 402. As can be seen in FIG. 18, a portion 404a of the inner wall 404 of the mounting section 402 of the blade housing 400 within the horizontally extending dashed lines IWBS constitutes both a part of the inner wall 404 of the mounting section 402 and a part of the of the inner wall 452 of the blade support section 450. That is, the inner wall 404 of the mounting section 402 is coincident with the inner wall 452 of the blade support section 450. The dashed lines IWBS substantially correspond to an axial extent of the inner wall 452 of the blade support section 450, that is, the lines IWBS correspond to the upper end 456 and the lower end 458 of the blade support section 450.

The friction or drag experienced by the operator as the power operated rotary knife 100 is manipulated by the operator to move through a product is dependent, among other things, on the cross sectional shape or configuration of the blade-blade housing combination 500 in a cutting region CR of the assembled combination 550. The blade-blade housing combination 500 is configured and contoured to be as smooth and continuous as practical. As a layer of material is cut or trimmed from a product being processed (for example, a layer of tissue or a layer of meat or fat trimmed from an animal carcass) by moving the power operated rotary knife 100 in a cutting direction such that the rotating knife blade 300 and blade housing 400 move along and through the product to cut or trim the layer of material. As the power operated rotary knife 100 is moved by the operator, the blade edge 361 cuts the layer forming a cut portion of the layer. The cut portion moves along a cut or trimmed material path of travel through the cutting opening CO of the blade-blade housing combination 500 as the power operated rotary knife 100 advances through the product.

A new outer surface layer is formed as the layer is cut away from the product. The cut portion of the layer slides along the inner walls 366, 316 of the blade section 360 and body 310 of rotary knife blade 300, while new outer surface layer slides along the respective outer walls 368, 454 of the blade section 360 of the knife blade 300 and the blade support section 450 of the blade housing 400. The blade-blade housing combination 500 in the cutting region CR is shaped to extent possible to reduce drag and friction experienced by the operator when manipulating the power operated rotary knife 100 in performing cutting or trimming operations.

The blade-blade housing structure 500 of the present disclosure and the other features, characteristics and attributes, as described above, of the power operated rotary knife 100 may be used with a variety of rotary knife blades styles, configurations, and sizes and corresponding blade housings. As mentioned above, the exemplary rotary knife blade 300 is a hook blade style rotary knife blade. Numerous other blade styles, including, but not limited to, flat and straight style blades and combinations of blade styles may be utilized, with an appropriate blade housing, in the power operated rotary knife 100 of the present disclosure, as would be understood by one of skill in the art. It is the intent of the present disclosure to cover all such rotary knife blade styles and sizes, together with the corresponding blade housings, that may be used in the power operated rotary knife 100.

In one exemplary embodiment, the hand piece 120 and the elongated central core 152 of the handle assembly 110 may be fabricated of plastic or other material or materials known to have comparable properties and may be formed by molding and/or machining. The hand piece 120, for example, may be fabricated of two over molded plastic layers, an inner layer comprising a hard plastic material and an outer layer or gripping surface comprised of a softer, resilient plastic material that is more pliable and easier to grip for the operator. The frame body 250 of the head assembly 200 may be fabricated of aluminum or stainless steel or other material or materials known to have comparable properties and may be formed/shaped by casting and/or machining. The rotary knife blade 300 and blade housing 400 may be fabricated of a hardenable grade of alloy steel or a hardenable grade of stainless steel, or other material or materials known to have comparable properties and may be formed/shaped by machining, forming, casting, forging, extrusion, metal injection molding, and/or electrical discharge machining or another suitable process or combination of processes.

Second Embodiment—Power Operated Rotary Knife 1000

A second exemplary embodiment of a power operated rotary knife of the present disclosure is shown generally at 1000 in FIGS. 21-25. The power operated rotary knife 1000 includes an elongated handle assembly 1110, a head assembly 1200, releasably secured to a forward or distal end of the handle assembly 1110, and a drive mechanism 1600, including a gear train 1604. The power operated rotary knife 1000 extends between a distal or forward end 1001 and a proximal or rearward end 1002 of the knife 1000. The head assembly 1200 includes a frame body 1250 and clamping assembly 1220 which secures an assembled blade-blade housing combination 1500 to the frame body 1250. The assembled blade-blade housing combination 1500 includes an annular rotary knife blade 1300 and an annular blade housing 1400 supporting the rotary knife blade 1300 for rotation about the blade's central axis of rotation R.

The elongated handle assembly 1110 is substantially similar to the handle assembly 110 of the power operated rotary knife 100 of the first exemplary embodiment. The handle assembly 1110 extends along a longitudinal axis LA and includes a handle assembly throughbore 1115. The longitudinal axis LA of the handle assembly 1110 extends through a center of the elongated throughbore 1115 and is orthogonal to and intersects the rotary knife blade central axis of rotation R. The drive mechanism 1600 and gear train 1604 are substantially similar to the drive mechanism 600 and gear train 604 of the power operated rotary knife 100 of the first exemplary embodiment. The frame body 1250 and the clamping assembly 1220 of the head assembly 1200 are substantially similar to the frame body 250 and the clamping assembly 220 of the head assembly 200 of the power operated rotary knife 100 of the first exemplary embodiment. Various components and assemblies of the power operated rotary knife 1000 are substantially similar in structure and/or function to corresponding components and assemblies of the power operated rotary knife 100, as previously described. In the interest of brevity, components and assemblies of the power operated rotary knife 1000 that are similar to the corresponding components and assemblies of the power operated rotary knife 100 of the first exemplary embodiment in structure and/or function will not be fully described herein. Instead, reference is made to the description of such components and assemblies set forth above in connection with the power operated rotary knife 100, as set forth above. Materials/fabrication of components and assemblies of the power operated rotary knife 1000 are similar to materials/fabrication of corresponding components and assemblies of the power operated rotary knife 100, as described above. Such descriptions of components and assemblies of the power operated rotary knife 100 of the first exemplary embodiment are hereby incorporated by reference in the following description of the power operated rotary knife 1000 of the second exemplary embodiment. Identification of axes, lines, planes and directions for the power operated rotary knife 1000, as set forth herein, will be the same as used for the description of the power operated rotary knife 100 of the first exemplary embodiment.

The annular rotary knife blade 1300 (FIG. 23) of the power operated rotary knife 1000 is substantially similar in structure and function to the rotary knife blade 300 of the power operated rotary knife 100 of the first exemplary embodiment and includes an annular body 1310 and a blade section 1360 extending from the body 1310, substantially similar to the annular body 310 and the blade section 360 of the rotary knife blade 300. The annular rotary knife blade 1300 includes a driven gear 1340, substantially similar in structure and function to the driven gear 340 of the annular rotary knife blade 300, and a bearing region 1320, substantially similar in structure and function to the bearing region 320 of the annular rotary knife blade 300. An outer wall 1316 of the body 1310 of the rotary knife blade 1300 includes an arcuate surface 1319. The arcuate surface 1319 defines both a bearing surface 1322 of the bearing region 1320 and defines an outer surface 1340b of a driven gear 1340, substantially similar in structure and function to the arcuate surface 319 of the outer wall 316 of the body 310 of the annular rotary knife blade 300 of the first exemplary embodiment.

Blade Housing 1400

Figure 24:
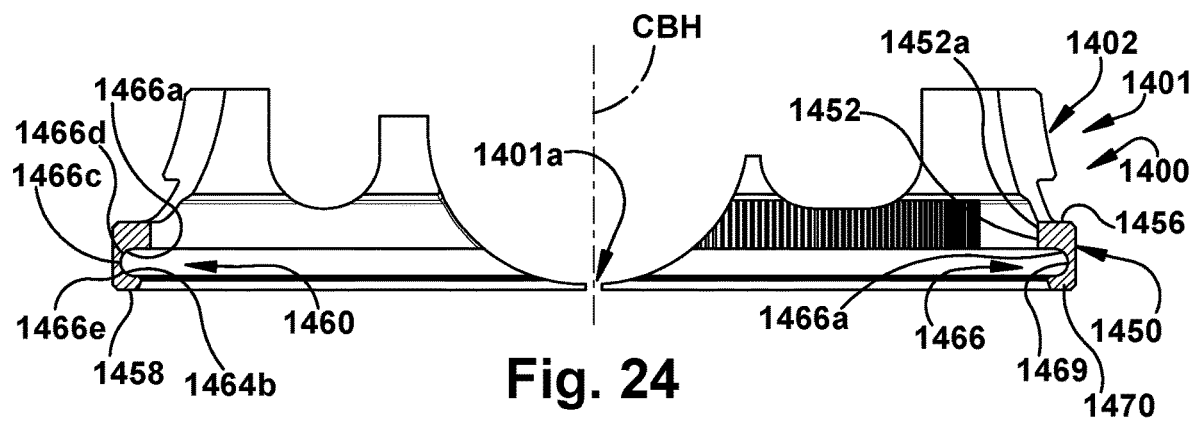
FIG. 24 is a schematic vertical section view of the annular split ring blade housing of the head assembly of the power operated rotary knife of FIG. 21.
Figure 25:
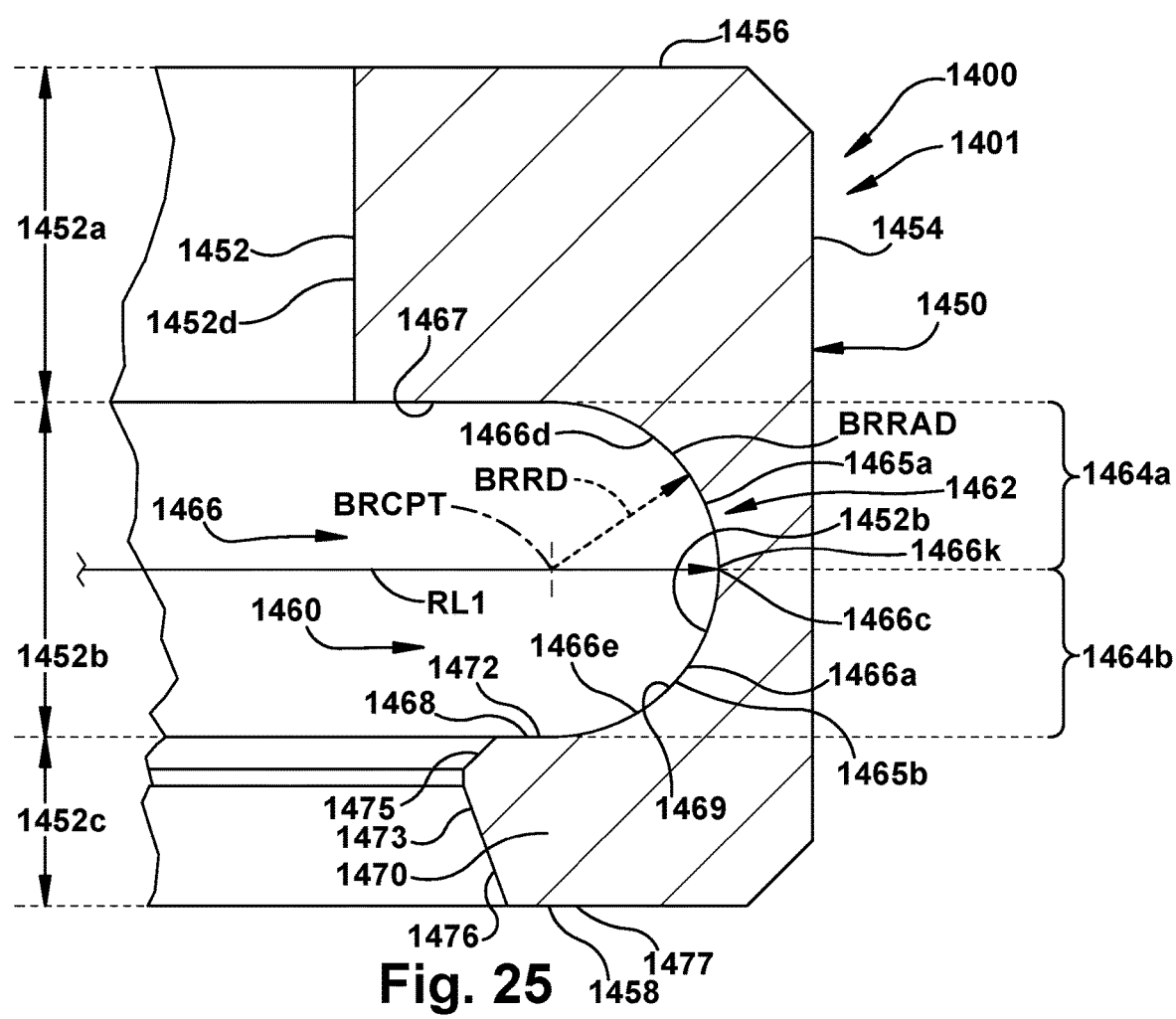
FIG. 25 is a schematic enlarged section view of a portion of the annular split ring blade housing of FIG. 24.
Figure 26:
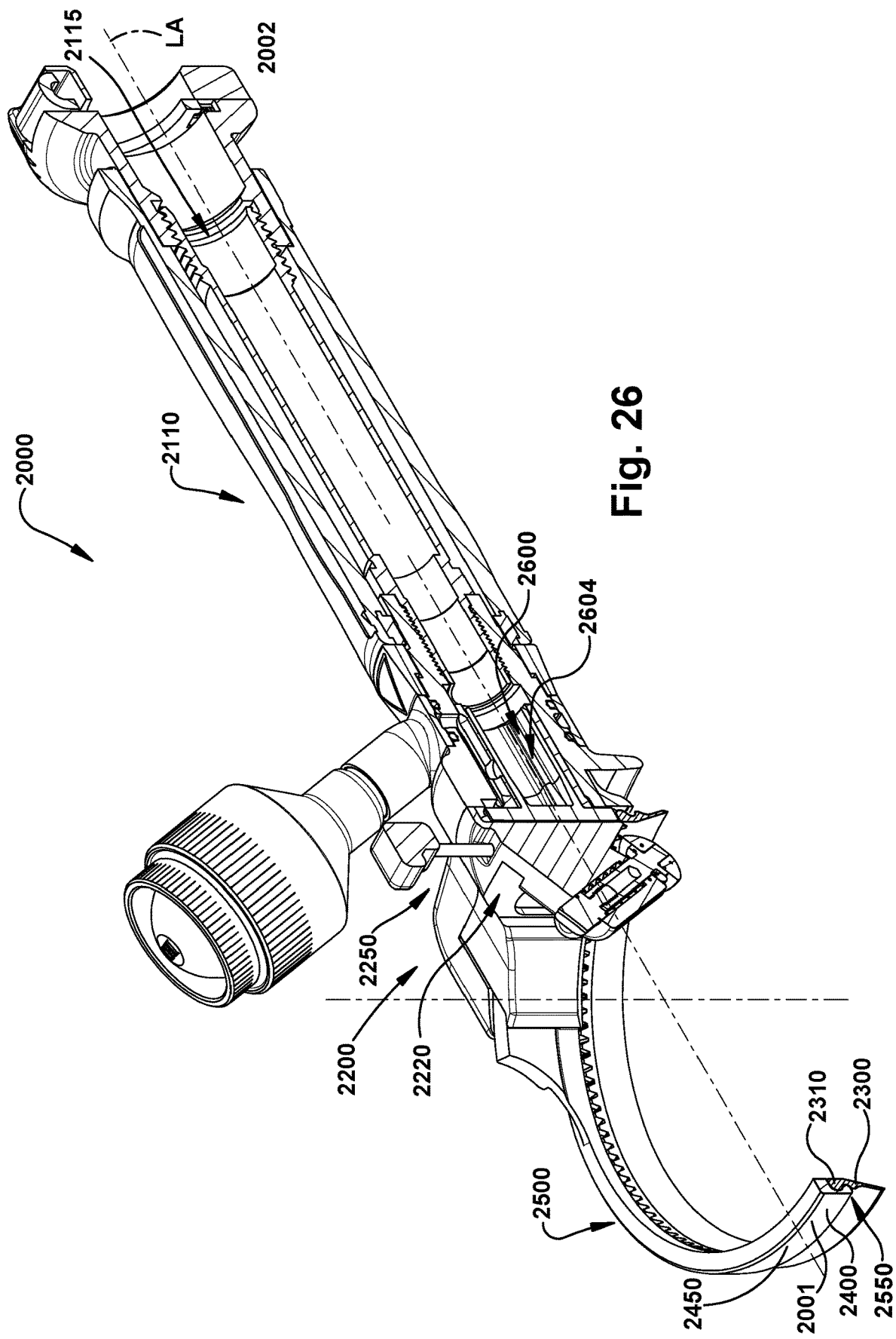
FIG. 26 is a schematic front perspective section view of a third exemplary embodiment of a power operated rotary knife of the present disclosure, including a head assembly, a handle assembly and a drive mechanism, the head assembly including a frame body and an assembled combination of an annular rotary knife blade and an annular split ring blade housing, the section view taken along a longitudinal axis of the handle assembly.
Figure 27:
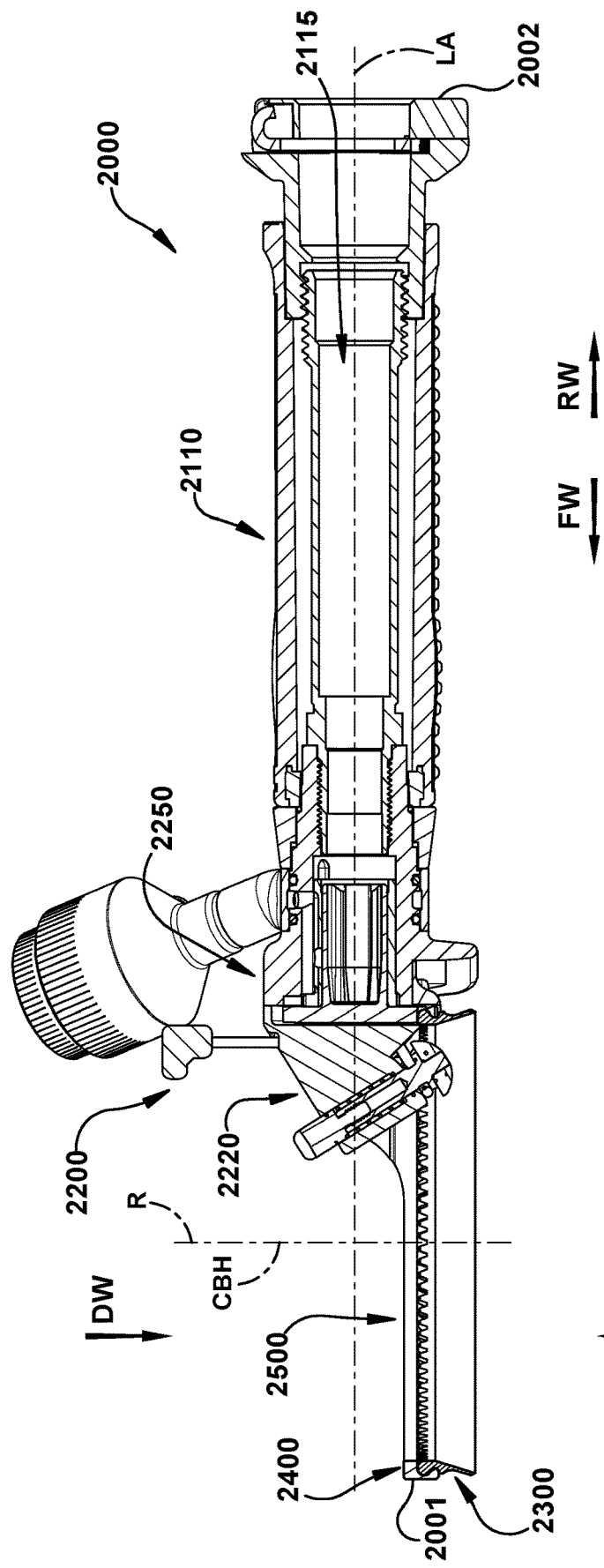
FIG. 27 is a schematic vertical section view taken along the longitudinal axis of the handle assembly of the power operated rotary knife of FIG. 26.

As best seen in FIGS. 24 and 25, the blade housing 1400 comprises an annular split ring 1401 and includes a mounting section 1402 and a blade support section 1450. The blade support section 1450 extends around the entire 360 degrees (360°) circumference of the blade housing 1400, except for a circumferential discontinuity resulting from the blade housing split. The blade support section 1450, including radially spaced apart inner and outer walls 1452, 1454 of the blade support section 1450, is centered about a central axis or center line CBH. In assembled condition of the rotary knife blade 300 and the blade housing 400, the blade housing center line CBH is substantially coincident with the rotary knife blade central axis of rotation R.

As best seen in FIG. 24, the mounting section 1402 of the annular blade housing 1400 is substantially similar in structure and function to the mounting section 402 of the annular blade housing 400 of the power operated rotary knife 100. With regard to the blade support section 1450, however, a bearing region 1460 of the blade support section 1450 is different than the bearing region 460 of the blade support section 450 of the blade housing 400 of the first exemplary embodiment. As such, a blade-blade housing bearing structure 1550 is different than the blade-blade housing bearing structure 550 of the power operated rotary knife 100 of the first exemplary embodiment. Specifically, as best seen in FIG. 25, like the annular bearing race 466 of the inner wall 452 of the blade support section 450 of the blade housing 400, a bearing region 1460 of a blade support section 1450 of the blade housing 1400 includes an annular bearing race 1466 extending radially into an inner wall 1452 of the blade support section 1430. However, unlike the bearing race 466 of the blade support section 450 of the blade housing 400 of the power operated rotary knife 100 of the first embodiment, the annular bearing race 1466 includes a back wall 1469 defining a continuous concave, arcuate surface 1466a characterized by a constant radius of curvature BRRAD. By concave, it is meant that the concave arcuate surface 319 bows inwardly, that is, in a radial direction away from the blade housing center line CBH and away from an extent of the upper and lower portions 452a, 452c of the inner wall 452 toward the outer wall 454 of the blade support section 450. Stated another way, the concave arcuate surface 319 bows radially away from the blade housing center line CBH in a direction toward the outer wall 454 of the blade support section 450. As shown schematically in FIG. 25, the radius of curvature BRRAD of the arcuate surface 1466a is characterized by center of curvature or center point BRCPT having a constant radius BRRD, as opposed to a pair of angled surfaces 466a, 466b of the blade housing bearing race 466 of the first exemplary embodiment.

The bearing race 1466 includes a generally horizontally extending upper surface 1467 and an axially spaced apart generally horizontally extending lower surface 1468. Bridging the upper and lower surfaces 1467, 1468 of the bearing race 1466 is the back wall portion or surface 1469 of the bearing race 1466 which includes the continuous concave, arcuate surface 1466a. The continuous concave, arcuate surface 1466a of the back wall portion 1469 of the blade housing bearing race 1466, when viewed in three dimensions, includes an upper arcuate or curved surface 1466d, extending above an intermediate portion 1466c of the bearing race 1466, and a lower arcuate or curved surface 1466e of the arcuate surface 1466a, extending below the intermediate portion 1466c of the arcuate surface 1466a. The intermediate portion 1466c includes a vertex location or a midpoint location 1466k of the arcuate surface 1466a which, as can best be seen in FIG. 25, represents a location that is radially furthest away from the blade housing central axis or center line CBH. The upper curved surface 1466d converges in a direction proceeding toward the upper end 1456 of the blade housing blade support section 1450, while the lower curved surface 1466e converges in a direction proceeding toward a lower end 1458 of the blade housing blade support section 1450. That is, the upper and lower curved surfaces 1466d, 1466e of the back wall surface 1469 have arcuate or curved, as opposed to linear, side walls.

The arcuate surface 1466a of the back wall 1469 of the bearing race 1466 defines an arcuate bearing surface 1462 comprising an upper arcuate bearing face 1464a, extending above the midpoint location 1466k, and a lower arcuate bearing face 1464b, extending below the midpoint location 1466k. The upper arcuate bearing face 1464a substantially corresponds to the upper curved surface 1466d and the lower arcuate bearing face 1464b corresponds to the lower curved surface 1466e. The upper and lower bearing faces 1464a, 1464b are part of a continuous concave arcuate surface defined by the arcuate surface 1466a of the back wall 1469 of the bearing race 1466 and that intersect at the intermediate portion 1466c of the arcuate surface 1466a of the bearing race 1466 characterized by the radius of curvature BBRAD and the center point BRCPT. The midpoint location 1466k of the intermediate portion 1466c is a center location of the annular bearing race 1466 that radially furthest away from the blade housing central axis or center line CBH. Since the bearing race 1466 is annular, when viewed in three dimensions, the midpoint location 1466k defines a circular line that is centered about the blade housing center line CBH. When viewed in longitudinal section in two dimensions, the upper bearing face 1464a and lower bearing face 1464b define arcuate upper and lower arcuate bearing lines 1465a, 1465b that would intersect in the intermediate portion 1466c. The center point BRCPT of the radius of curvature BRRAD of the arcuate surface 1466a is radially aligned along a horizontally extending straight or radius line RL1 (FIG. 25) extending orthogonally from the blade housing central line CBH to the midpoint location 1466c of the intermediate portion 1466c of the arcuate surface 1466a. If the blade axis of rotation R and the blade housing center line CBH are aligned, the radius line RL1 would be substantially coincident with the blade rotational plane RP.

To avoid binding between the blade bearing region 1320 and the blade housing bearing region 1460, advantageously, the radius of curvature BRRAD of the arcuate surface 1466a of the back wall 1469 of the blade housing bearing race 1466 is greater than the corresponding radius of curvature RAD of the arcuate surface 319 of the outer wall 318 of the rotary knife blade body 310. In one exemplary embodiment, the radius of curvature BRRAD of the arcuate surface 1466a of the back wall 1469 of the bearing race 1466 of the blade housing blade support section 1450 is 0.052 in., while the radius of curvature RAD of the arcuate surface 319 of the outer wall 318 of the rotary knife blade body 310 is 0.047 in., approximately 0.005 in. smaller radius. Advantageously, the close matching of the arcuate bearing surfaces 1322, 1462 of the rotary knife blade 1300 and the blade housing 1400 provide a greater potential bearing contact area which, under certain conditions, may result in a reduced wear rate for the respective bearing surfaces 1322, 1462. Advantageously, a reduction in wear rate of the bearing region 1320 of the rotary knife blade 1300 and/or a reduction in wear rate of the bearing region 1460 of the blade support section 1450 of the blade housing tends to increase working time intervals between operator adjustments to a blade housing diameter BHD of the blade support section 1450 of the blade housing 1400 to account for looseness of the rotary knife blade 1300 as it rotates within the blade support section 1450 of the blade housing 1400. Increasing working time intervals between operator adjustments to the blade housing diameter BHD increases operator productivity and decreases downtime.

Further, the advantages of the axially and radially overlapping structure or configuration of the driven gear 1340 and the bearing surface 1322 of the rotary knife blade 1300 of the present disclosure which, under certain use conditions, may advantageously reduce the gear reaction forces Fn3, Fn4 resulting from the gear force Fg and may, under certain us conditions, advantageously provide for a reduced wear rate of the bearing region 1322 of the rotary knife blade 1300 and/or reduced wear rate of the driven gear 1340 and/or reduced wear rate of the pinion gear 1610, as explained with respect to the power operated rotary knife 100 of the first exemplary embodiment, are equally applicable to the rotary knife blade 1300, the blade housing 1400, and the pinion gear 1610 of the second exemplary embodiment of the power operated rotary knife 1000.

In one exemplary embodiment of the present disclosure, the blade housing 1400 is an annular split ring 1401, including the mounting section 1402 and the blade support section 1450. The blade support section 1450 extends around the entire 360 degrees (360°) circumference of the blade housing 1400, except for a circumferential discontinuity resulting from the blade housing split. The mounting section 1402 is substantially similar to the mounting section 402 of the annular blade housing 400 of the first exemplary embodiment. The blade support section 1450, which includes radially spaced apart inner and outer walls 1452, 1454 and axially spaced apart upper and lower ends 1456, 1458, is centered about a central axis or center line CBH. In assembled condition of the rotary knife blade 1300 and the blade housing 400, the blade housing center line CBH is substantially coincident with the rotary knife blade central axis of rotation R. As explained previously with regard to the first exemplary embodiment, due to the operating clearance between the rotary knife blade 1300 and the blade housing 1400 and the due to load forces Fl applied to the rotary knife blade 1300, the blade axis of rotation R may be slightly angled or tilted with respect the blade central axis CBH.

However, under non-loaded conditions, in assembled combination 1500, the rotary knife blade 1300 and the blade support section 1450 of the blade housing 1400 are substantially concentric with the rotary knife blade central axis of rotation R.

The inner wall 1452 of the blade support section 1450 includes an upper portion 1452a, adjacent the upper end 1456 of the blade support section 1450, a middle portion 1452b, which includes the blade housing bearing region 1460, and a lower portion 1452c, adjacent the lower end 1458 of the blade support section 1450. The outer wall 1454 of the blade support section 1450 is substantially vertical and parallel with the blade housing center line CBH, with angled transition portions or chamfers adjacent the upper and lower ends 1456, 1458 of the blade housing section 1450. The upper portion 1452a of the inner wall 1452 defines a vertical wall portion or vertical extent 1452d that is substantially vertical and parallel to the outer wall 1454. The middle portion 1452b of the inner wall 1452 includes the blade housing bearing race 1466, defining the bearing region 1460 of the blade housing 1400. The bearing race 1466 extends radially into the inner wall 1452. That is, the bearing race 1466 extends into the inner wall 1452 in a direction that is radially outwardly or radially away from the blade housing center line CBH. For example, the back wall portion 1469 of the bearing race 1466 is radially more distant from the blade housing center line CBH (and the rotary knife blade axis of rotation R) than the vertical wall 1452d of the upper portion 1452a of the inner wall 1452.

The arcuate surface 1466a of the bearing race 1466 defines the blade housing bearing surface 1462. The arcuate bearing surface 1462 includes the upper arcuate bearing face 1464a, extending above the radially innermost location or vertex or midpoint 1466c of the arcuate surface 1466a of the bearing race 1466, and the lower arcuate bearing face 1464b, extending below the midpoint 1466c of the arcuate surface 1466a of the bearing race 1466. In the present exemplary embodiment, given the arcuate shape of the blade bearing surface 1322 and given the matching arcuate shape of the blade housing bearing surface 1462, the upper and lower bearing faces 1464a, 1464b of the blade housing 1400 extend from a common point or location, namely, the midpoint 1466c of the arcuate surface 1466a of the back wall 1469 of the bearing race 1466. As part of the blade-blade housing hearing structure 1550, the upper arcuate bearing face 1324a of the hearing surface 1322 of the rotary knife blade 1300 slidingly engages and bears against the upper arcuate or curved bearing face 1464a of the bearing surface 1464 of the blade housing 1400, while the lower arcuate bearing face 1324b of the bearing surface 1322 of the rotary knife blade 1300 slidingly engages and bears against the lower arcuate or curved bearing face 1464b of blade housing bearing surface 1462, to rotatably support and position the rotary knife blade 1300 with respect to the annular blade housing 1400 and define a rotational plane SRP of the blade 1300.

The lower portion 1452c of the inner wall 1452 of the blade housing blade support section 1450 includes the radially inwardly extending projection 1470 which forms a labyrinth seal with the annular channel 1331 of the outer wall 1318 of the body 1310 of the rotary knife blade 1300. The projection 1470, in one exemplary embodiment, defines a generally rectangular annular land 1470. The land 1470 includes an upper generally horizontal surface 1472, which corresponds to the lower horizontal surface 1468 of the bearing race 1466, a radially inwardly extending V-shaped generally vertical surface 1473, comprising a short angled upper surface portion 1475 and a longer angled lower surface portion 1476, and a horizontal lower surface 1477 that defines the lower end 1458 of the blade support section 1450 of the blade housing 1400.

The blade-blade housing structure 1550 of the present disclosure and the other features, characteristics and attributes, as described above, of the power operated rotary knife 1000 may be used with a variety of rotary knife blades styles, configurations, and sizes and corresponding blade housings. The exemplary rotary knife blade 1300 is a hook blade style rotary knife blade. Numerous other blade styles, including, but not limited to, flat and straight style blades and combinations of blade styles may be utilized, with an appropriate blade housing, in the power operated rotary knife 1000 of the present disclosure, as would be understood by one of skill in the art. It is the intent of the present disclosure to cover all such rotary knife blade styles and sizes and the corresponding blade housings, that may be used in the power operated rotary knife 1000.

Third Embodiment—Power Operated Rotary Knife 2000

A third exemplary embodiment of a power operated rotary knife of the present disclosure is shown generally at 2000 in FIGS. 26-30A. The power operated rotary knife 2000 includes an elongated handle assembly 2110, the head assembly 2200, releasably secured to a front or distal end of the handle assembly 2110, and a drive mechanism 2600, including a gear train 2604. The power operated rotary knife 2000 extends between a distal or forward end 2001 and a proximal or rearward end 2002 of the knife 1000. The head assembly 2200 includes a frame body 2250 and clamping assembly 2220 which secures an assembled blade-blade housing combination 2500 to the frame body 2250. The assembled blade-blade housing combination 2500 includes an annular rotary knife blade 2300 and an annular blade housing 2400 supporting the rotary knife blade 2300 for rotation about an axis of rotation R.

The handle assembly 2110 is substantially similar to the handle assembly 110 of the power operated rotary knife 100 of the first exemplary embodiment. The elongated handle assembly 2110 extends along a longitudinal axis LA and includes a handle assembly throughbore 2115. The longitudinal axis LA of the handle assembly 2110 extends through a center of the throughbore 2115 and is orthogonal to and intersects the rotary knife blade central axis of rotation R. The drive mechanism 2600 and the gear train 2604 are substantially similar to the drive mechanism 600 and gear train 604 of the power operated rotary knife 100 of the first exemplary embodiment. The frame body 2250 and the clamping assembly 2220 of the head assembly 2200 are substantially similar to the frame body 250 and the clamping assembly 220 of the head assembly 200 of the power operated rotary knife 100 of the first exemplary embodiment. Various components and assemblies of the power operated rotary knife 2000 are substantially similar in structure and/or function to corresponding components and assemblies of the power operated rotary knife 100 and/or the power operated rotary knife 1000, as previously described. In the interest of brevity, components and assemblies of the power operated rotary knife 2000 that are similar to the corresponding components and assemblies of the power operated rotary knife 100 of the first exemplary embodiment and/or the power operated rotary knife 1000 of the second exemplary embodiment in structure and/or function will not be fully described herein. Instead, reference is made to the description of such components and assemblies set forth above in connection with the power operated rotary knife 100 and the power operated rotary knife 1000, as set forth above. Materials/fabrication of components and assemblies of the power operated rotary knife 2000 are similar to materials/fabrication of corresponding components and assemblies of the power operated rotary knife 100, as described above. Such descriptions of components and assemblies of the power operated rotary knife 100 of the first exemplary embodiment and/or the components and assemblies of the power operated rotary knife 1000 of the second exemplary embodiment are hereby incorporated by reference in the following description of the power operated rotary knife 2000 of the third exemplary embodiment. Identification of axes, lines, planes and directions for the power operated rotary knife 2000, as set forth herein, will be the same as used for the description of the power operated rotary knife 100 of the first exemplary embodiment and/or the power operated rotary knife 1000 of the second exemplary embodiment.

The differences between the power operated rotary knife 2000 of the third exemplary embodiment and the power operated rotary knives 100, 1000 of the first and second exemplary embodiments, resides primarily in the configuration of respective blade-blade housing bearing structures 2550, 1550, 550. Specifically, in the blade-blade housing bearing structure 2550 of the power operated rotary knife 2000, there are two bearing structures, namely, a first blade-blade housing bearing structure 2560 and a second blade-blade housing bearing structure 2570. The first blade-blade housing bearing structure 2560, in one exemplary embodiment, is substantially similar in structure and function to the blade-blade housing bearing structure 1550 of the power operated rotary knife 1000 of the second exemplary embodiment. The first blade-blade housing bearing structure 2560 comprises the convex bearing surface 2322 of the rotary knife blade 2300 and the concave bearing surface 2462 of the blade support section 2450 of the blade housing 2400, substantially similar to the convex bearing surface 322 of the rotary knife blade 300 and the concave bearing surface 462 of the blade housing blade support section 450.

The second blade-blade housing bearing structure 2570 (FIG. 28), spaced axially below the first blade-blade housing bearing structure 2560, includes a radially inwardly extending or concave bearing race 2380 formed in an outer wall 2318 of a body 2310 of the rotary knife blade 2300 which engages and bears against a convex protruding bearing bead 2480 of an inner wall 2452 of the blade support section 2450 of the annular blade housing 2400 during operation of the power operated rotary knife 2000. Specifically, the protruding bearing bead 2480 of the inner wall 2452 of the blade support section 2450 defines a second arcuate bearing surface 2482 of the blade housing 2400, the second arcuate bearing surface 2482 being convex with respect to the inner wall 2452 and extending in a direction of a center line CBH of the blade support section 2450 of the blade housing 2400. The bearing race 2380 of the outer wall 2318 of the blade body 2310 defines the second arcuate bearing surface 2382 of the bearing region 2320 of the rotary knife blade 2300, the second arcuate bearing surface 2382 being concave with respect to the outer wall 2318 of the body 2310 of the rotary knife blade 2300 and extending in a direction toward the blade central axis of rotation R. The concave bearing race 2380 of the blade body 2310 extends along the outer wall 2318 of the body 2310 in a radial direction toward the blade central axis of rotation R from an upper end portion 2381c, through an intermediate portion 2381d and terminates at a lower end portion 2381e of the bearing race 2380. The intermediate portion 2381d of the bearing race 2380 defines a radially innermost midpoint location or intermediate location 2381k of the bearing race 2380 and, in one exemplary embodiment, defines a radially innermost location of the outer wall 2318 of the body 2310. The bearing race 2380 includes an arcuate upper region 2381a extending between the upper end portion 2381c and the intermediate portion 2381d and an arcuate lower region 2381b extending between the intermediate portion 2381d and the lower end portion 2381e. The second bearing surface 2382 includes an arcuate upper bearing face 2384a in the arcuate upper region 2381a of the bearing race 2380 disposed above the midpoint location 2381k and further includes an arcuate lower bearing face 2384b in the arcuate lower region 2381b of the bearing race 2380. The second bearing surface 2382 of the bearing race 2380 is defined by a concave arcuate surface 2380a of the bearing race 2380 which is part of a concave central portion 2385 of the bearing race 2380. The concave central portion 2385 includes the arcuate upper and lower regions 2381, 2381b, as described above.

Advantageously, the addition of the second blade-blade housing bearing structure 2570, under certain operating conditions and parameters, including load and gear threes applied to the blade 2300, may reduce the wear rate experienced by a bearing region 2320 of the rotary knife blade 2300 and/or a bearing region 2460 of a blade support section 2450 of the blade housing 2400. Equally advantageously, if the wear rate for the rotary knife blade 2300, including the bearing region 2320, as well as other wear areas of the blade 2300, and blade housing, including the bearing region 2460, are below a desired or target wear rate, blade rotational speed may be increased by a designer until the blade and blade housing wear rates approach the respective target wear rates. Such an increase in blade rotational speed provides for advantages of reduced operator effort for cutting and trimming operations and longer time between blade sharpenings, as discussed above. Additionally, reducing the wear rate experienced by the bearing region 2320 of the rotary knife blade 2300 and/or the bearing region 2460 of the blade housing blade support section 2450 may also advantageously tend to increase working time intervals between operator adjustments to a circumference of the blade housing 2400 to reduce a blade housing diameter BHD of the blade support section 2450 of the blade housing 2400 to tighten the blade housing blade support section 2450 about the rotary knife blade 2300 as the blade 2300 within the blade support section 2450. Increasing working time intervals between operator adjustments to the blade housing diameter BHD increases operator productivity and decreases downtime.

In one exemplary embodiment of the power operated rotary knife 2000, the second blade-blade housing bearing structure 2570, replaces the labyrinth seal formed by the interfitting of the annular channel 331 of the middle portion 318b of the outer wall 318 of the body 310 of the rotary knife blade 300 and the radially projecting annular land 471 of the inner wall 452 of the blade support section 450 of the blade housing 400 of the power operated rotary knife 100 of the first exemplary embodiment. Specifically, the annular channel 331 of the middle portion 318b of the body 310 of the rotary knife blade 300 of the first embodiment is replaced by the bearing race 2380 forming a lower portion 2318b of the outer wall 2318 of the body 2310 of the rotary knife blade 2300 of the third exemplary embodiment. The bearing race 2380 which forms part of the outer wall 2318 extends radially into an extent of the outer wall 2318, as, for example, defined by a vertical section 2318d of a lower portion 2318c of the outer wall 2318, in a direction toward the blade central axis of rotation R. A central portion 2384 of the bearing race 2380 extending between the upper end portion 2381c and the lower end portion 2381e includes an arcuate surface 2380a. The arcuate surface 2380 defines the second concave arcuate bearing surface 2382 of the rotary knife blade bearing region 2320 and is part of the second blade-blade housing bearing structure 2570. Similarly, the annular land 471 of the middle portion 452b of the inner wall 452 of the blade support section 450 of the blade housing 400 is replaced by bearing bead 2480 forming a middle portion 2452b of an inner wall 2452 of the blade housing blade support section 2450. In a central portion 2485, the bearing bead 2480 includes a convex arcuate surface 2480a. The convex arcuate surface 2480a defines the second convex arcuate bearing surface 2482 of the blade housing bearing region 2460 and is part of the second blade-blade housing bearing structure 2570.

Figure 28:
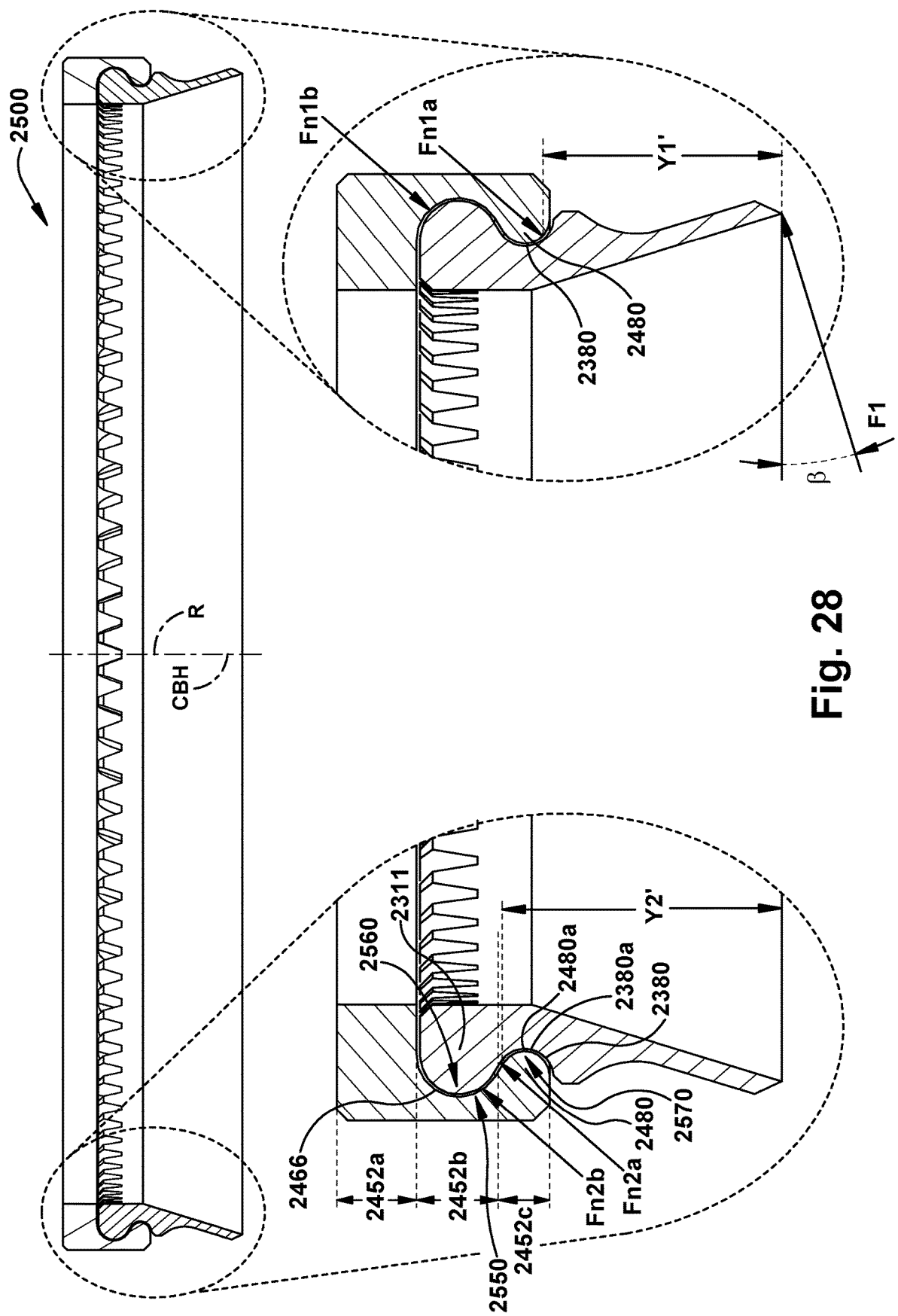
FIG. 28 is a schematic section view of the assembled combination of the rotary knife blade and the annular split ring blade housing of the head assembly of the power operated rotary knife of FIG. 26.

The reason that the addition of the second blade-blade housing bearing structure 2570 to the assembled combination 2500 of the rotary knife blade 2300 and the annular blade housing 2400, under certain operating and load conditions, contributes to lower wear rate for the blade bearing region 2320 and the blade housing bearing region 2460, as compared to, for example, the wear rate for the blade bearing region 320 of the rotary knife blade 300 and the blade housing bearing region 460 of the blade housing 400 of the power operated rotary knife 100 of the first exemplary embodiment is as follows. As schematically illustrated in FIG. 28, assume that a load force applied to the rotary knife blade 2300 can be considered as a load force vector Fl that is applied at an angle β to a cutting edge 2361 of the blade section 2360 of the rotary knife blade 2300. Further assume that the load force vector Fl is substantially identical in direction and magnitude force to the load force vector Fl applied at an angle β to the cutting edge 361 of the blade section 360 of the rotary knife blade 300 (as schematically illustrated in FIG. 11). For this explanation, assume that the configuration of the two rotary knife blades 2300, 300 are identical with respect to all aspects except for the addition of the second blade-blade housing bearing structure 2570 in the rotary knife blade 2300, even though it is recognized, of course, that the annular rotary knife blade 2400 depicted in the third exemplary embodiment is a straight style blade, as opposed to a hook style blade of the annular rotary knife blade 300 of the first exemplary embodiment.

As was the case with the power operated rotary knife 100, operating clearance is provided between the rotary knife blade 2300 and the blade housing 2400 resulting in the teeter-totter or tilting effect of the blade 2300 within the blade housing 2400 when a load force vector Fl is applied at a given location of the blade cutting edge 2361, as explained previously. Viewing the reaction forces experienced by the rotary knife blade 2300 resulting from bearing region 2320 of the rotary knife blade 2300 being urged against corresponding the bearing region 2460 of the blade support section 2460 of the blade housing 2400 due the application of the load force vector Fl, it can be seen that, because of the addition of the second blade-blade housing hearing structure 2370, the two reaction force vectors, schematically depicted as Fn1, Fn2 in FIG. 11, in the rotary knife blade 300 of the first exemplary embodiment are now divided into four reaction force vectors labeled Fn1a, Fn1b, Fn2a, Fn2b in FIG. 28. That is, as experienced by the blade 2300, the first reaction force vector Fn1 is split between two reaction force vectors Fn1a, Fn1b experienced by the blade 300. Similarly, as experienced by the blade 2300, the second reaction force vector Fn2 is split between two reaction force vectors Fn2a, Fn2b.

With the rotary knife blade 2300, a vertical or axial distance Y1' (FIG. 28) between the blade cutting edge 2361 and a location where the first reaction force vector Fn1a is applied to the lower bearing face 2384b of the second bearing surface 2382 of the blade 2300 is less than a vertical distance Y1 (FIG. 11) between the blade cutting edge 316 and a location where the first reaction force vector Y1 is applied to the upper bearing face 324a of the bearing surface 322 of the blade 2300. Similarly, with the rotary knife blade 2300, a vertical or axial distance Y2' (FIG. 28) between the blade cutting edge 2361 and a location where the second reaction force vector Fn2a is applied to the upper bearing face 2384a of the second bearing surface 2382 of the blade 2300 is less than a vertical distance Y2 (FIG. 11) between the blade cutting edge 316 and a location where the first reaction force vector Y2 is applied to the lower bearing face 324b of the bearing surface 322 of the blade 2300. Accordingly, in the rotary knife blade 2300, since at least a portion of the reaction force vectors Fn1, Fn2, namely, reaction force vectors Fn1a, Fn2a, are acting at vertical or axial distances (Y1', Y2') between the load force vector Fl and the reaction forces vectors that are less than the corresponding vertical distances (Y1, Y2) between the load force vector Fl and the reaction force vectors Fn1, Fn2, this results in a smaller torque or moment of force experienced by the rotary knife blade 2300 as a result of the load force Fl, as compared to the torque or moment of force experienced by the rotary knife blade 300 as a result of the substantially identical load force Fl. Additionally, the reaction force Fn1 is now shared between two different bearing surfaces, namely, the upper bearing face 2324a of the first bearing surface 2322 (receiving reaction force vector Fn1b) and the lower bearing face 2384b of the second bearing surface (receiving reaction force vector Fn1a), while the reaction force Fn2 is now shared between two different bearing surfaces, namely, the lower bearing face 2324b of the first bearing surface 2322 (receiving reaction force vector Fn2b) and the upper bearing face 2384a of the second bearing surface 2382 (receiving reaction force vector Fn2a). By splitting the load reaction forces Fn1, Fn2, the reaction forces experience by each of the four bearing faces 2324a, 2324b, 2384a, 2384b is reduced, thus, effectively reducing the wear rate of each of the bearing faces. The combination of reduced torque or moment of force applied to the blade and the splitting of the reactions forces effectively reduces the wear rate of the bearing region 2320 of the rotary knife blade 2300.

The same reasoning applies equally to the reaction forces experienced by the blade housing bearing region 2460 of the annular blade housing 2400, resulting from application of the load force vector Fl to the blade 2300, as compared to the reaction forces experienced by the blade housing bearing region 360 of the annular blade housing 400, resulting from application of the load force vector Fl to the blade 300. As such, under certain operating conditions and parameters, including load and gear forces applied to the blade 2300, may reduce the wear rate experienced by the bearing region 2320 of the rotary knife blade 2300 and/or the bearing region 2460 of a blade support section 2450 of the blade housing 2400, as discussed previously. Also, as mentioned previously, lower wear rates of the respective blade and blade housing bearing regions 2320, 2460 will also advantageously increase the time between operating adjustments of blade housing circumference. Adjustments to the blade housing circumference are required when the operator senses excessive movement or play of the rotary knife blade 2300 within the blade housing 2400 during operation which is typically manifested to the operator through increased vibration of the power operated rotary knife 2000 during operation of the knife. One source of such undesirable movement or play is caused by wear of the blade and blade housing bearing regions 2320, 2460 as the power operated rotary knife 2000 is operated, which causes the rotary knife blade 2300 to rotate more and more loosely within the blade housing 2400 as bearing wear continues. All other things being equal, the lower the bearing region wear rates of the rotary knife blade 2300 and the blade housing 2400, advantageously, the longer the operating time period between blade housing circumference adjustments made by the operator, leading to less down time and greater operator productivity. Finally, lower wear rates of the bearing regions 2320, 2460 of the rotary knife blade 2300 and the blade housing 2400 tends to reduce premature wear of respective meshing gear teeth of a pinion gear 2610 of the gear train 2604 and the driven gear 2340 of the rotary knife blade 2300. Wear of the bearing regions 2320, 2460 of the rotary knife blade 2300 and the blade housing 2400 tends to cause separation between the meshing gear teeth of the pinion gear 2610 and the driven gear 2340. Such separation of the meshing gear teeth may result in premature wear of the respective gear teeth of the pinion gear 2610 and the driven gear 2340. Lower wear rates of the bearing regions 2320, 2460 of the rotary knife blade 2300 and the blade housing 2400 militates against such separation of the meshing gear teeth and tends to reduce premature wear of the pinion gear 2610 of the gear train 2604 and the driven gear 2340 of the rotary knife blade 2300.

Rotary Knife Blade 2300

The annular rotary knife blade 2300 (FIG. 29) of the third exemplary embodiment includes the body 2310 and the blade section 2360 extending from the body 2310. The rotary knife blade 2300 includes an upper end or first end 2302 and an axially spaced apart lower end or second end 2304 and an inner wall 2306 and a radially spaced apart outer wall 2308. The blade 2300 is centered about and rotates about its central axis of rotation R. In one exemplary embodiment, the rotary knife blade 2300 is a straight style rotary knife blade in which the cutting angle CA of the blade section 2360 with respect to the blade cutting plane CP defined by the blade cutting edge 2361 is less than 90°. The cutting angle CA of the straight blade 2300 is very "steep" and more aggressive than a flat blade or a hook blade, such as the rotary knife blades 300, 1300. A straight blade is particularly useful when make deep or plunge cuts into a product, i.e., making a deep cut into a meat product for the purpose of removing connective tissue/gristle adjacent a bone. However, the blade-blade housing bearing structure 2550 of the present disclosure and the other features, characteristics and attributes, as described, of the power operated rotary knife 2000 may be used with a variety of rotary knife blades styles, configurations, and sizes and corresponding blade housings.

The body 2310 of the annular rotary knife blade 2300 includes an upper or first end 2312 and an axially spaced apart lower or second end 2314 and an inner wall 2316 and the radially spaced apart outer wall 2318. The blade section 2360 includes an upper end 2362, defined by a discontinuity or knee 2362a in an outer wall 2368 of the blade section 2360, and a lower end 2364, which is coincident with the blade cutting edge 2361. The body 2310 of the rotary knife blade 2300 includes a driven gear 2340, substantially similar to the driven gear 340 of the blade body 300 of the first exemplary embodiment and the outer wall 2318 of the blade body 2310 includes an arcuate surface 2319, substantially similar to the arcuate surface 319 of the blade body 300 of the first exemplary embodiment. The arcuate surface 2319 includes both an outer surface 2340b of the driven gear 2340 and the first hearing surface 2322, substantially similar to the outer surface 340b of the driven gear 340 and the bearing surface 322 of the blade body 310 of the first exemplary embodiment. The arcuate surface 2319, when viewed in three dimensions, may be viewed as an annular protruding bearing bead 2311, forming a radially protruding portion of the outer wall 2318 of the blade body 2310 and defining the first hearing surface 2322. The outer wall 2318 of the body 2310 includes an upper portion 2318a, a middle portion 2318b, and a lower portion 2318c.

As mentioned above, the bearing region 2320 of the blade body 2310 includes both the first bearing surface 2322, defined by the convex arcuate surface 2319, and the second bearing surface 2382, defined by the concave arcuate surface 2380a. The second bearing surface 2382 is part of a central portion 2385 of the bearing race 2380. The central portion 2385 of the bearing race 2380, which includes both the upper and lower regions 2381a, 2381b of the bearing race 2380, defines the concave arcuate surface 2380a. The concave arcuate surface 2380a, in turn, defines the second bearing surface 2382, including the upper and lower bearing faces 2384a, 2384b. When viewed in two dimensions, the concave arcuate surface 2380 is characterized by a constant radius of curvature RAD2 and a center point CPT2. In one exemplary embodiment, the arcuate surface 2380a has a radius of curvature RAD2 of approximately 0.035 in. The first bearing surface 2322 is part of the rotary knife blade bearing region 2320 and is part of the first blade-blade housing bearing structure 2560, while the second bearing surface 2382 is part of the rotary knife blade bearing region 2320 and is part of the second blade-blade housing bearing structure 2570 of the combined blade-blade housing bearing structure 2550.

The upper portion 2318a of the outer wall 2318 of the rotary knife blade body 2310 includes the convex arcuate surface 2319, substantially similar to the arcuate surface 319 of the outer wall 318 of the rotary knife body 310 of the first exemplary embodiment, which comprises both the outer surface 2340b of the driven gear 2340 and the bearing surface 2322. The arcuate surface 2319 is characterized as being a constant radius of curvature RAD and a center point CPT. The bearing surface 2322 includes an upper bearing face 2324a disposed above a midpoint location or radial outermost location 2319k of a second intermediate portion 2319d of the arcuate surface 2319 and a lower bearing face 2324b disposed below the midpoint location or radial outermost location 2319k of the second intermediate portion 2319d.

The middle portion 2318b of the outer wall 2318 of the rotary blade body 2310 includes the radially inwardly extending or concave bearing race 2380. The bearing race 2380 includes the central or middle portion 2385 that defines the concave arcuate surface 2380a. As mentioned previously, the concave arcuate surface 2380a defines the second bearing surface 2382. The second bearing surface 2382 includes the upper bearing face 2384a disposed above a midpoint or radially innermost location 2380c of the arcuate surface 2380a and the lower bearing face 2384b disposed below the midpoint 2380c. The midpoint 2380c of the arcuate surface 2380a corresponds to and is coincident with the radially innermost midpoint location 2381k of the bearing race 2380. Viewed in three dimensions, it should be understood that the midpoint locations 2380c, 2381k form a circle centered about the blade central axis of rotation R since the arcuate surface 2380a of the bearing race 2380 forms a portion of an inner surface of an annular ring having a circular cross section (bull's nose ring). Reference is made to the discussion of the annular ring 319f of the convex arcuate surface 319 of the rotary knife blade 300 of the first exemplary embodiment. The difference here being that the arcuate surface 2380a of the bearing race 2380, being concave, would correspond to a portion of an inner surface of the annular ring, as opposed to a portion of the outer surface of the annular ring 319f corresponding to the convex arcuate surface 319 of the rotary knife blade 300.

Figure 29:
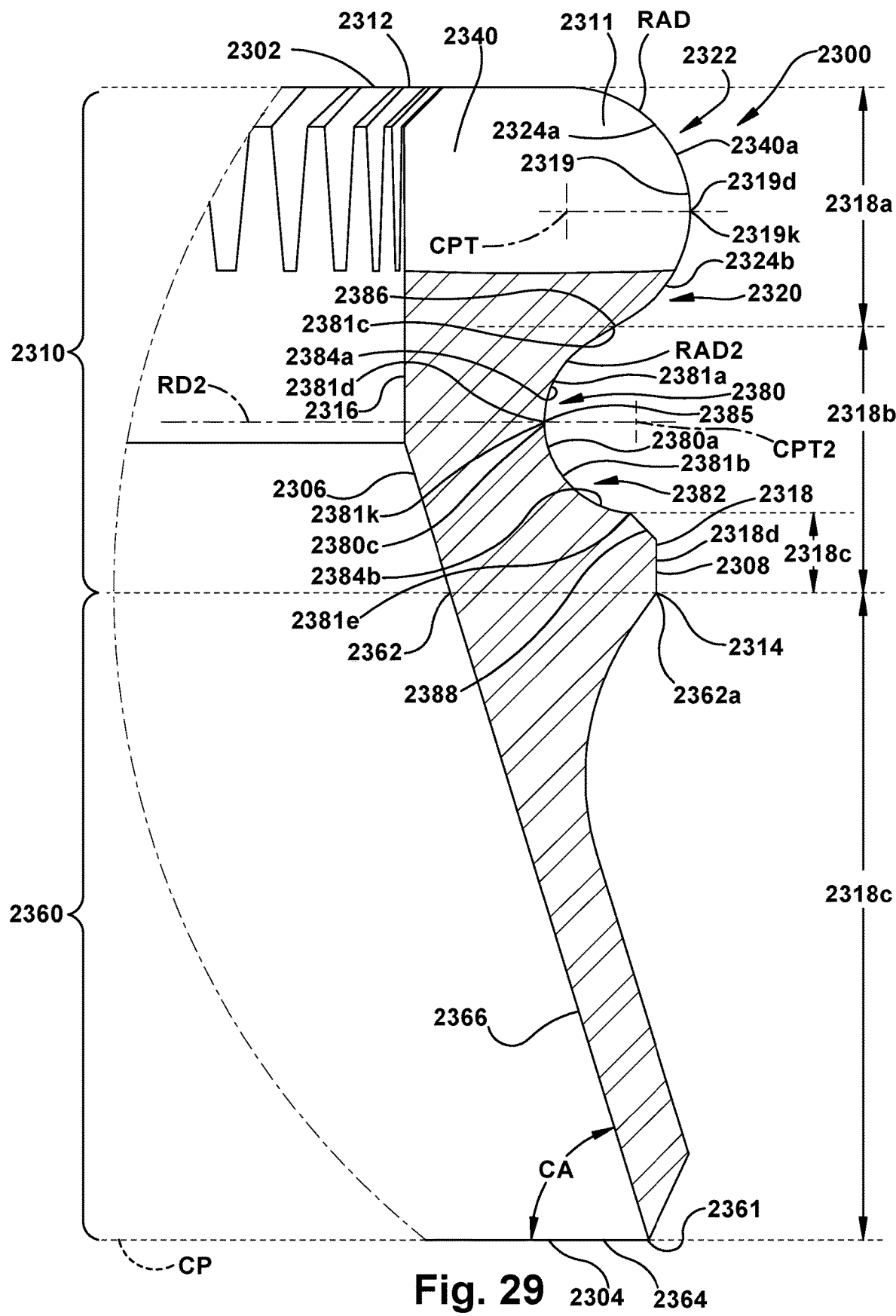
FIG. 29 is a schematic enlarged section view of the rotary knife blade of the head assembly of the power operated rotary knife of FIG. 26.

As can best be seen in FIG. 29, a horizontal radius or straight line RD2 extending orthogonally from the blade central axis of rotation R passing through the midpoint location 2380c of the arcuate surface 2380a and the midpoint location 2381k of the intermediate portion 2381d of the bearing race 2380 would also pass through the center point CPT2 of the arcuate surface 2380a. The radius line RD2 is parallel to the rotational plane RP of the blade 2300. Extending between the central portion 2385 of the bearing race 2380 and the lower end 2319e of the arcuate surface 2319 is an upper transition portion 2386. Extending between the central portion 2385 of the bearing race and an upper end of the lower portion 2318c is a lower transition portion 2388. The second bearing surface 2382 is part of the rotary knife blade bearing region 2320 and the second blade-blade housing bearing structure 2570. The lower portion 2318e of the outer wall 2318 includes the vertical section 2318d that terminates at the lower end 2314 of the body 2310 and defines the discontinuity or knee 2362a that defines the upper end 2362 of the blade section 2360.

Blade Housing 2400

The blade housing 2400 (FIGS. 30 and 30A) includes a mounting section 2402 substantially similar in function and structure to the mounting section 402 of the blade housing 402 of the first exemplary embodiment. The blade housing 2400 also includes the blade support section 2450 that supports the rotary knife blade 2300 for rotation about its central axis of rotation R and includes the inner wall 2452 and a radially spaced apart outer wall 2454 and an upper end 2456 and an axially spaced apart lower end 2458. Turning to the inner wall 2452 of the blade support section 2450, the inner wall 2452 includes a generally vertical upper portion 2352a, adjacent the upper end 2456 of the blade housing blade support section 2450, the middle portion 2452b, and a lower portion 2452c, adjacent the lower end 2458 of the blade housing blade support section 2450. The middle portion 2452b of the inner wall 2452 includes a bearing race 2466, substantially similar to the bearing race 466 of the blade support section 450 of the blade housing 400 of the first exemplary embodiment. The bearing race 2466 includes an arcuate surface 2466a formed on a back wall 2469 of the bearing race 2466. The arcuate surface 2466a of the bearing race 2466, when viewed in two dimensions, is characterized by a constant radius of curvature BRRAD and a center point BRCPT. The arcuate surface 2466a comprises the first concave arcuate bearing surface 2462 which includes an upper arcuate bearing face 2464a disposed above an intermediate portion 2466a of the arcuate surface 2466a of the bearing race 2466 and a lower arcuate bearing face 2464b disposed below the intermediate portion 2466c, substantially similar to the concave first bearing surface 1462 and the upper and lower bearing faces 1464a, 1464b of the arcuate surface 1466a of the back wall 1469 of the bearing race 1466 of the blade housing blade support section 1450 of the second exemplary embodiment. The intermediate portion 2466c includes a vertex location or midpoint location 2466k of the bearing race 2466. The midpoint location 2466k, as can best be seen in FIG. 25, represents a location of the bearing race 2466 which is radially furthest from the center line CBH of the blade housing 2400. The first bearing surface 2462 is part of the blade housing bearing region 2460 and the first blade-blade housing bearing structure 2560. The bearing race 2466 includes an upper generally horizontal upper surface 2467 that transitions to the vertical upper portion 2452a of the inner wall 2452 and a lower curved surface 2468 that transitions to the bearing bead 2480.

With regard to the lower portion 2452c of the inner wall 2452 of the blade support section 2450 of the blade housing 2400, the wall 2452 includes the radially protruding bearing bead 2480 which extends radially in a direction toward the blade housing center line CBH. The bearing bead 2480 includes, in the central portion 2485, the convex arcuate surface 2480a. Viewed radially with respect to the blade housing center line CBH, the convex arcuate surface 2480a is positioned radially intermediate a vertical extent 2452d of the upper portion 2452a of the inner wall 2452 (radially closest to the center line CBH) and the concave arcuate surface 2466a of the bearing race 2466 (radially more distant from the center line CBH) of the blade housing blade support section 2450. The convex arcuate surface 2480a is characterized by a constant radius of curvature BBRAD and center point BBCPT and defines the convex second bearing surface 2482 of the blade housing bearing region 2460. The second bearing surface 2482 includes an upper bearing face 2484a disposed above an intermediate portion 2480c of the convex arcuate surface 2480a and a lower bearing face 2484b disposed below the intermediate portion 2480c. The intermediate portion 2480c includes a vertex location or midpoint location 2480k representing the radially innermost location (closest to the blade housing center line CBH) of the bearing bead 2480. The center point BBCPT of the radius of curvature BBRAD of the arcuate surface 2480a is radially aligned along a horizontally extending straight or radius line RL2 (FIG. 30A) extending orthogonally from the blade housing central line CBH to the midpoint location 2480k of the intermediate portion 2480c. The upper bearing face 2384a of the second bearing surface 2382 of the bearing race 2380 of the rotary knife blade body 2310 bears against the upper bearing face 2484a of the second bearing surface 2482 of the bearing bead 2480 of the blade housing blade support section 2450, while the lower bearing face 2384b of the second bearing surface 2382 of the bearing race 2380 of the rotary knife blade body 2310 bears against the lower bearing face 2484b of the second bearing surface 2482 of the bearing bead 2480 of the blade housing blade support section 2450. The second bearing surface 2482 of the bearing bead 2480 is part of the blade housing bearing region 2460 and is part of the second blade-blade housing bearing structure 2570.

In one exemplary embodiment, the radius of curvature BBRAD of the convex arcuate surface 2480a is approximately 0.030 in. Advantageously, to avoid binding between the blade bearing region 2320 and the blade housing bearing region 2460, the radius of curvature BBRAD of the convex second bearing surface 2482 of the arcuate convex surface 2480a of the bearing bead 2480 of the blade housing 2400 is slightly smaller in magnitude than the mating radius of curvature RAD2 of the concave arcuate surface 2380a of the rotary knife blade bearing race 2380 (in one exemplary embodiment of the assembled combination 2500, the respective values are 0.030 in. v. 0.035 in.). Similarly, to avoid binding the radius of curvature RAD of the convex first bearing surface 2322 of the arcuate convex surface 2319 of the rotary knife blade 2300 is slightly smaller in magnitude than the radius of curvature BRRAD of the concave first bearing surface 2462 of the concave arcuate surface 2466*a* of the bearing race 2466 of the blade housing 2400 (in one exemplary embodiment of the assembled combination 2500, the respective values are 0.047 in. v. 0.052 in., as discussed with respect to the second exemplary embodiment of the power operated rotary knife 1000). Disposed above the central portion 2484 of the bearing bead 2480 is a transition portion 2486 of the bead 2480 that transitions between the central portion 2484 and the lower surface 2468 of the bearing race 2466. The second bearing surface 2482 is part of the blade housing bearing region 2460 and the first blade-blade housing bearing structure 2560.

Figure 30:
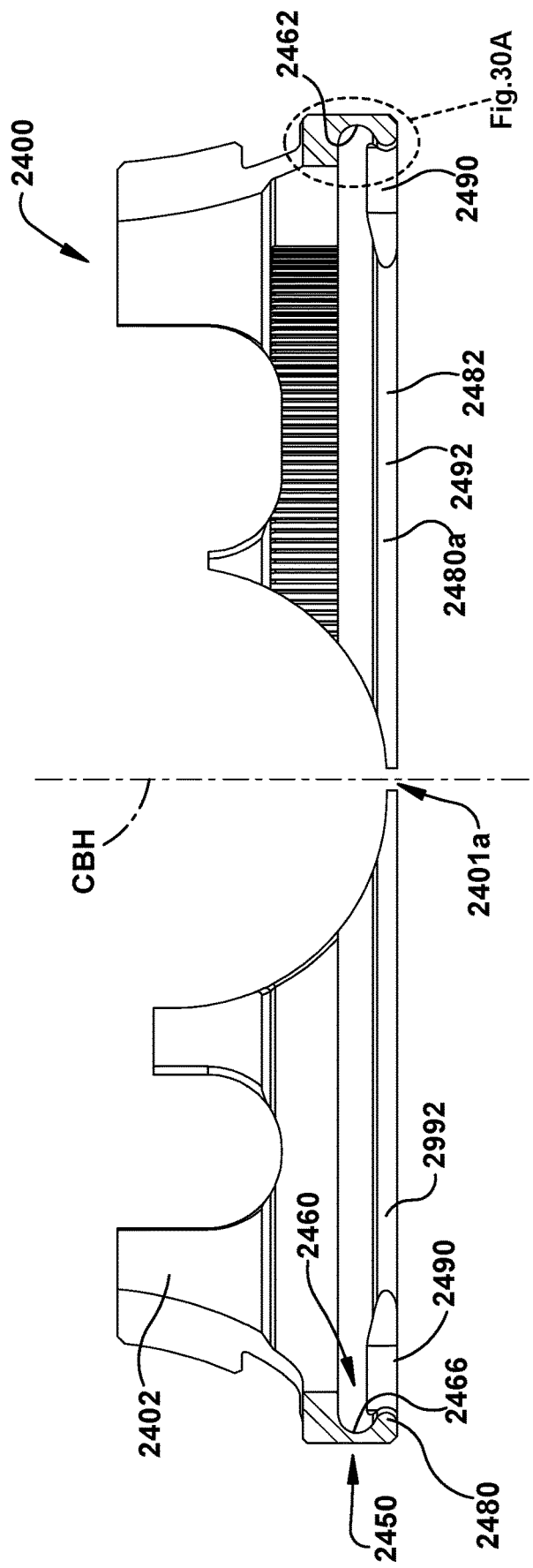
FIG. 30 is a schematic section view of the annular split ring blade housing of the head assembly of FIG. 26.
Figure 30A:
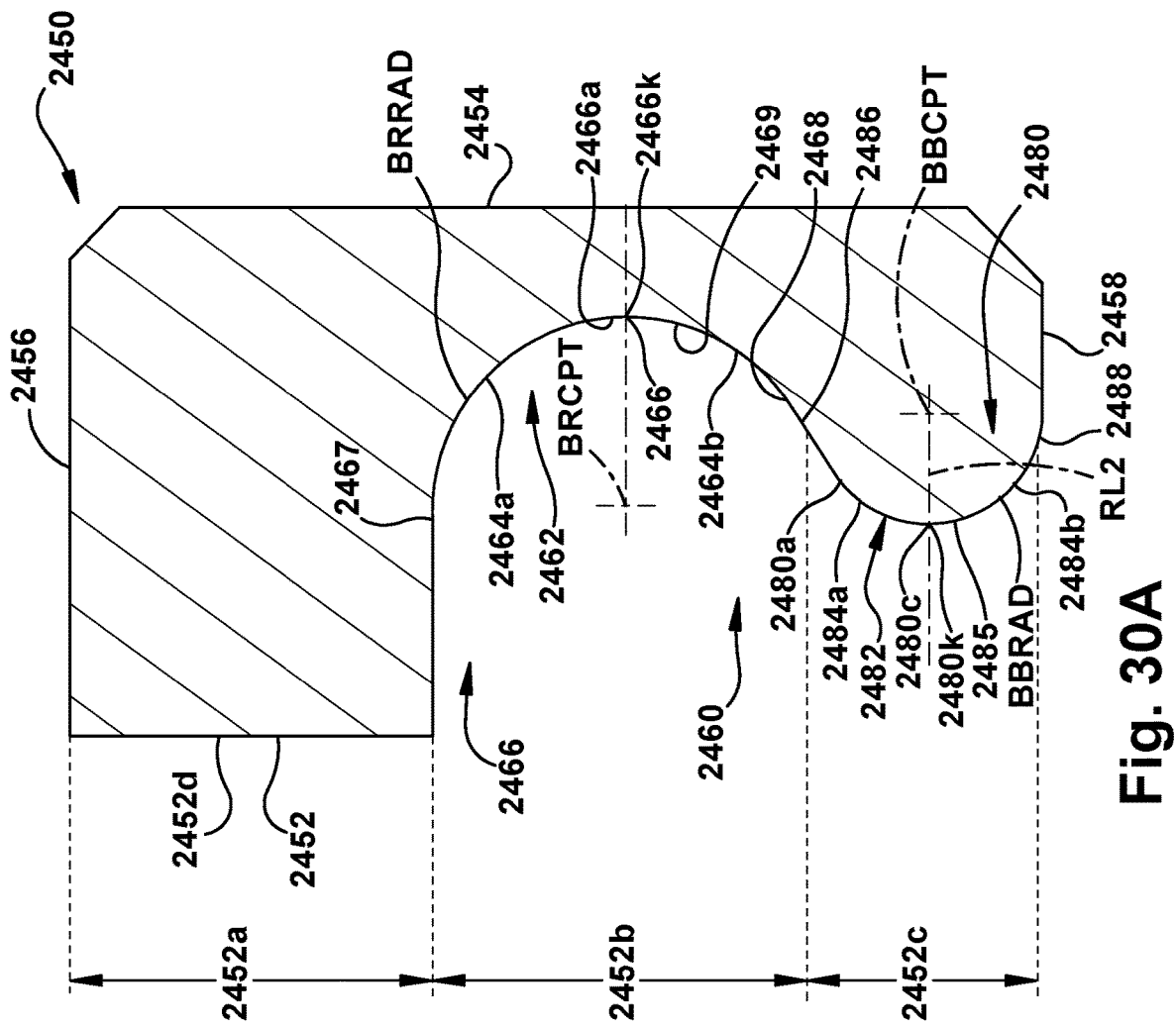
FIG. 30A is a schematic enlarged section view of a portion of the annular split ring blade housing of FIG. 30 within a dashed region labeled FIG. 30A in FIG. 30.
Figure 31:
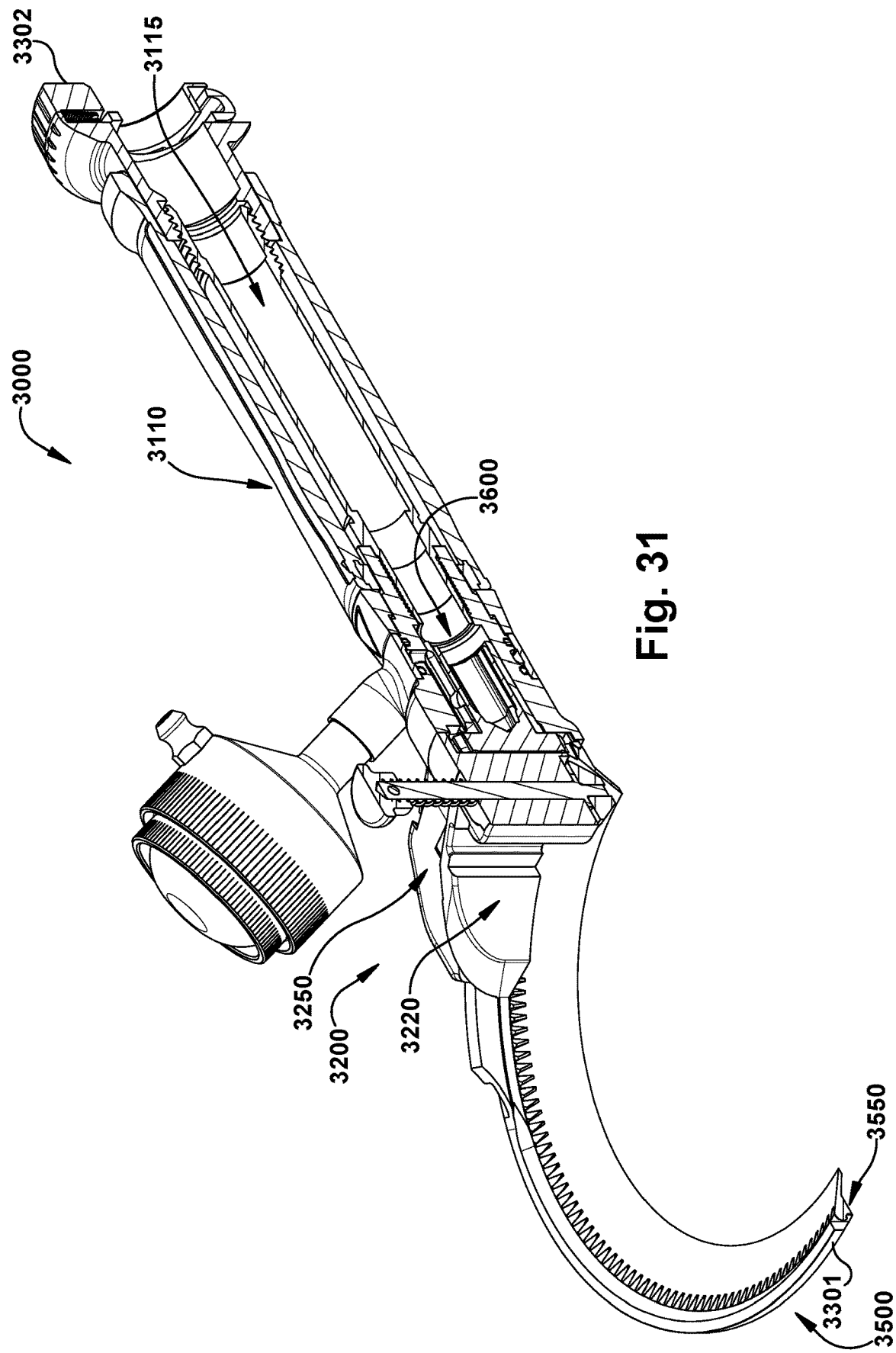
FIG. 31 is a schematic front perspective section view of a fourth exemplary embodiment of a power operated rotary knife of the present disclosure, including a head assembly, a handle assembly and a drive mechanism, the head assembly including a frame body and an assembled combination of an annular rotary knife blade and an annular split ring blade housing, the section view taken along a longitudinal axis of the handle assembly.

In one exemplary embodiment of the blade housing 2400, the bearing bead 2380 is discontinuous or interrupted circumferentially, that is, the bead 2480 is interrupted about its circumference by circumferential interrupted regions or sections 2490 where the bead does not protrude radially inwardly toward the blade housing central axis CBH. In those interrupted regions 2490 of the bead 2480, the bearing bead does not present a bearing surface 2482 to bear against the mating bearing surface 2382 of the rotary knife blade 2300. Portions of two such interrupted regions or sections 2490 of the bearing bead 2480 can be seen in the section view of the blade housing 2400 schematically depicted in FIG. 30. As can be seen in FIG. 30, raised or protruding regions or sections 2492 of the bead 2480, which include the bearing surface 2482 extend circumferentially from the region of the blade housing split 2401*a*. In one exemplary embodiment, there are a total of five interrupted regions 2490 of the bearing bead 2380 spaced circumferentially about the bearing bead 2480. Extending between each pair of the five interrupted regions 2490 are six protruding regions 2492. In one exemplary embodiment of the blade housing 2400, four of the interrupted regions 2490 subtend or have an arcuate extent with respect to the blade housing center line CBH in a range of 1.3-18° and one interrupted region, positioned diametrically opposite from the blade housing split 2401 subtends or has an arcuate extent in a range of 29-34°.

The blade-blade housing structure 2500 of the present disclosure and the other features, characteristics and attributes, as described above, of the power operated rotary knife 100 may be used with a variety of rotary knife blades styles, configurations, and sizes and corresponding blade housings. The exemplary rotary knife blade 2300 is a straight blade style rotary knife blade. Numerous other blade styles, including, but not limited to, flat and hook style blades and combinations of blade styles may be utilized, with an appropriate blade housing, in the power operated rotary knife 2000 of the present disclosure, as would be understood by one of skill in the art. It is the intent of the present disclosure to cover all such rotary knife blade styles and sizes, together with the corresponding blade housings, that may be used in the power operated rotary knife 200.

Fourth Embodiment—Power Operated Rotary Knife 3000

A fourth exemplary embodiment of a power operated rotary knife of the present disclosure is shown generally at 3000 in FIGS. 31-35. The power operated rotary knife 3000 includes an elongated handle assembly 3110, a head assembly 3200, which is releasably secured to a front or distal end of the handle assembly 3110, and a drive mechanism 3600, including a gear train 1604. The power operated rotary knife 3000 extends between a distal or forward end 3001 and a proximal or rearward end 3002 of the knife 3000. The head assembly 3200 includes a frame body 3250 and clamping assembly 3220 which secures an assembled blade-blade housing combination 3500 to the frame body 3250. The assembled blade-blade housing combination 3500 includes an annular rotary knife blade 3300 and an annular blade housing 3400 supporting the rotary knife blade 3300 for rotation about the knife blade's central axis of rotation R.

The handle assembly 3110 is substantially similar to the handle assembly 110 of the power operated rotary knife 100 of the first exemplary embodiment. The handle assembly 3110 extends along a longitudinal axis LA and includes a handle assembly throughbore 3115. The longitudinal axis LA of the handle assembly 3110 extends through a center of the elongated throughbore 3115 and is orthogonal to and intersects the rotary knife blade central axis of rotation R. The drive mechanism 3600 and gear train 3604 are substantially similar to the drive mechanism 600 and gear train 604 of the power operated rotary knife 100 of the first exemplary embodiment. The frame body 3250 and the damping assembly 3220 of the head assembly 3200 are substantially similar to the frame body 250 and the clamping assembly 220 of the head assembly 200 of the power operated rotary knife 100 of the first exemplary embodiment. The assembled blade-blade housing combination 3500 the power operated rotary knife 3000 includes the annular blade housing 3400. The annular blade housing 3400 of the fourth exemplary embodiment is substantially similar to the annular blade housing 2400 of the power operated rotary knife 2000 of the third exemplary embodiment.

Various components and assemblies of the power operated rotary knife 3000 are substantially similar in structure and/or function to corresponding components and assemblies of the power operated rotary knife 100 and/or the power operated rotary knife 1000 and/or the power operated rotary knife 2000, as previously described. In the interest of brevity, components and assemblies of the power operated rotary knife 3000 that are similar to the corresponding components and assemblies of the power operated rotary knife 100 of the first exemplary embodiment and/or the power operated rotary knife 1000 of the second exemplary embodiment and/or the power operated rotary knife 2000 of the third exemplary embodiment in structure and/or function will not be fully described herein. Instead, reference is made to the description of such components and assemblies set forth above in connection with the power operated rotary knife 100 and/or the power operated rotary knife 1000 and/or the power operated rotary knife 200, as set forth above. Materials/fabrication of components and assemblies of the power operated rotary knife 3000 are similar to materials/fabrication of corresponding components and assemblies of the power operated rotary knife 100, as described above. Such descriptions of components and assemblies of the power operated rotary knife 100 of the first exemplary embodiment and/or the components and assemblies of the power operated rotary knife 1000 of the second exemplary embodiment and/or the components and assemblies of the power operated rotary knife 2000 of the third exemplary embodiment are hereby incorporated by reference in the following description of the power operated rotary knife 3000 of the fourth exemplary embodiment. Identification of axes, lines, planes and directions for the power operated rotary knife 3000, as set forth herein, will be the same as used for the description of the power operated rotary knife 100 of the first exemplary embodiment and/or the power operated rotary knife 1000 of the second exemplary embodiment and/or the power operated rotary knife 2000 of the third exemplary embodiment.

Like the rotary knife blade 2300 and the annular blade housing 2400 of the assembled combination 2500 of the power operated rotary knife 2000 of the third exemplary embodiment, the assembled combination 3500 of the rotary knife blade 3300 and the annular blade housing 3400 comprises a blade-blade housing bearing structure 3550 that includes a first blade-blade housing bearing structure 3560 and a second blade-blade housing bearing structure 3570. In the power operated rotary knife 2000 of the third exemplary embodiment, the first blade-blade housing bearing structure 2560 included the first arcuate bearing surface 2322 of the bearing region 2320 of the rotary knife blade 2300 engaging and bearing against the first arcuate bearing surface 2462 of the bearing region 2460 of the blade support section 2450 of the annular blade housing 2400. The first blade-blade housing bearing structure 3560 of the power operated rotary knife 3000 has substantially the same structure, namely, the first blade-blade housing bearing structure 3560 includes a first arcuate bearing surface 3322 of a bearing region 3320 of the rotary knife blade 3300 which engages and bears against a first arcuate bearing surface 3462 of a blade support section 3450 of the annular blade housing 3400. As discussed below, with respect to the bearing region 3360 of the rotary knife blade 3300, the second blade-blade housing bearing structure 3570 is modified with respect to the second blade-blade housing bearing structure 2570 of the power operated rotary knife 2000 of the third exemplary embodiment, Rotary Knife Blade 3300

Figure 34:
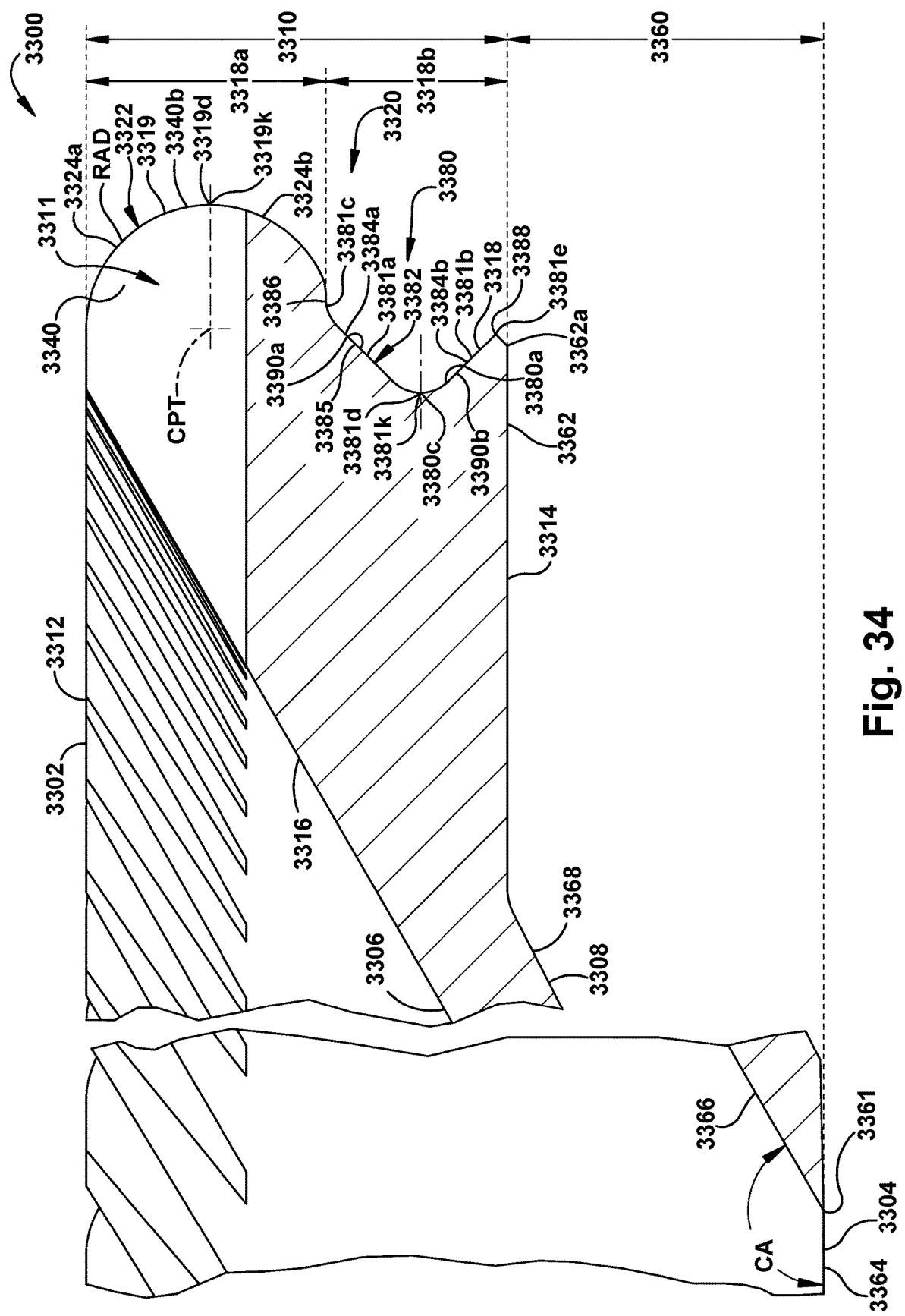
FIG. 34 is a schematic enlarged section view of a portion of the rotary knife blade of the head assembly of the power operated rotary knife of FIG. 31.

As can best be seen in FIGS. 33 and 34, the rotary knife blade 3300 includes an annular body 3310 and a blade section 3360 extending from the body 3310. The blade 3300 includes an upper end or first end 3302 and an axially spaced apart lower end or second end 3304, defining a cutting edge 3361 of the blade 3300, and an inner wall 3306 and a radially spaced apart outer wall 3308. In one exemplary embodiment, the rotary knife blade 3300 is a flat blade style rotary knife blade. The term "flat" refers to the profile of the blade section 3360 and, in particular, to a cutting angle CA (FIG. 33) of the blade section 3360 with respect to a cutting plane CP that is congruent with the cutting edge 3361 of the blade 3300. The angle CA of the blade section 3360 with respect to the cutting plane CP is relatively large. As can be seen in FIG. 33, the cutting angle CA, that is, the angle between the blade section 3360 and the cutting plane CP, as measured with respect to the blade section inner wall 3366 is an obtuse angle, greater than 90°. This large, obtuse cutting angle CA is referred to as a "shallow" blade cutting profile. The inner wall 3366 is generally smooth, frustoconical shape. As a product is being trimmed or cut by the flat blade 3300, the cut material layer moves easily along the inner wall 3366 the flat blade 3300. The flat blade 3300 is particularly useful for trimming thicker layers of material from a product, e.g., trimming a thicker layer of fat or meat tissue from a piece of meat, as the power operated rotary knife 3000 is moved over the product in a sweeping motion. This is true because even thicker layers of cut or trimmed material will flow with minimal drag or friction over the inner wall 3366 of the flat blade 3300.

The blade section 3360 of the rotary knife blade 3300 includes an upper end 3362, defined by a discontinuity or knee 3362*a* in an outer wall 3368 of the blade section 3360, and a lower end 3364, which is coincident with the blade cutting edge 3361, the cutting plane CP and the lower end 3304 of the rotary knife blade 3300. The blade section 3360 also includes the inner wall 3366 and the radially spaced apart outer wall 3368.

Turning to the annular body 3310 of the rotary knife blade 3300, the body 3310 is generally similar to the annular body 2310 of the annular rotary knife blade 2300 of the third exemplary embodiment, with the except for the configuration of a second bearing surface 3382 of a bearing region 3320 of the rotary knife blade 3300. Specifically, in the annular body 2310 of the annular rotary knife blade 2300 of the third exemplary embodiment, the second bearing surface 2382 was arcuate, being defined by a portion of the concave arcuate surface 2380*a* of the central portion 2385 of the bearing race 2380 which was part of the outer wall 2318 of the body 2310. By contrast, as can best be seen in FIG. 34, an outer wall 3318 of the annular body 3310 of the annular rotary knife blade 3300 includes a concave generally v-shaped bearing race 3380.

The bearing race 3380 of the outer wall 3318 of the blade body 3310 defines the second arcuate bearing surface 3382 of the bearing region 3320 of the rotary knife blade 3300. The second bearing surface 3382 is concave with respect to the outer wall 3318 of the body 3310 of the rotary knife blade 3300 and extends in a direction toward the blade central axis of rotation R. The concave bearing race 3380 of the blade body 3310 extends along the outer wall 3318 of the body 3310 and extends in a radial direction toward the blade central axis of rotation R in a generally v-shaped horizontal orientation, that is, the bearing race 3380 may be viewed as a v-shaped opening in the outer wall 3318 of the body, wherein the "v" is tipped to a horizontal orientation with a vertex of the "v" closest to the blade central axis of rotation R. Reference to the bearing race 3380 as being "v-shaped" shall be understood to mean that the opening in the outer wall 3318 defining the bearing race 3380 is understood to be with the "v" opening in the horizontal orientation, as best seen in FIG. 34. The concave bearing race 3380 extends from an upper end portion 3381*c*, through an intermediate portion 3381*d* and terminates at a lower end portion 3381*e* of the bearing race 3380. The intermediate portion 3381*d* of the bearing race 3380 defines a radially innermost midpoint location or intermediate location 3381*k* of the bearing race 3380 and, in one exemplary embodiment, defines a radially innermost location of the outer wall 3318 of the body 3310. The bearing race 3380 includes an upper region 3381*a* extending between the upper end portion 3381*c* and the intermediate portion 3381*d* and a lower region 3381*b* extending between the intermediate portion 3381*d* and the lower end portion 3381*e*. The second bearing surface 3382 is generally v-shaped (and horizontally oriented) and includes a linear, angled or frustoconical upper bearing face 3384*a* in the upper region 3381*a* of the bearing race 3380 disposed above the midpoint location 3381*k* and further includes a linear, angled or frustoconical lower bearing face 3384*b* in the arcuate lower region 3381*b* of the bearing race 3380. The frustoconical upper bearing face 3384*a* converges in a direction proceeding toward the lower end 3314 of the blade body 3314 or the lower end 3304 of the rotary knife blade 3300, that is, in the downward direction DW, while the frustoconical lower bearing surface 3384*b* converges in a direction proceeding toward the upper end 3312 of the blade body 3310 or the upper end 3302 of the rotary knife blade 3300, that is, in the upward direction UP. Viewed in two dimensions the frustoconical upper bearing surface 3384*a* can be viewed as a pair of an angled lines at opposite radial sides of the rotary knife blade 3300 in the upper region 3381*a* of the bearing race 3380, the pair of angled lines of the upper bearing surface 3384*a* converging in a direction proceeding in the downward direction DW, while the frustoconical lower bearing surface 3384*b* can be viewed as a pair of an angled lines at opposite radial sides of the rotary knife blade 3300 in the lower region 3381*b* of the bearing race 3380, the pair of angled lines of the lower bearing surface 3384*b* converging in a direction proceeding in the upward direction UP.

The frustoconical second bearing surface 3382 of the bearing race 3380 is defined by a concave v-shaped arcuate surface 2380*a* of the bearing race 3380 which is part of a concave central portion 3385 of the bearing race 3380. The bearing race 3380 extends from an upper end portion 3381*c* though an intermediate portion 3381*d* and terminates at a lower end portion 3381*e*. The bearing race 3380 includes a central portion 3385 which includes a generally concave v-shaped surface 3380*a*. The concave v-shaped surface 3380*a* defines the v-shaped second bearing surface 3382, as opposed to the arcuate second bearing surface 2382 of the third exemplary embodiment. The second bearing surface 3382 includes the angled or frustoconical upper bearing surface or face 3384*a* disposed above a midpoint or radially innermost location 3380*c* of the concave v-shaped surface 3380*a* and the angled or frustoconical lower bearing surface or face 3384*b* disposed below the midpoint 3380*c* of the v-shaped surface 3380*a*, as opposed to the arcuate upper bearing face 2384*a* and arcuate lower bearing face 2384*b* of the second bearing surface 2382 of the third exemplary embodiment. The midpoint 3380*c* of the v-shaped surface 3380*a* corresponds to and is coincident with the radially innermost midpoint location 3381*k* of the bearing race 3380. Viewed in three dimensions, the angled or frustoconical upper bearing face 3384*a* of the second bearing surface 3382 defines a frustoconical surface 3390*a* which may be viewed as a frustum of a right angled cone which converges a direction proceeding toward the lower end 3304 of the blade 3300, that is, in the downward direction DW, while the angled or frustoconical lower bearing face 3384*b* of the second bearing surface 3382 defines a right angled cone frustoconical surface 3390*b* converging in a direction proceeding toward the upper end 3302 of the blade 3000, that is, in the upward direction UP.

The body 3310 of the rotary knife blade 3300 includes a driven gear 3340, substantially similar to the driven gear 340 of the blade body 300 of the first exemplary embodiment and the outer wall 3318 of the blade body 3310 includes an arcuate surface 3319, substantially similar to the arcuate surface 319 of the blade body 300 of the first exemplary embodiment. The arcuate surface 3319 includes both an outer surface 3340*b* of the driven gear 3340 and the first bearing surface 3322, substantially similar to the outer surface 340*b* of the driven gear 340 and the bearing surface 322 of the blade body 310 of the first exemplary embodiment. The arcuate surface 3319, when viewed in three dimensions, may be viewed as an annular protruding bearing bead 3311, forming a radially protruding portion of the outer wall 3318 of the blade body 3310 and defining the first bearing surface 3322.

The bearing region 3320 of the blade body 3310 includes both the first bearing surface 3322, defined by the convex arcuate surface 3319 of the bearing bead 3311, and the second bearing surface 3382, defined by the concave v-shaped surface 3380*a* of the bearing race 3380. The v-shaped surface 3380*a* is part of the central portion 3385 of the bearing race 3380. The first bearing surface 3322 is part of the rotary knife blade bearing region 3320 and is part of the first blade-blade housing bearing structure 3560, while the second bearing surface 3382 is part of the rotary knife blade bearing region 3320 and is part of the second blade-blade housing bearing structure 3570 of the combined blade-blade housing bearing structure 3550.

An upper portion 3318*a* of the outer wall 3318 of the rotary knife blade body 3310 includes the convex arcuate surface 3319, substantially similar to the arcuate surface 319 of the outer wall 318 of the rotary knife body 310 of the first exemplary embodiment, which comprises both the outer surface 3340*b* of the driven gear 3340 and the bearing surface 3322. The arcuate surface 3319 is characterized as being a constant radius of curvature RAD and a center point CPT. The bearing surface 3322 includes an upper bearing face 3324*a* disposed above the midpoint location or radial outermost location 3319*k* of the second intermediate portion 3319*d* of the arcuate surface 3319 and a lower bearing face 3324*b* disposed below the midpoint location or radial outermost location 3319*k* of the second intermediate portion 3319*d* of the arcuate surface 3319.

A lower portion 3318*b* of the outer wall 3318 of the rotary blade body 3310 includes the radially inwardly extending or concave bearing race 3380. The bearing race 3380 includes the central or middle portion 3385 that defines the concave v-shaped surface 3380*a*. The concave v-shaped surface 3380*a* defines the second bearing surface 3382. The second bearing surface 3382 includes the upper bearing face 3384*a* disposed above a midpoint or radially innermost location 3380*c* of the arcuate surface 3380*a* and the lower bearing face 3384*b* disposed below the midpoint 3380*c*. Extending between the central portion 3385 of the bearing race 3380 and the lower end 3319*e* of the arcuate surface 3319 is an upper transition portion 3386. Extending between the central portion 3385 of the bearing race and the upper end 3362 of the blade section 3360 is a lower transition portion 3388. The second bearing surface 3382 is part of the rotary knife blade bearing region 3320 and the second blade-blade housing bearing structure 3570.

Blade Housing 3400

Figure 35:
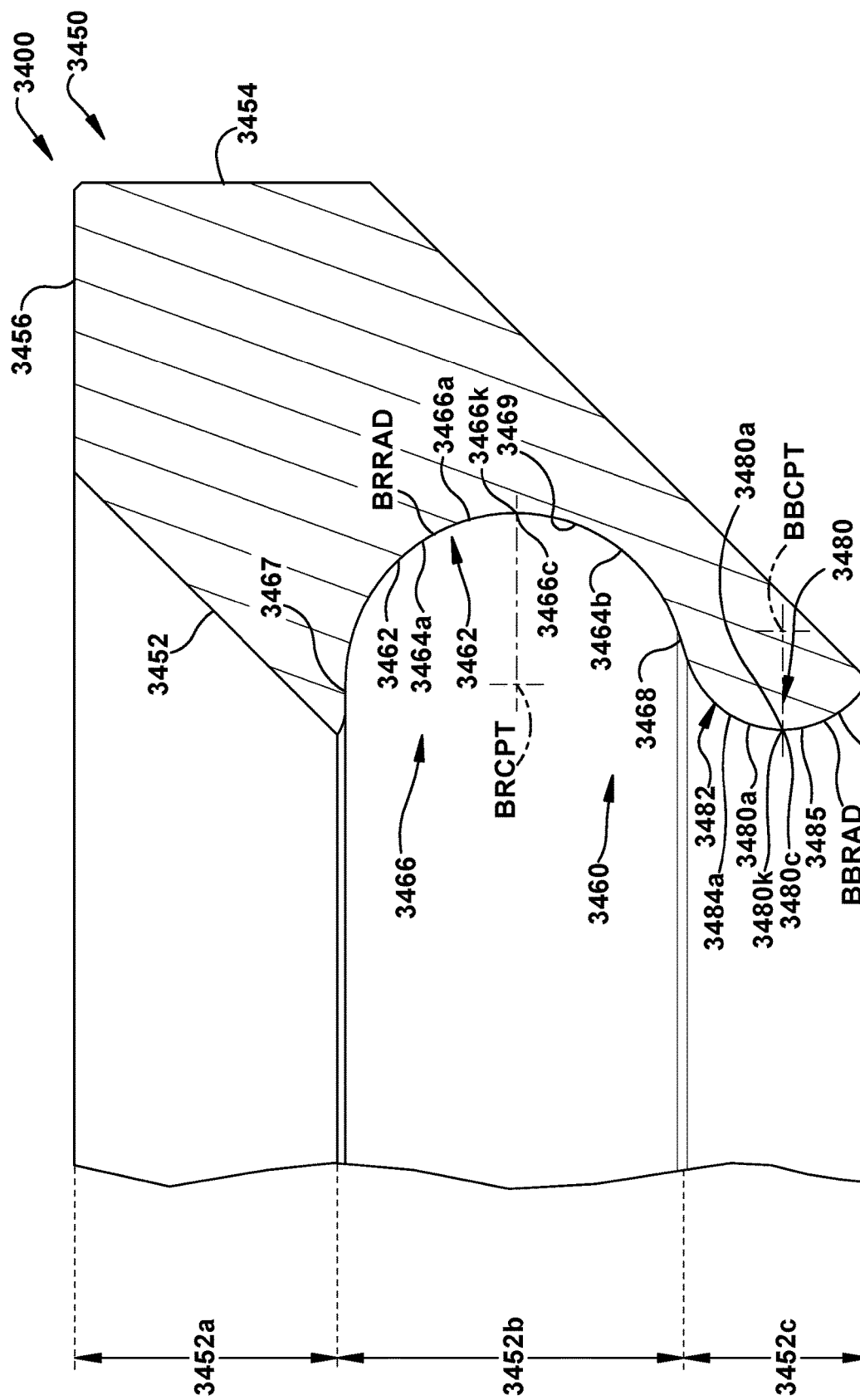
FIG. 35 is a schematic enlarged section view of a portion of the annular split ring blade housing of the head assembly of the power operated rotary knife of FIG. 31.

The blade housing 3400 (FIG. 35) includes a mounting section 3402 substantially similar in function and structure to the mounting section 402 of the blade housing 402 of the first exemplary embodiment. As can best be seen in FIG. 35, the blade housing 3400 also includes the blade support section 3450 that supports the rotary knife blade 3300 for rotation about its central axis of rotation R and includes the inner wall 3452 and a radially spaced apart outer wall 3454 and an upper end 3456 and an axially spaced apart lower end 3458. Turning to the inner wall 3452 of the blade support section 3450, the inner wall 3452 includes a generally vertical upper portion 3452*a*, adjacent the upper end 3456 of the blade housing blade support section 3450, a middle portion 3452*b*, and a lower portion 3452*c*, adjacent the lower end 3458 of the blade housing blade support section 3450. The middle portion 3452*b* of the inner wall 3452 includes a bearing race 3466, substantially similar to the bearing race 466 of the blade support section 450 of the blade housing 400 of the first exemplary embodiment. The bearing race 3466 includes an arcuate surface 3466*a* formed on a back wall 3469 of the bearing race 3466. The arcuate surface 3466*a* of the bearing race 3466, when viewed in two dimensions, is characterized by a constant radius of curvature BRRAD and a center point BRCPT. The arcuate surface 3466*a* comprises the first concave arcuate bearing surface 3462 which includes an upper arcuate bearing face 3464*a* disposed above an intermediate portion 3466*c* of the arcuate surface 3466*a* of the bearing race 3466 and a lower arcuate bearing face 3464*b* disposed below the intermediate portion 3466*c*, substantially similar to the concave first bearing surface 1462 and the upper and lower bearing faces 1464*a*, 1464*b* of the arcuate surface 1466*a* of the back wall 1469 of the bearing race 1466 of the blade housing blade support section 1450 of the second exemplary embodiment. The intermediate portion 3466*c* includes a vertex location or midpoint location 3466*k* of the bearing race 3466. The midpoint location 3466*k*, as can best be seen in FIG. 35, represents a location of the bearing race 3466 which is radially furthest from the center line CBH of the blade housing 3400. The bearing race 3466 includes an upper generally horizontal upper surface 3467 that transitions to an angled upper portion 3452*a* of the inner wall 3452 and a lower curved surface 3468 that transitions to a bearing bead 3480, which is part of the lower portion 3352*c* of the inner wall 3352 of the blade support section 3450. The first bearing surface 3462, including the upper and lower 3464*a*, 3464*b* bearing faces, is part of the blade housing bearing region 3460 and the first blade-blade housing bearing structure 3560.

With regard to the lower portion 3452*c* of the inner wall 3452 of the blade support section 3450 of the blade housing 3400, the inner wall 3452 includes the radially protruding bearing bead 3480 which extends radially in a direction toward the blade housing center line CBH. The bearing bead 3480 includes, in a central portion 3485 of the bead 3480, a convex arcuate surface 3480*a*. Viewed radially with respect to the blade housing center line CBH, the convex arcuate surface 3380*a* is positioned radially closer to the center line CBH than the concave arcuate surface 3466*a* of the bearing race 3466, which is radially more distant from the center line CBH of the blade housing blade support section 3450. The convex arcuate surface 3480*a* is characterized by a constant radius of curvature BBRAD and center point BBCPT and defines the convex second bearing surface 3482 of the blade housing bearing region 3460. The second bearing surface 3482 includes an upper bearing face 3484*a* disposed above an intermediate portion 3480*c* of the arcuate surface 3480*a* and a lower bearing face 3484*b* disposed below the intermediate portion 3480*c*. The intermediate portion 3480*c* includes a vertex location or midpoint location 3480*k* representing the radially innermost location (closest to the blade housing center line CBH) of the bearing bead 3480.

In the assembled blade-blade housing combination 3500, the arcuate upper bearing face 3324*a* of the first bearing surface 3322 of the bearing bead 3311 of the body 3310 of the rotary knife blade 3300 bears against the arcuate upper bearing face 3464*a* of the first bearing surface 3462 of the bearing race 3466 of the blade housing blade support section 3450, while the arcuate lower bearing face 3324*b* of the first bearing surface 3322 of the bearing bead 3311 of the body 3310 of the rotary knife blade 3300 bears against the arcuate lower bearing face 3464*b* of the first bearing surface 3462 of the bearing race 3466 of the blade housing blade support section 3450. The first bearing surface 3322 of the bearing bead 3311 of the rotary knife body 3310 is part of the rotary knife blade bearing region 3320 and is part of the first blade-blade housing bearing structure 3560. The first bearing surface 3462 of the bearing race 3466 of the blade housing blade support section is part of the blade housing bearing region 3460 and is part of the first blade-blade housing bearing structure 3560.

In the assembled blade-blade housing combination 3500, the angled or frustoconical upper bearing face 3384*a* of the second bearing surface 3382 of the bearing race 3380 of the rotary knife blade body 3310 bears against the upper bearing face 3484*a* of the second bearing surface 3482 of the bearing bead 3480 of the blade housing blade support section 3450, while the angled or frustoconical lower bearing face 3384*b* of the second bearing surface 3382 of the bearing race 3380 of the rotary knife blade body 3310 bears against the lower bearing face 3484*b* of the second bearing surface 3482 of the bearing bead 3480 of the blade housing blade support section 3450. The second bearing surface 3382 of the bearing race 3380 of the rotary knife body 3310 is part of the rotary knife blade bearing region 3320 and is part of the second blade-blade housing bearing structure 3570. The second bearing surface 3482 of the bearing bead 3480 of the blade housing support section 3450 is part of the blade housing bearing region 3460 and is part of the second blade-blade housing bearing structure 3570.

The blade-blade housing structure 3500 of the present disclosure and the other features, characteristics and attributes, as described above, of the power operated rotary knife 3000 may be used with a variety of rotary knife blades styles, configurations, and sizes and corresponding blade housings. As mentioned above, the exemplary rotary knife blade 3300 is a flat blade style rotary knife blade. Numerous other blade styles, including, but not limited to, hook and straight style blades and combinations of blade styles may be utilized, with an appropriate blade housing, in the power operated rotary knife 3000 of the present disclosure, as would be understood by one of skill in the art. It is the intent of the present disclosure to cover all such rotary knife blade styles and sizes, together with the corresponding blade housings, that may be used in the power operated rotary knife 3000.

Fifth Embodiment—Blade-Blade Housing Combination 4500

Figure 36:
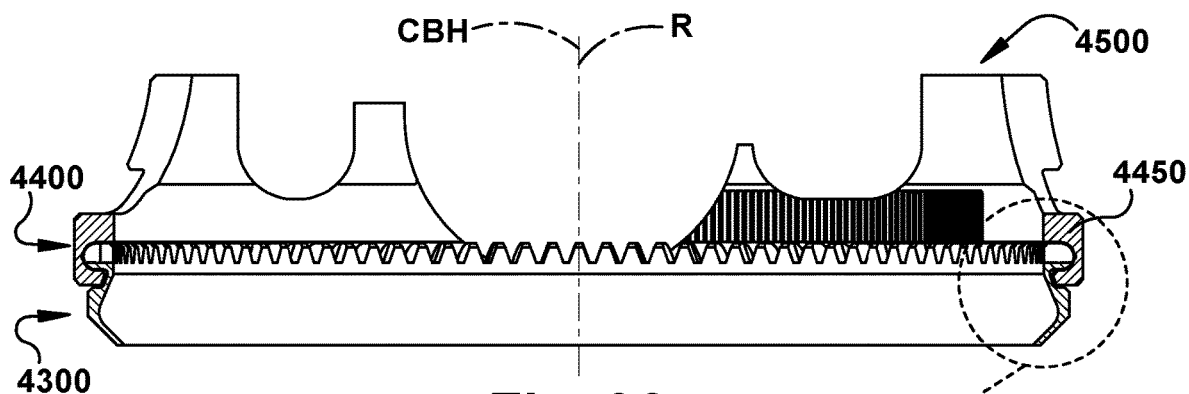
FIG. 36 is a schematic vertical section view of an alternate exemplary embodiment of an assembled combination of a rotary knife blade and an annular blade housing suitable for use in, for example, the power operated rotary knife of FIG. 21.
Figure 36A:
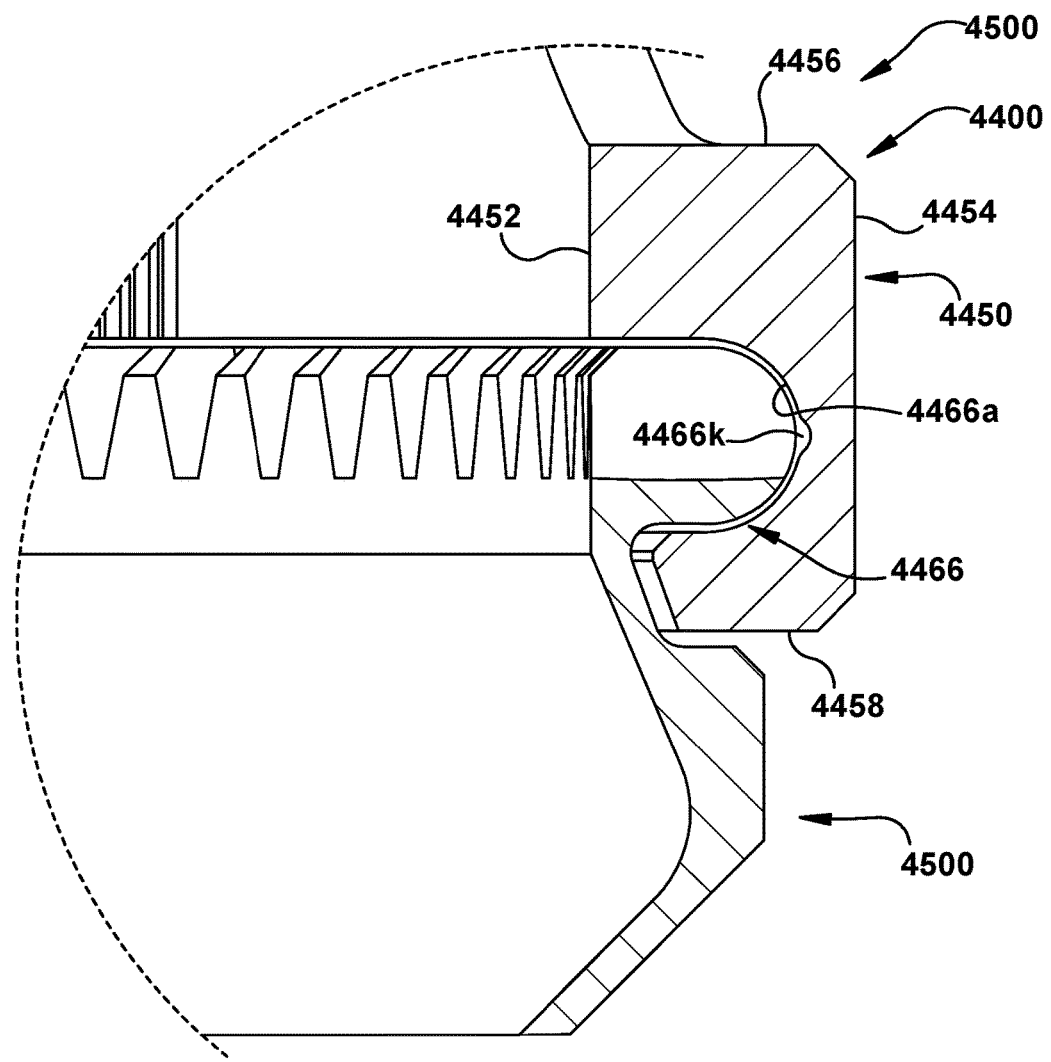
FIG. 36A is a schematic enlarged vertical section view of a portion of the assembled combination of the rotary knife blade and the annular blade housing of FIG. 36 within a dashed region labeled FIG. 36A in FIG. 36.
Figure 37:
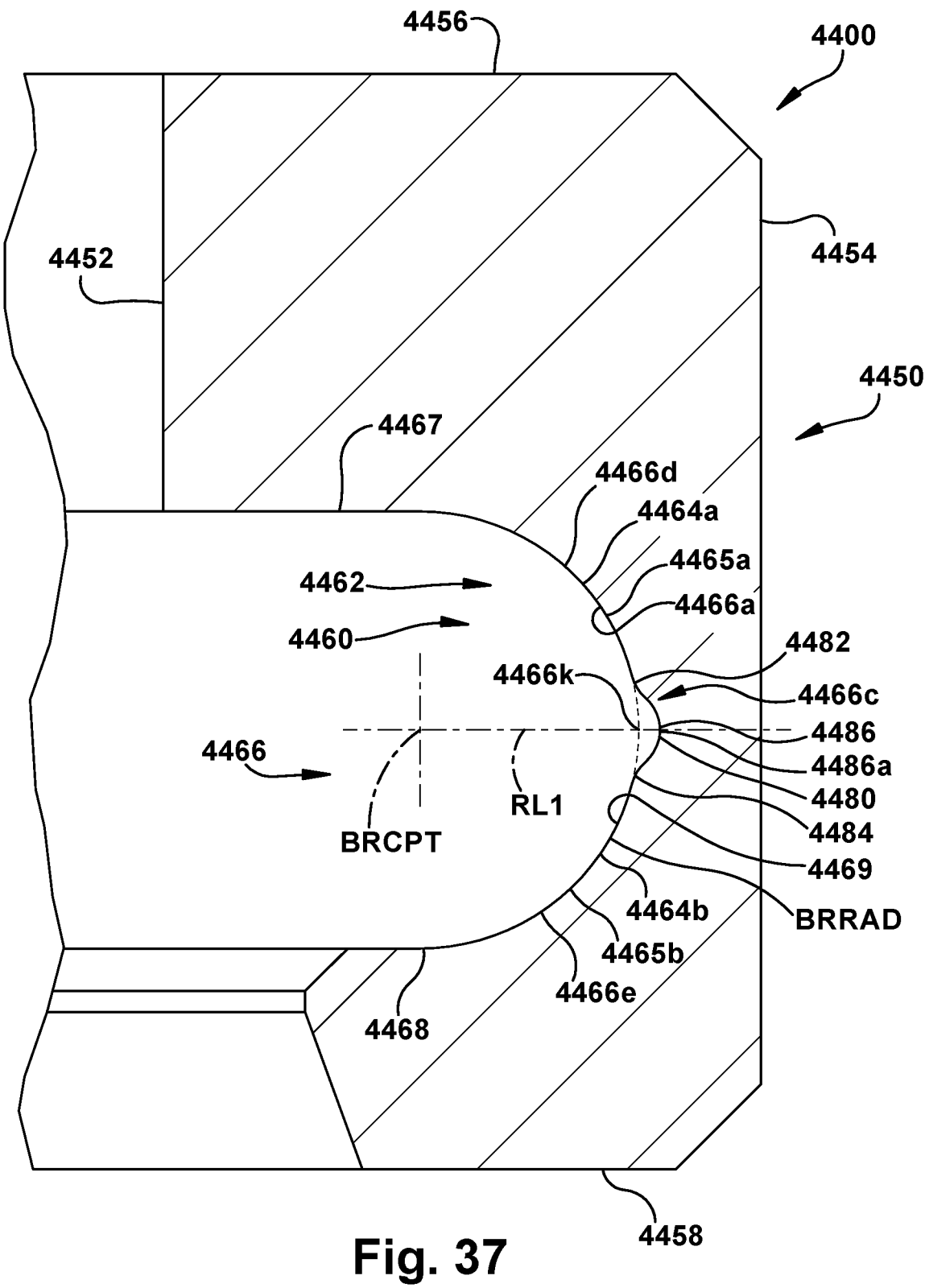
FIG. 37 is a schematic enlarged vertical section view of a portion of a blade housing support section of the annular blade housing of FIG. 36.

An alternate exemplary embodiment of an assembled combination of a rotary knife blade-annular blade housing is schematically depicted generally at 4500 in FIGS. 36, 36A and 37. The assembled combination 4500 includes an annular rotary knife blade 4300 and an annular blade housing 4400. The annular rotary knife blade 4300 (FIGS. 36 and 36A) is substantially similar in structure and function to the annular rotary knife blade 1300 of the power operated rotary knife 1000 of the second exemplary embodiment. In the interests of brevity, reference is made to the prior description of the rotary knife blade 1300 of the second exemplary embodiment and associated drawing Figures, and such description and drawings of the rotary knife blade 1300 of the second exemplary embodiment are hereby incorporated herein by reference.

Blade Housing 4400

The annular blade housing 4400 is generally similar in structure and function to the annular blade housing 1400 of the power operated rotary knife 1000 of the second exemplary embodiment, except for the configuration of a bearing region 4460 of a blade support section 4450 of the annular blade housing 4400. Specifically, a configuration of a bearing race 4466 of the bearing region 4460 of the blade support section 4450 of the blade housing 4400 is different than the configuration of the bearing race 1466 of the bearing region 1460 of the blade support section 1450 of the blade housing 1400 in that the bearing race 4466 includes a radial discontinuity or a concave radial recess 4480 in a back wall 4469 of the bearing race 4466, that is, a radial discontinuity in a concave, arcuate surface 4466*a* formed by the back wall 4469 of the bearing race 4466. The radial recess 4480 is within an intermediate portion 4466*c* of the arcuate surface 4466a of the bearing race 4466. In the interests of brevity, reference is made to the prior description of the annular blade housing 1400 the second exemplary embodiment and associated drawing Figures, and such description and drawings of the blade housing 1400 of the second exemplary embodiment are hereby incorporated herein by reference. Only the differences between the respective bearing regions 4460, 1460 of the blade housing 4400, 1400 will be discussed in detail below.

The generally concave bearing race 4466 includes a generally horizontal surface 4467 and an axially spaced apart generally horizontal surface 4468. Bridging the upper and lower surfaces 4467, 4468 of the bearing race 4466 is the back wall portion or surface 4469 of the bearing race 4466. The back wall portion 4469 includes the concave, generally arcuate surface 4466a. The concave, arcuate surface 4466a of the back wall portion 4469 of the blade housing bearing race 4466, when viewed in three dimensions, includes an upper arcuate or curved surface 4466d, extending above the intermediate portion 4466c of the bearing race 4466, and a lower arcuate or curved surface 4466c of the arcuate surface 4466a, extending below the intermediate portion 4466c of the arcuate surface 4466a. As noted previously, the intermediate portion 4466c includes the radial discontinuity or radial recess 4480 of the arcuate surface 4466a. The radial recess 4480, when viewed in three dimensions, defines an annulus 4480a that is centered about the blade housing center line CBH. The radial recess 4480 includes an upper transition surface 4482 and an axially spaced apart lower transition surface 4484 spaced apart by an arcuate central or bridging surface 4486. The upper and lower transition surfaces 4482, 4484 transition between a general extent of the arcuate surface 4466a of the bearing race 4466 and the arcuate central or bridging surface 4486 and each includes an inflection point due to the fact that a radius of curvature of the bridging surface 4486 is different than a radius of curvature BRRAD of the arcuate surface 4466a. The central or bridging surface 4486 includes a midpoint location 4486a (FIG. 37) that is radially furthest away from the blade housing central axis or center line CBH. The radial recess 4480 may be viewed an interruption or discontinuity of the arcuate surface 4466a in a direction that is radially away from the blade housing center line CBH. The upper curved surface 4466d converges in a direction proceeding toward an upper end 4456 of the blade housing blade support section 4450, while the lower curved surface 4466e converges in a direction proceeding toward a lower end 4458 of the blade housing blade support section 4450. That is, the upper and lower curved surfaces 4466d, 4466e of the back wall surface 4469 have arcuate or curved side wall which are axially spaced by the radial recess 4480 or, viewed in three dimensions, by the annulus 4480a.

The arcuate surface 4466a of the back wall 4469 of the bearing race 4466 defines an arcuate bearing surface 4462 comprising an upper arcuate bearing face 4464a, extending above the intermediate portion 4466c, and a lower arcuate bearing face 4464b, extending below the intermediate portion 4466c. The upper arcuate bearing face 4464a substantially corresponds to the upper curved surface 4466d and the lower arcuate bearing face 4464b corresponds to the lower curved surface 4466e. The upper and lower bearing faces 1464a, 1464b are axially spaced by the radial recess 4480 of the intermediate portion 4466c of the arcuate surface 4466a of the back wall 4469 of the bearing race 4466. In one exemplary embodiment, the upper and lower bearing faces 1464a, 1464b, if extended, would intersect within the radial recess 4480 of the intermediate portion 4466c, approximately at the midpoint location 4486a. Except for the discontinuity of the arcuate surface 4466a resulting from the intermediate portion radial recess 4480, the arcuate surface 4466a of the bearing race 4466 is characterized by the constant radius of curvature BRRAD and a center point BRCPT. That is, except for the radial recess 4480, the arcuate surface 4466a of the bearing race 4466 is continuous, arcuate surface. Since the bearing race 4466 is annular, when viewed in three dimensions, the midpoint location 4486a of the radial recess 4480 defines a circular line. When viewed in longitudinal section in two dimensions, the upper bearing face 4464a and lower bearing face 4464b define arcuate upper and lower arcuate bearing lines 4465a, 4465b. If extended, the upper and lower arcuate hearing lines would intersect at a midpoint location 4466k of the arcuate surface 4466a. The midpoint location 4466k of the arcuate surface 4466a is within the intermediate portion 4466c of the arcuate surface 4466a of the bearing race 4466 and, when viewed in three dimensions, forms a circle that is centered about the blade housing center line CBH. When viewed in two dimensions, the center point BRCPT of the radius of curvature BRRAD of the arcuate surface 4466a is radially aligned along a horizontally extending radius or straight line RL1 (FIG. 37) extending orthogonally from the blade housing center line CBH passing through the midpoint location 4486a of the central or bridging surface 4486 of the radial recess 4480 and also passing through the midpoint location 4466k of the arcuate surface 4466a of the bearing race 4466. That is, the midpoint location 4486a of the radial recess 4480 and the midpoint location 4466k of the arcuate surface 4466a of the bearing race 4466 are radially aligned along the radius line RL1. If the blade axis of rotation R and the blade housing center line CBH are aligned, the radius line RL1 would be substantially coincident with the blade rotational plane RP.

To avoid binding between the blade bearing region 4320 and the blade housing bearing region 4460, advantageously, the radius of curvature BRRAD of the arcuate surface 4466a of the back wall 4469 of the blade housing bearing race 4466 is greater than the corresponding radius of curvature of an arcuate surface of an outer wall of the rotary knife blade body. In one exemplary embodiment, the radius of curvature BRRAD of the arcuate surface 4466a of the back wall 4469 of the bearing race 4466 of the blade housing blade support section 4450 is 0.052 in., while the radius of curvature of the arcuate surface of the outer wall of the rotary knife blade body is 0.047 in., approximately 0.005 in. smaller radius. Advantageously, the close matching of the arcuate bearing surfaces 4322, 4462 of the rotary knife blade 4300 and the blade housing 4400 provide a greater potential bearing contact area which, under certain conditions, may result in a reduced wear rate for the respective bearing surfaces 4322, 4462, Advantageously, a reduction in wear rate of the bearing region 4320 of the rotary knife blade 4300 and/or a reduction in wear rate of the bearing region 4460 of the blade support section 4450 of the blade housing tends to increase working time intervals between operator adjustments to a blade housing diameter BHD of the blade support section 4450 of the blade housing 4400 to account for looseness of the rotary knife blade 4300 as it rotates within the blade support section 4450 of the blade housing 4400. Increasing working time intervals between operator adjustments to the blade housing diameter BHD increases operator productivity and decreases downtime.

The addition of the radial recess 4480 of the intermediate portion 4466c of the arcuate surface 4466a of the back wall 4469 of the bearing race 4466 advantageously functions as a reservoir for lubrication (food grease) from a lubrication assembly (similar to the lubrication assembly 230 of the power operated rotary knife 100, as previously described). The lubrication is retained in the radial recess 4480 and, by virtue of the operating clearance between the rotary knife blade 1300 and the annular blade housing 4400, coupled with the fact that the rotary knife blade 1300 is rotating with respect to the blade housing 4400, the lubrication from the radial recess 4480 is distributed or flows into the blade bearing region 4320 and the blade housing bearing region 4460 to provide for lubrication in the bearing regions 4320, 4460. Under certain operating and load conditions, provision of the lubrication in the bearing regions 4320, 4460 via the radial recess 4480 will advantageously tend to reduce the wear of the respective mating bearing faces 4324a, 4324b, 4464a, 4464b of the rotary knife blade 4300 and annular blade housing 4400. Furthermore, as explained previously, running clearance between the rotating knife blade 4300 and the stationary blade housing 4400 is necessary to allow the blade 4300 to spin relatively freely with the blade housing 4400. The annular blade housing 4400 is a split ring 4401 to allow for operator adjustment of the blade housing diameter such that proper running clearance between the rotary knife blade 4300 and the blade housing 4400 may be maintained as the mating bearing faces 4324a, 4324b, 4466a, 4464b wear during operation of the power operated rotary knife 1000. If an operator reduces the blade housing diameter too much, that is, tightens the blade housing 4400 such that there is insufficient running clearance, a midpoint location of the rotary knife blade arcuate surface (such as the midpoint location 319k of the rotary knife blade 300) may be forced into contact with a vertex or midpoint location of the blade housing bearing race (such as the vertex location or midpoint location 1466k of the arcuate surface 1466a of the blade housing bearing race 1466) which is not desirable. Advantageously, by providing the radial recess 4480 in the intermediate portion 4466c of the arcuate surface 4466a of the bearing race 4466, such undesired contact between the respective blade and blade housing midpoint locations is precluded or mitigated.

In one exemplary embodiment of the present disclosure, the blade housing 4400 is an annular split ring, including the mounting section and the blade support section 4450. The blade support section 4450 extends around the entire 360 degrees (360°) circumference of the blade housing 4400, except for a circumferential discontinuity resulting from the blade housing split. The mounting section is substantially similar to the mounting section 1402 of the annular blade housing 1400 of the second exemplary embodiment. The blade support section 4450, which includes radially spaced apart inner and outer walls 4452, 4454 and axially spaced apart upper and lower ends 4456, 4458, is centered about the central axis or center line CBH. In the assembled combination 4500 of the rotary knife blade 4300 and the blade housing 4400, the blade housing center line CBH is substantially coincident with the rotary knife blade central axis of rotation R. As explained previously with regard to the first exemplary embodiment, due to the operating clearance between the rotary knife blade 4300 and the blade housing 4400 and the due to load forces Fl applied to the rotary knife blade 4300, the blade axis of rotation R may be slightly angled or tilted with respect the blade central axis CBH. However, under non-loaded conditions, in assembled combination, the rotary knife blade 4300 and the blade support section 4450 of the blade housing 4400 are substantially concentric with the rotary knife blade central axis of rotation R.

Sixth Embodiment—Blade-Blade Housing Combination 5500

Figure 38:
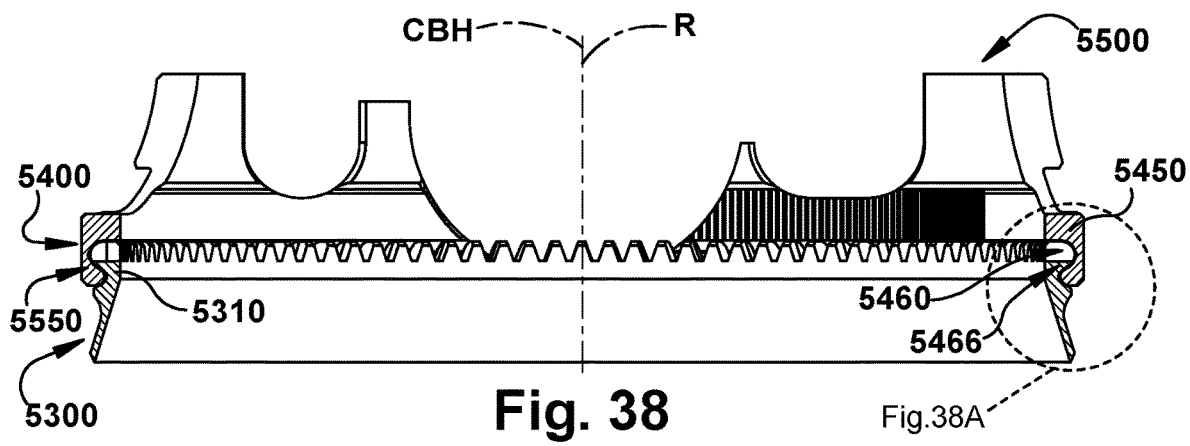
FIG. 38 is a schematic vertical section view of an alternate exemplary embodiment of an assembled combination of a rotary knife blade and an annular blade housing suitable for use in, for example, the power operated rotary knife of FIG. 26.
Figure 38A:
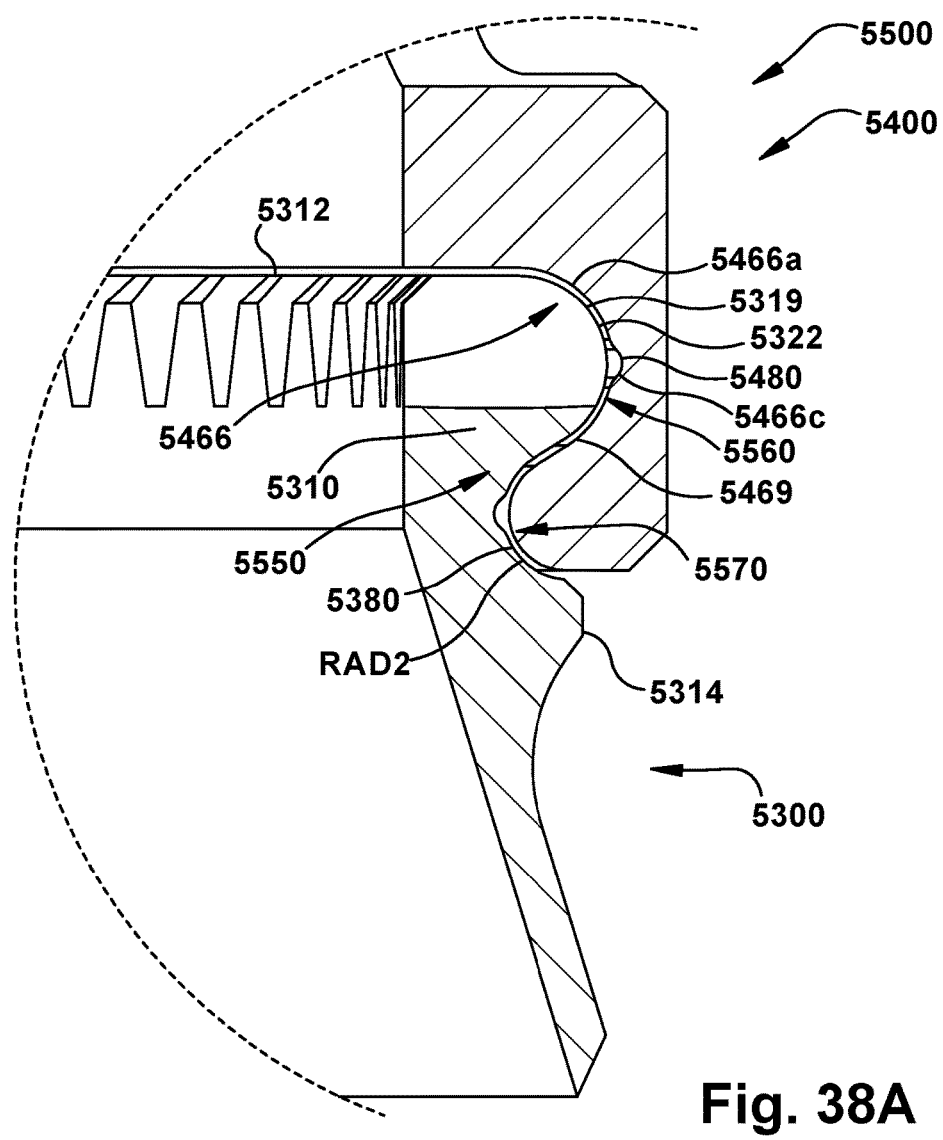
FIG. 38A is a schematic enlarged vertical section view of a portion of the assembled combination of the rotary knife blade and the annular blade housing of FIG. 38 within a dashed region labeled FIG. 38A in FIG. 38.
Figure 39:
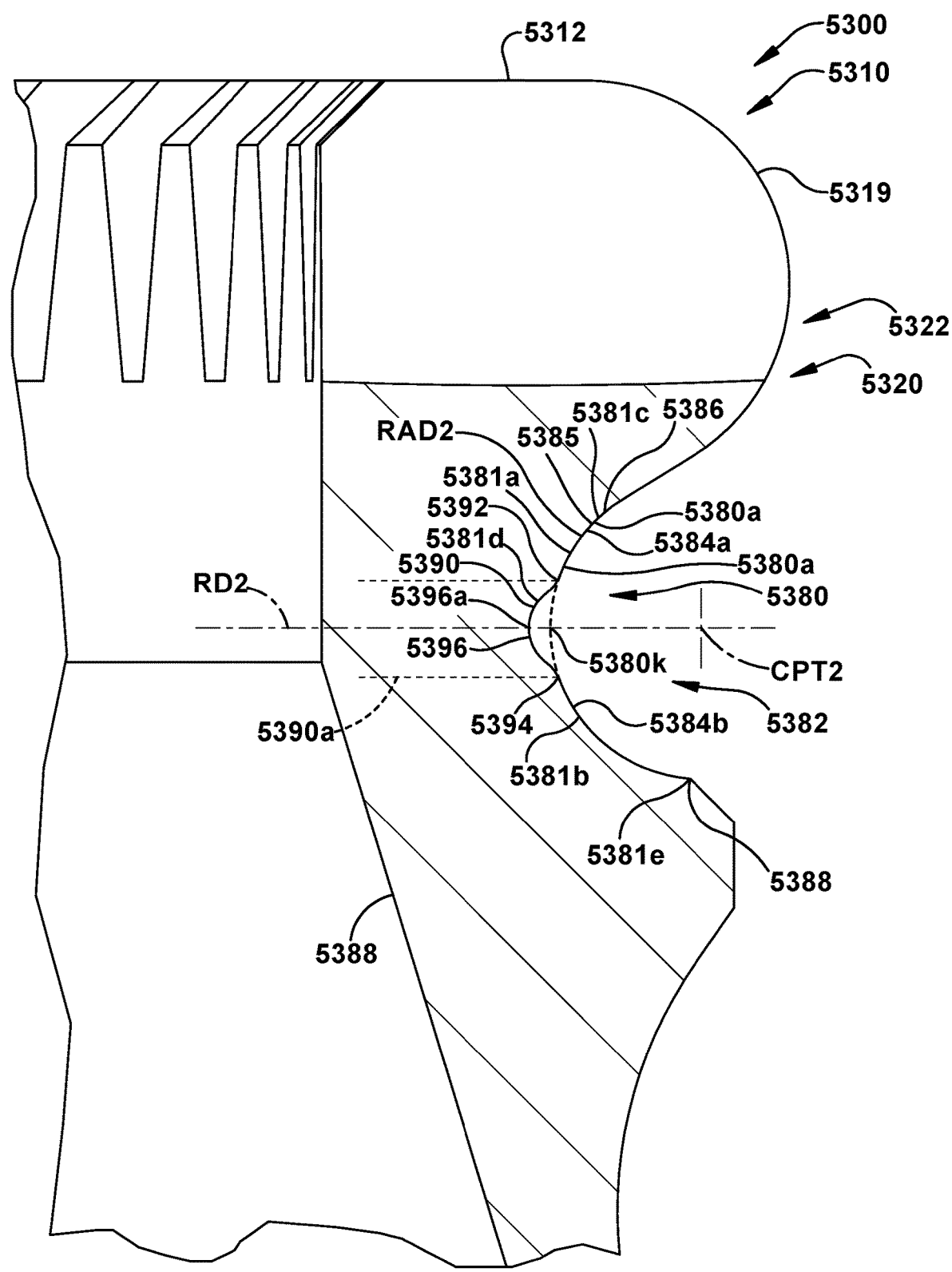
FIG. 39 is a schematic enlarged vertical section view of a portion of the rotary knife blade of FIG. 38.

An alternate exemplary embodiment of an assembled combination of a rotary knife blade-annular blade housing is schematically depicted generally at 5500 in FIGS. 38, 38A and 39. The assembled combination 5500 includes an annular rotary knife blade 5300 and an annular blade housing 5400. The annular rotary knife blade 5300 is generally similar in structure and function to the annular rotary knife blade 2300 of the power operated rotary knife 2000 of the third exemplary embodiment except for a configuration of a bearing region 5320 of an outer wall 5318 of a body 5310 of the rotary knife blade 5300. The annular blade housing 5400 is generally similar in structure and function to the annular blade housing 2400 of the power operated rotary knife 2000 of the third exemplary embodiment, except for the configuration of a bearing region 5460 of a blade support section 5450 of the annular blade housing 5400. In the interests of brevity, reference is made to the prior description of the annular rotary knife blade 2300 and the annular blade housing 3400 the third exemplary embodiment and associated drawing Figures and which are hereby incorporated herein by reference. Only the differences between the respective bearing regions 5320, 5460 with respect to the respective bearing regions 2320, 2460 of the rotary knife blade and blade housing 2300, 2400 of the third exemplary embodiment will be discussed in detail below.

Rotary Knife Blade 5300

A configuration of a bearing race 5380 (FIGS. 38A and 39) of the bearing region 5320 of the outer wall 5318 of the body 5310 of the rotary knife blade 5300 is different than the configuration of the bearing race 2380 of the bearing region 5320 of the outer wall 2318 of the body 2310 of the rotary knife blade 2300 in that the hearing race 5380 includes a radial discontinuity or a concave radial recess 5390 in a concave central portion 5385 of the bearing race 5380, that is, a radial discontinuity in a concave, arcuate surface 5380a formed by the concave central portion 5385 of the bearing race 5380. The radial recess 5390 is within an intermediate portion 5381d of the arcuate surface 5380a of the bearing race 4466.

The bearing region 5320 of the blade body 5310 includes both a first bearing surface 5322, defined by the convex arcuate surface 5319, and a second bearing surface 5382, defined by the concave arcuate surface 5360a. The second bearing surface 5382 is part of the central portion 5385 of the bearing race 5380. The central portion 5385 of the bearing race 5380, which includes both upper and lower regions 5381a, 5381b of the hearing race 5380, defines the concave arcuate surface 5380a. The concave arcuate surface 5380a, in turn, defines the second bearing surface 5382. The bearing surface 5382 includes an upper hearing face 5384a disposed above the intermediate portion 5381d and a lower bearing face 5384b disposed below the intermediate portion 5381d. Except for the discontinuity of the concave arcuate surface 5380a resulting from the presence of the radial recess 5390 in the intermediate portion 5381d, when viewed in two dimensions, the concave arcuate surface 5380a is characterized by a constant radius of curvature RAD2 and a center point CPT2. In one exemplary embodiment, the arcuate surface 5380a has a radius of curvature RAD2 of approximately 0.035 in. The first bearing surface 5322 is part of the rotary knife blade bearing region 5320 and is part of a first blade-blade housing bearing structure 5560, while the second bearing surface 5382 is part of the rotary knife blade bearing region 5320 and is part of a second blade-blade housing bearing structure 5570 of the combined blade-blade housing bearing structure 5550.

The generally concave bearing race 5380 includes upper and lower transition portions 5386, 5388 of the bearing race 5380 and the central portion 5385 of the bearing race 5380 which includes the concave, generally arcuate surface 5380a. The concave, arcuate surface 5380a of the central portion 5385 of the blade housing bearing race 5380, when viewed in three dimensions, extends between an upper end portion 5381c of the bearing race 5380 and a lower end portion 5381e. The upper region 5381a of the arcuate surface 5380a extends between the upper end portion 5381c and the intermediate portion 5381d and the lower region 5381b of the arcuate surface 5380a extends between the intermediate portion 5381d and the lower end portion 5381e. As noted previously, the intermediate portion 5381d includes the radial discontinuity or radial recess 5390 of the arcuate surface 5380a. The radial recess 5390, when viewed in three dimensions, defines an annulus 5390a that is centered about the blade central axis of rotation R. The radial recess 5390 includes an upper transition surface 5392 and an axially spaced apart lower transition surface 5394 spaced apart by a concave arcuate central or bridging surface 5396. The upper and lower transition surfaces 5392, 5394 transition between a general extent of the arcuate surface 5380a of the bearing race 5380 and the arcuate central or bridging surface 5396. Both the upper and lower transition surfaces 5392, 5394 include an inflection point due to the fact that a radius of curvature of the bridging surface 5396 is different than a radius of curvature RAD2 of the arcuate surface 5380a. The central or bridging surface 5396 includes a midpoint location 5396a that is radially closest to the blade central axis of rotation R. The radial recess 5390 may be viewed an interruption or discontinuity of the arcuate surface 5380a in a direction that is radially extending toward the blade central axis of rotation R. The upper bearing face 5384a, when viewed in three dimensions, converges in a direction proceeding toward a lower end 5314 of the blade body 5310. While the lower bearing face 5384b, when viewed in three dimensions, converges in a direction proceeding toward an upper end 5312 of the blade body 5310. That is, the upper and lower bearing faces 5384a, 5384b have arcuate or curved side walls which are axially spaced by the radial recess 5390 or, viewed in three dimensions, by the annulus 5390a.

In one exemplary embodiment, the upper and lower bearing faces 5384a, 5384b, if extended, would intersect at a midpoint location 5380k of the arcuate surface 5380a. The midpoint location 5380k of the arcuate surface 5380a is within the intermediate portion 5381d of the arcuate surface 5380a of the bearing race 5380 and, when viewed in three dimensions, forms a circle that is centered about the blade central axis of rotation R. The center point CPT2 of the radius of curvature RAD2 of the arcuate surface 5380a is radially aligned along a horizontally extending straight line or radius line RD2 (FIG. 39) extending orthogonally from the blade central axis of rotation R passing through the midpoint location 5396a of the central or bridging surface 5396 of the radial recess 5390 and also passing through the midpoint location 5380k of the arcuate surface 5380a of the bearing race 5380. That is, the midpoint location 5396a of the radial recess 5390 and the midpoint location 5380k of the arcuate surface 5380a are radially aligned along the radius line RD2. As noted above, except for the discontinuity of the arcuate surface 5380a resulting from the intermediate portion radial recess 5390, the arcuate surface 5380a of the bearing race 5380 is characterized by the constant radius of curvature RAD2 and the center point CPT2. That is, except for the radial recess 5390, the arcuate surface 5380a of the bearing race 5380 is continuous, arcuate surface.

The advantages of the radial recess 5390 of the arcuate surface 5380a of the bearing race 5380 are similar to the advantages of the radial recess 4480 of the concave arcuate surface 4466a of the bearing race 4666 of the blade support section 4450 of the blade housing 3400, as recited above, and will not be repeated here but instead are hereby incorporated by reference.

Blade Housing 5400

As noted above, the annular blade housing 5400 (FIG. 38A) is generally similar in structure and function to the annular blade housing 2400 of the power operated rotary knife 2000 of the third exemplary embodiment, except for the configuration of a bearing region 5460 of a blade support section 5450 of the annular blade housing 5400. A configuration of a bearing race 5466 of a bearing region 5460 of a blade support section 5450 of the blade housing 5400 is substantially the same as the bearing race 4466 of the bearing region 4460 of the blade support section 4450 of the blade housing 4400, as described above with respect to the assembled blade-blade housing combination 4500 of the fifth exemplary embodiment. Specifically, like the bearing race 4466 of the blade housing 4400, the bearing includes a radial discontinuity or a concave radial recess 5480 in a back wall 5469 of the bearing race 5466, that is, a radial discontinuity in a concave, arcuate surface 5466a formed by the back wall 5469 of the bearing race 5466. The radial recess 5480 is within an intermediate portion 5466c of the arcuate surface 5466a of the bearing race 5466 and, like the bearing race 5466 is centered about a center line or center axis GBH of the blade housing 5400.

For brevity, reference is hereby made to the description of the concave bearing race 4466 of the blade support section 4450 of the blade housing 4400 of the fifth exemplary embodiment, as to the structure, configuration, function and advantages of the bearing race 5466 of the blade housing 5400 of the sixth exemplary embodiment. And such description and corresponding drawings of the concave bearing race 4466 of the blade support section 4450 of the blade housing 4400 are incorporated herein with respect to the bearing race 5466 of the blade housing 5400 of the sixth exemplary embodiment. With regard to the structure, configuration, function and advantages of the remainder of the blade housing 5400, reference is hereby made to the description of the blade housing 2400 of the third exemplary embodiment and is incorporated herein with respect to the blade housing 5400 of the sixth exemplary embodiment.

As used herein, terms of orientation and/or direction such as front, rear, forward, rearward, distal, proximal, distally, proximally, upper, lower, inward, outward, inwardly, outwardly, horizontal, horizontally, vertical, vertically, axial, radial, longitudinal, axially, radially, longitudinally, etc., are provided for convenience purposes and relate generally to the orientation shown in the Figures and/or discussed in the Detailed Description. Such orientation/direction terms are not intended to limit the scope of the present disclosure, this application, and/or the invention or inventions described therein, and/or any of the claims appended hereto. Further, as used herein, the terms comprise, comprises, and comprising are taken to specify the presence of stated features, elements, integers, steps or components, but do not preclude the presence or addition of one or more other features, elements, integers, steps or components.

What have been described above are examples of the present disclosure/invention. It is, of course, not possible to describe every conceivable combination of components, assemblies, or methodologies for purposes of describing the present disclosure/invention, but one of ordinary skill in the art will recognize that many further combinations and permutations of the present disclosure/invention are possible. Accordingly, the present disclosure/invention is intended to embrace all such alterations, modifications, and variations that fall within the spirit and scope of the appended claims.

What is claimed is:

1. A power operated rotary knife comprising:
an elongated handle assembly extending along a longitudinal axis;
a frame body coupled to the elongated handle assembly, the frame body including a mounting pedestal; and
a blade-blade housing combination coupled to the mounting pedestal of the frame body and including an annular rotary knife blade supported for rotation about a central axis of rotation by an annular blade housing;
the annular rotary knife blade including:
a body and a blade section extending from the body, the body and the blade section being radially centered about a central axis of rotation of the rotary knife blade;
the body including a first end and a second end spaced axially below the first end and an inner wall and an outer wall spaced radially apart, the outer wall of the body including an arcuate surface being convex radially outward with respect to the central axis of rotation, the arcuate surface including an upper region and a lower region, the upper region of the arcuate surface being axially closer to the first end of the body and the lower region of the arcuate surface being axially closer to the second end of the body;
the body further including a driven gear having an upper end and an axially spaced apart lower end and comprising a plurality of gear teeth, the plurality of gear teeth of the driven gear extending axially downwardly from the first end of the body and extending radially through the outer wall of the body, the plurality of gear teeth including outer surfaces comprising at least a part of the upper region of the arcuate surface; and
the outer wall of the body further including a first bearing surface for rotatably supporting the annular rotary knife blade, the first bearing surface including an upper bearing face in the upper region of the arcuate surface and a lower bearing face in the lower region of the arcuate surface, the outer surfaces of the plurality of gear teeth comprising at least a part of one of the upper bearing face and the lower bearing face of the first bearing surface; and
the annular blade housing including:
a blade support section and a mounting section extending from the blade support section;
the blade support section including an inner wall, the inner wall including a first concave bearing surface providing bearing support for the first bearing surface of the outer wall of the body of the annular rotary knife blade.

2. The power operated rotary knife of claim 1 wherein the outer surfaces of the plurality of gear teeth of the rotary knife blade comprise at least a part of the upper region of the arcuate surface and a part of the lower region of the arcuate surface and comprise at least a part of the upper bearing face of the first bearing surface and a part of the lower bearing face of the first bearing surface.

3. The power operated rotary knife of claim 1 wherein the outer wall of the body of the rotary knife blade further includes a bearing race that is concave radially inward with respect to the central axis of rotation, the bearing race including an upper region and a lower region, the upper region of the bearing race being axially closer to the first end of the body and the lower region being axially closer to the second end of the body, the outer wall of the body further including a second bearing surface for rotatably supporting the annular rotary knife blade, the second bearing surface including an upper bearing face in the upper region of the bearing race and a lower bearing face in the lower region of the bearing race.

4. The power operated rotary knife of claim 3 wherein the inner wall of the blade support section of the blade housing further includes a second convex bearing surface providing bearing support for the second bearing surface of the outer wall of the body of the annular rotary knife blade, the first concave bearing surface being part of a bearing race and the second convex bearing surface being part of a radially protruding bearing bead.

5. A power operated rotary knife comprising:
an elongated handle assembly extending along a longitudinal axis;
a frame body coupled to the elongated handle assembly, the frame body including a mounting pedestal; and
a blade-blade housing combination coupled to the mounting pedestal of the frame body and including an annular rotary knife blade supported for rotation about a central axis of rotation by an annular blade housing;
the annular rotary knife blade including:
a body and a blade section extending from the body, the body and the blade section being radially centered about a central axis of rotation of the rotary knife blade;
the body including a first end and a second end spaced axially below the first end and an inner wall and an outer wall spaced radially apart, the outer wall of the body including an arcuate surface being convex radially outward with respect to the central axis of rotation, the arcuate surface including a first bearing surface, the outer wall of the body further including a bearing race being concave radially inward with respect to the central axis of rotation, the bearing race including a second bearing surface, the arcuate surface being axially closer to the first end of the body and the bearing race being axially closer to the second end of the body; and
the annular blade housing including:
a blade support section centered about a blade housing center line and a mounting section extending from the blade support section;
the blade support section including an inner wall and a radially spaced apart outer wall, an upper end and an axially spaced apart lower end, the inner wall of the blade support section including a first concave bearing surface and an axially spaced apart second convex bearing surface, the first concave bearing surface of the bearing race being axially closer to the upper end of the blade support section and the second convex bearing surface being axially closer to the lower end of the blade support section, the first concave bearing surface being concave and the second convex bearing surface being convex, as viewed in a vertical section view along a vertical plane including the blade housing center line, the first concave bearing surface of the blade support section of the blade housing providing bearing support for the first bearing surface of the arcuate surface of the outer wall of the body of the annular rotary knife blade and the second convex bearing surface of the blade support section of the blade housing providing bearing support for the second bearing surface of the bearing race of the outer wall of the body of the annular rotary knife blade.

6. The power operated rotary knife of claim 5 wherein the first concave bearing surface of inner wall of the blade support section of the annular blade housing is an arcuate surface and further wherein the first concave bearing surface of the inner wall of the blade support section of the annular blade housing comprises an upper bearing face and a lower bearing face.

7. The power operated rotary knife of claim 5 wherein the second convex bearing surface of the inner wall of the blade support section of the annular blade housing is an arcuate surface and further wherein the second convex bearing surface of the inner wall of the blade support section of the annular blade housing comprises an upper bearing face and a lower bearing face.

8. The power operated rotary knife of claim 5 wherein at least a portion of the first concave bearing surface of the annular blade housing is non-orthogonal and non-parallel to the blade housing center line, as viewed in a vertical section view along a vertical plane including the blade housing center line and at least a portion of the second convex bearing surface of the annular blade housing is non-orthogonal and non-parallel to the blade housing center line, as viewed in a vertical section view along a vertical plane including the blade housing center line.

9. The power operated rotary knife of claim 5 wherein the second convex bearing surface of the annular blade housing extends radially from the inner wall of the blade support section and is spaced axially from the first concave bearing surface by a transition portion of the inner wall of the blade support section of the annular blade housing.

10. The power operated rotary knife of claim 5 wherein the first bearing surface of the arcuate surface of the outer wall of the body of the annular rotary knife blade includes an upper bearing face in an upper region of the arcuate surface of the outer wall of the body of the annular rotary knife blade and a lower bearing face in a lower region of the arcuate surface, the body of the annular rotary knife blade further including a driven gear having an upper end and an axially spaced apart lower end and comprising a plurality of gear teeth, the plurality of gear teeth of the driven gear extending axially downwardly from the first end of the body and extending radially through the outer wall of the body, the plurality of gear teeth including outer surfaces comprising at least a part of the upper region of the arcuate surface and comprising at least a part of one of the upper bearing face and the lower bearing face of the first bearing surface.

11. A combination of an annular rotary knife blade and an annular blade housing for use in a power operated rotary knife, the annular blade housing supporting the annular rotary knife blade for rotation about a central axis of rotation, the combination comprising:
the annular rotary knife blade including:
a body and a blade section extending from the body, the body and the blade section being radially centered about a central axis of rotation of the rotary knife blade;
the body including a first end and a second end spaced axially below the first end and an inner wall and an outer wall spaced radially apart, the outer wall of the body including an arcuate surface being convex radially outward with respect to the central axis of rotation, the arcuate surface including an upper region and a lower region, the upper region of the arcuate surface being axially closer to the first end of the body and the lower region of the arcuate surface being axially closer to the second end of the body;
the body further including a driven gear having an upper end and an axially spaced apart lower end and comprising a plurality of gear teeth, the plurality of gear teeth of the driven gear extending axially downwardly from the first end of the body and extending radially through the outer wall of the body, the plurality of gear teeth including outer surfaces comprising at least a part of the upper region of the arcuate surface; and
the outer wall of the body further including a first bearing surface for rotatably supporting the annular rotary knife blade, the first bearing surface including an upper bearing face in the upper region of the arcuate surface and a lower bearing face in the lower region of the arcuate surface, the outer surfaces of the plurality of gear teeth comprising at least a part of one of the upper bearing face and the lower bearing face of the first bearing surface; and
the annular blade housing including:
a blade support section and a mounting section extending from the blade support section;
the blade support section including an inner wall, the inner wall including a first concave bearing surface providing bearing support for the first bearing surface of the outer wall of the body of the annular rotary knife blade.

12. The combination of the annular rotary knife blade and the annular blade housing of claim 11 wherein the outer surfaces of the plurality of gear teeth of the rotary knife blade comprise at least a part of the upper region of the arcuate surface and a part of the lower region of the arcuate surface and comprise at least a part of the upper bearing face of the first bearing surface and a part of the lower bearing face of the first bearing surface.

13. The combination of the annular rotary knife blade and the annular blade housing of claim 11 wherein the outer wall of the body of the rotary knife blade further includes a bearing race that is concave radially inward with respect to the central axis of rotation, the bearing race including an upper region and a lower region, the upper region of the bearing race being axially closer to the first end of the body and the lower region being axially closer to the second end of the body, the outer wall of the body further including a second bearing surface for rotatably supporting the annular rotary knife blade, the second bearing surface including an upper bearing face in the upper region of the bearing race and a lower bearing face in the lower region of the bearing race.

14. The combination of the annular rotary knife blade and the annular blade housing of claim 13 wherein the inner wall of the blade support section of the blade housing further includes a second convex bearing surface providing bearing support for the second bearing surface of the outer wall of the body of the annular rotary knife blade, the first concave bearing surface being part of a bearing race and the second convex bearing surface being part of a radially protruding bearing bead.

15. A combination of an annular rotary knife blade and an annular blade housing for use in a power operated rotary knife, the annular blade housing supporting the annular rotary knife blade for rotation about a central axis of rotation, the combination comprising:
the annular rotary knife blade including:
a body and a blade section extending from the body, the body and the blade section being radially centered about a central axis of rotation of the rotary knife blade;

the body including a first end and a second end spaced axially below the first end and an inner wall and an outer wall spaced radially apart, the outer wall of the body including an arcuate surface being convex radially outward with respect to the central axis of rotation, the arcuate surface including a first bearing surface, the outer wall of the body further including a bearing race being concave radially inward with respect to the central axis of rotation, the bearing race including a second bearing surface, the arcuate surface being axially closer to the first end of the body and the bearing race being axially closer to the second end of the body; and the annular blade housing including:

a blade support section centered about a blade housing center line and a mounting section extending from the blade support section;

the blade support section including an inner wall and a radially spaced apart outer wall, an upper end and an axially spaced apart lower end, the inner wall of the blade support section including a first concave bearing surface and an axially spaced apart second convex bearing surface, the first concave bearing surface being axially closer to the upper end of the blade support section and the second convex bearing surface being axially closer to the lower end of the blade support section, the first concave bearing surface being concave and the second convex bearing surface being convex, as viewed in a vertical section view along a vertical plane including the blade housing center line, the first concave bearing surface of the blade support section of the blade housing providing bearing support for the first bearing surface of the arcuate surface of the outer wall of the body of the annular rotary knife blade and the second convex bearing surface of the blade support section of the blade housing providing bearing support for the second bearing surface of the bearing race of the outer wall of the body of the annular rotary knife blade.

16. The combination of the annular rotary knife blade and the annular blade housing of claim 15 wherein the first concave bearing surface of inner wall of the blade support section of the annular blade housing is an arcuate surface and further wherein the first concave bearing surface of the inner wall of the blade support section of the annular blade housing comprises an upper bearing face and a lower bearing face.

17. The combination of the annular rotary knife blade and the annular blade housing of claim 15 wherein the second convex bearing surface of the inner wall of the blade support section of the annular blade housing is an arcuate surface and further wherein the second convex bearing surface of the inner wall of the blade support section of the annular blade housing comprises an upper bearing face and a lower bearing face.

18. The combination of the annular rotary knife blade and the annular blade housing of claim 15 wherein at least a portion of the first concave bearing surface of the annular blade housing is non-orthogonal and non-parallel to the blade housing center line, as viewed in a vertical section view along a vertical plane including the blade housing center line and at least a portion of the second convex bearing surface of the annular blade housing is non-orthogonal and non-parallel to the blade housing center line, as viewed in a vertical section view along a vertical plane including the blade housing center line.

19. The combination of the annular rotary knife blade and the annular blade housing of claim 15 wherein the second convex bearing surface of the annular blade housing extends radially from the inner wall of the blade support section and is spaced axially from the first concave bearing surface by a transition portion of the inner wall of the blade support section of the annular blade housing.

20. The combination of the annular rotary power operated rotary knife of claim 15 wherein the first bearing surface of the arcuate surface of the outer wall of the body of the annular rotary knife blade includes an upper bearing face in an upper region of the arcuate surface of the outer wall and a lower bearing face in a lower region of the arcuate surface, the body of the annular rotary knife blade further including a driven gear having an upper end and an axially spaced apart lower end and comprising a plurality of gear teeth, the plurality of gear teeth of the driven gear extending axially downwardly from the first end of the body and extending radially through the outer wall of the body, the plurality of gear teeth including outer surfaces comprising at least a part of the upper region of the arcuate surface and the outer surfaces of the plurality of gear teeth comprising at least a part of one of the upper bearing face and the lower bearing face of the first bearing surface.

21. An annular blade housing for supporting an annular rotary knife blade for rotation in a power operated rotary knife, the blade housing comprising:

a blade support section centered about a blade housing center line and a mounting section extending from the blade support section;

the blade support section including an inner wall and a radially spaced apart outer wall, an upper end and an axially spaced apart lower end, the inner wall of the blade support section including a first concave bearing surface and an axially spaced apart second convex bearing surface and further including a bearing race extending radially into the inner wall and a radially protruding bearing bead extending radially in a direction toward the blade housing center line, the bearing race including the first concave bearing surface and being axially closer to the upper end of the blade support section and the radially protruding bearing bead including the second convex bearing surface and being axially closer to the lower end of the blade support section, the first concave bearing surface of the bearing race being convex and the radially protruding bearing bead being convex, as viewed in a vertical section view along a vertical plane including the blade housing center line.

22. The annular blade housing of claim 21 wherein the first concave bearing surface of the inner wall of the blade support section is an arcuate surface and further wherein the first concave bearing surface comprises an upper bearing face and a lower bearing face.

23. The annular blade housing of claim 21 wherein the second convex bearing surface of the inner wall of the blade support section is an arcuate surface and further wherein the second convex bearing surface comprises an upper bearing face and a lower bearing face.

* * * * *